United States Patent
Myrick et al.

(10) Patent No.: US 7,162,427 B1
(45) Date of Patent: Jan. 9, 2007

(54) STRUCTURE AND METHOD OF MODELING INTEGRATED BUSINESS AND INFORMATION TECHNOLOGY FRAMEWORKS AND ARCHITECTURE IN SUPPORT OF A BUSINESS

(75) Inventors: Conrad B. Myrick, Richardson, TX (US); Harry W. Hixon, Jr., Stafford, VA (US); Christopher M. Koll, Carrollton, TX (US); Ralph L. Whittle, Jr., Plano, TX (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 09/378,514

(22) Filed: Aug. 20, 1999

(51) Int. Cl.
  G06Q 99/00 (2006.01)
  G06F 9/46 (2006.01)
(52) U.S. Cl. .............................. 705/1; 705/7
(58) Field of Classification Search ................ 703/6; 705/1, 7, 11
  See application file for complete search history.

(56) References Cited

U.S. PATENT DOCUMENTS

| | | | | |
|---|---|---|---|---|
| 5,233,513 A * | 8/1993 | Doyle | ............................ | 705/7 |
| 5,406,477 A * | 4/1995 | Harhen | .......................... | 703/6 |
| 6,134,706 A * | 10/2000 | Carey et al. | ..................... | 717/1 |
| 6,167,564 A * | 12/2000 | Fontana et al. | .............. | 717/104 |
| 6,233,537 B1 * | 5/2001 | Gryphon et al. | ................ | 703/1 |
| 6,311,144 B1 * | 10/2001 | Abu El Ata | .................... | 703/2 |

(Continued)

FOREIGN PATENT DOCUMENTS

JP   09-319796 A  * 12/1997

OTHER PUBLICATIONS

Hurwitz et al: "E-Business Software (toward virtual companies)(industry Trend or Event)"; DBMS, Jul. 1998, vol. 11, No. 8, p. 8.*

"MatrixOne Creates Intelligent Collaborative Commerce; Adaptive, Proactive, Secure Solutions Define Competitive Success for e-Commerce"; Business Wire, Sep. 11, 2000, p. 2799.*

(Continued)

Primary Examiner—John G. Weiss
Assistant Examiner—Cang Thai
(74) Attorney, Agent, or Firm—Baker Botts L.L.P.

(57) ABSTRACT

An enterprise architecture (30) for a business is divided into a business architecture (32), an information technology architecture (34), and an enterprise management framework (36). The business architecture (32) is the main driver for the information technology architecture (34) but the information technology architecture (34) can also have an impact on the construction of the business architecture (32). The enterprise management framework (36) allows for the management of the two architectures. A framework tower (500) is built around essential and mandatory components of the enterprise architecture (30). The framework tower (500) is made up of a plurality of planes representing mandatory components of the enterprise architecture (30). The components of the framework tower (500) include a strategic plan (41), a business architecture (42), an information architecture (44), an application architecture (46), a technology infrastructure architecture (48), and an enterprise information technology management framework (49). Each component in the framework tower (500) addresses the people, processes, and technology of the enterprise architecture (30) so that strategic information technology planning, enterprise architecture definition, and repeatable and effective information technology enabling solutions can be performed and delivered to the business.

11 Claims, 60 Drawing Sheets

U.S. PATENT DOCUMENTS

| | | | |
|---|---|---|---|
| 6,370,508 B1 * | 4/2002 | Beck et al. | 705/1 |
| 6,411,936 B1 * | 6/2002 | Sanders | 705/10 |
| 6,424,979 B1 * | 7/2002 | Livingston et al. | 715/511 |
| 6,442,557 B1 * | 8/2002 | Buteau et al. | 707/102 |
| 6,560,569 B1 * | 5/2003 | Abu El Ata | 703/2 |
| 2002/0049573 A1 * | 4/2002 | El Ata | 703/2 |
| 2002/0055853 A1 * | 5/2002 | MacLeod et al. | 705/1 |

OTHER PUBLICATIONS

Nabil Abu El Ata, Provisional Application for Method for Modeling Information System for an Organization, May 13, 1998, 255 Pages (Serial No. 60/085,350).*

Nabil Abu El Ata, Provisional Application for Systems and Methods for Determining Performance Metrics for Information System, Jul. 2, 1999, 71 Pages (Serial No. 60/60/142,313).*

* cited by examiner

ENTERPRISE STRATEGIC IT PLANNING FRAMEWORK MODEL

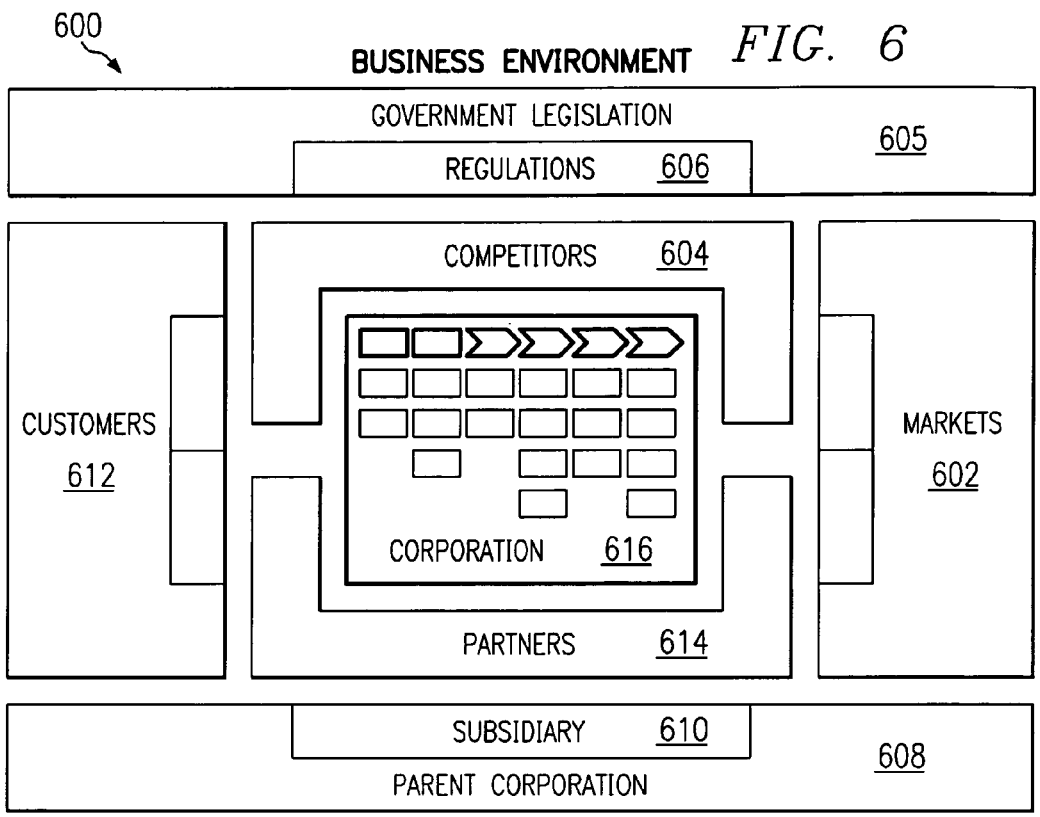
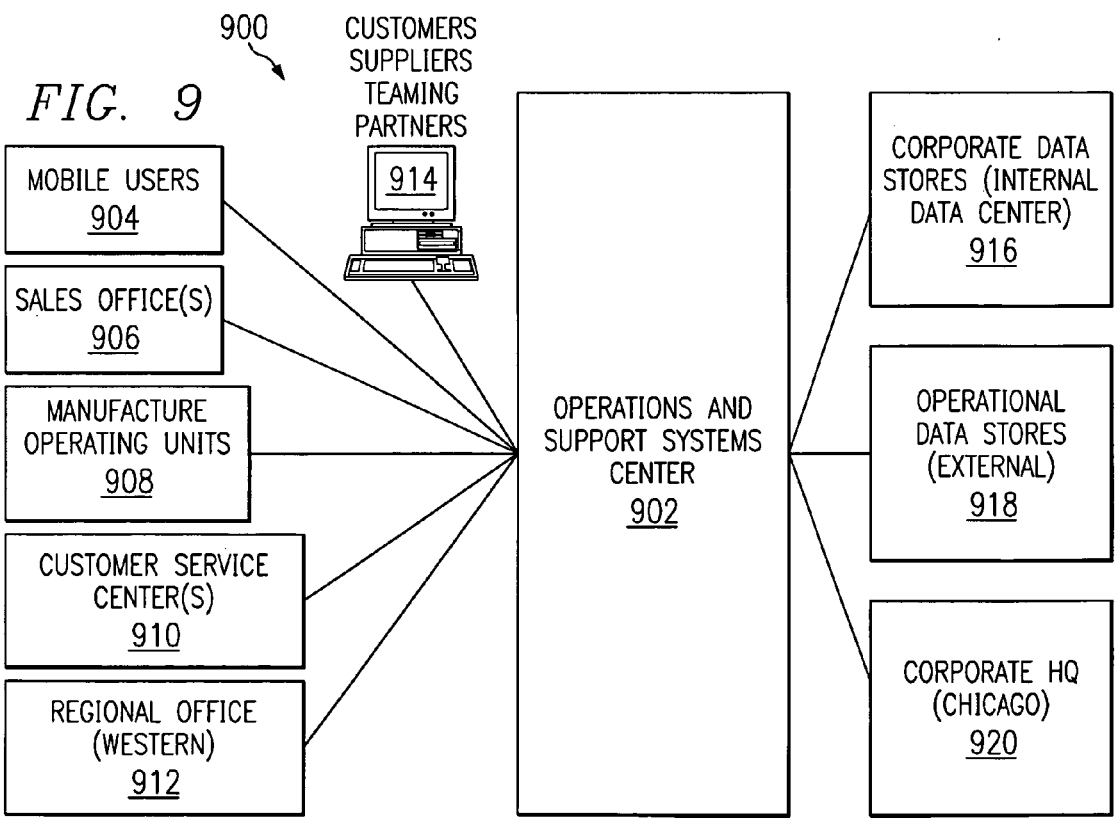

IT Investment Profile

| IT Expense Category | IT Funding/Expenditure Area(s) | Previous Year (CY-1) $0 | Current Year (CY) $0 | Budget Year (CY+1) $0 | Outyear 1 (CY+2) $0 | Outyear 2 (CY+3) $0 | Outyear 3 (CY+4) $0 | Outyear 4 (CY+4) $0 |
|---|---|---|---|---|---|---|---|---|
| Discretionary Funds (DF) | IT Planning/Architecture Dev<br>Application Development<br>New Technology Development<br>IT Modernization<br>IT Enhancements | | | | | | | |
| | Sub-Total | | | | | | | |
| Non-Discretionary Funds (NDF) | COE<br>Desktop/Local Server Operations and Processing<br>Enterprise Data Operations and Processing<br>IT Service Mgmt (Customer Assistance)<br>Maintenance<br>IT Systems/Network Mgmt<br>IT Business Mgmt (SLAs)<br>Communications<br>  -Data (LAN, MAN/CAN, WAN, etc.)<br>  -Voice/VME<br>  -Remote Access/Telecommuting<br>  -Call Management (Telephony)<br>  -Paging Management<br>Business Intelligence/Data Warehousing/Data Marts<br>Web/Internet/Extranet/Intranet (Electronic Commerce) | | | | | | | |
| | Sub-total | | | | | | | |
| | TOTAL IT COST | | | | | | | |

Corporate Revenue
Percentage – IT Cost/Revenue
Percentage – Non-Discretionary Funding/IT Cost
Percentage – Discretionary Funding/IT Cost Industry Standard – IT Cost/Revenue
Industry Standard – NDF/IT Cost
Industry Standard – DF/IT Cost

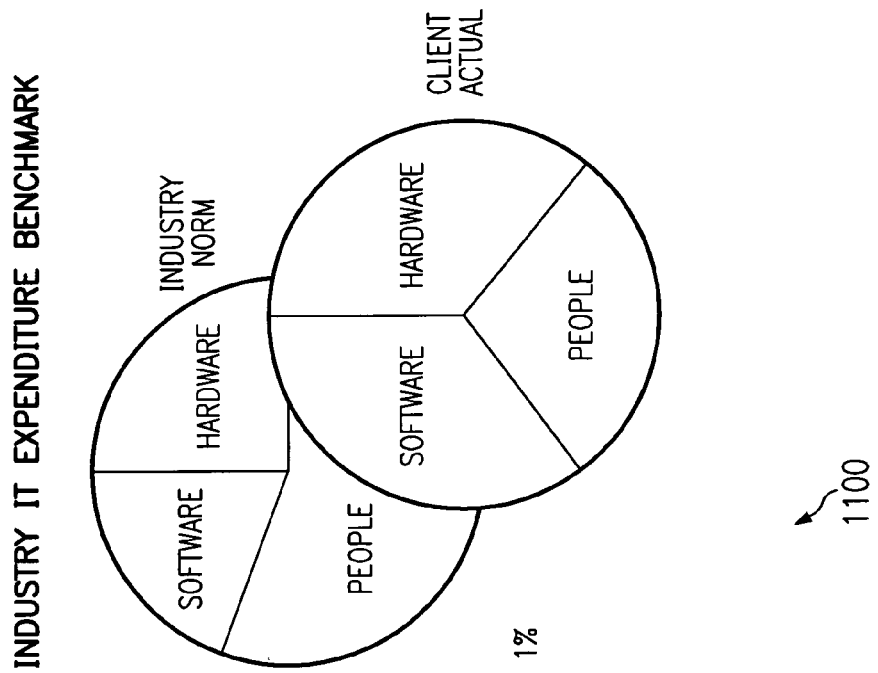
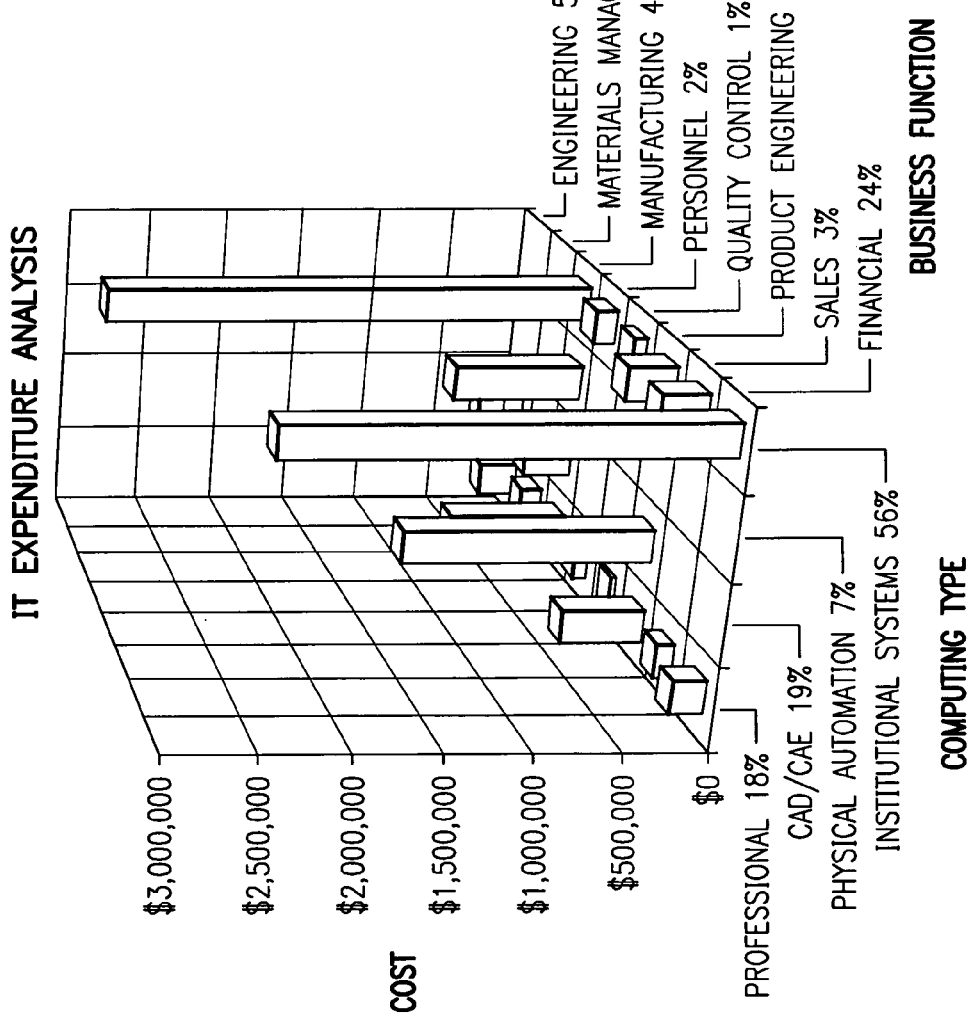
FIG. 11

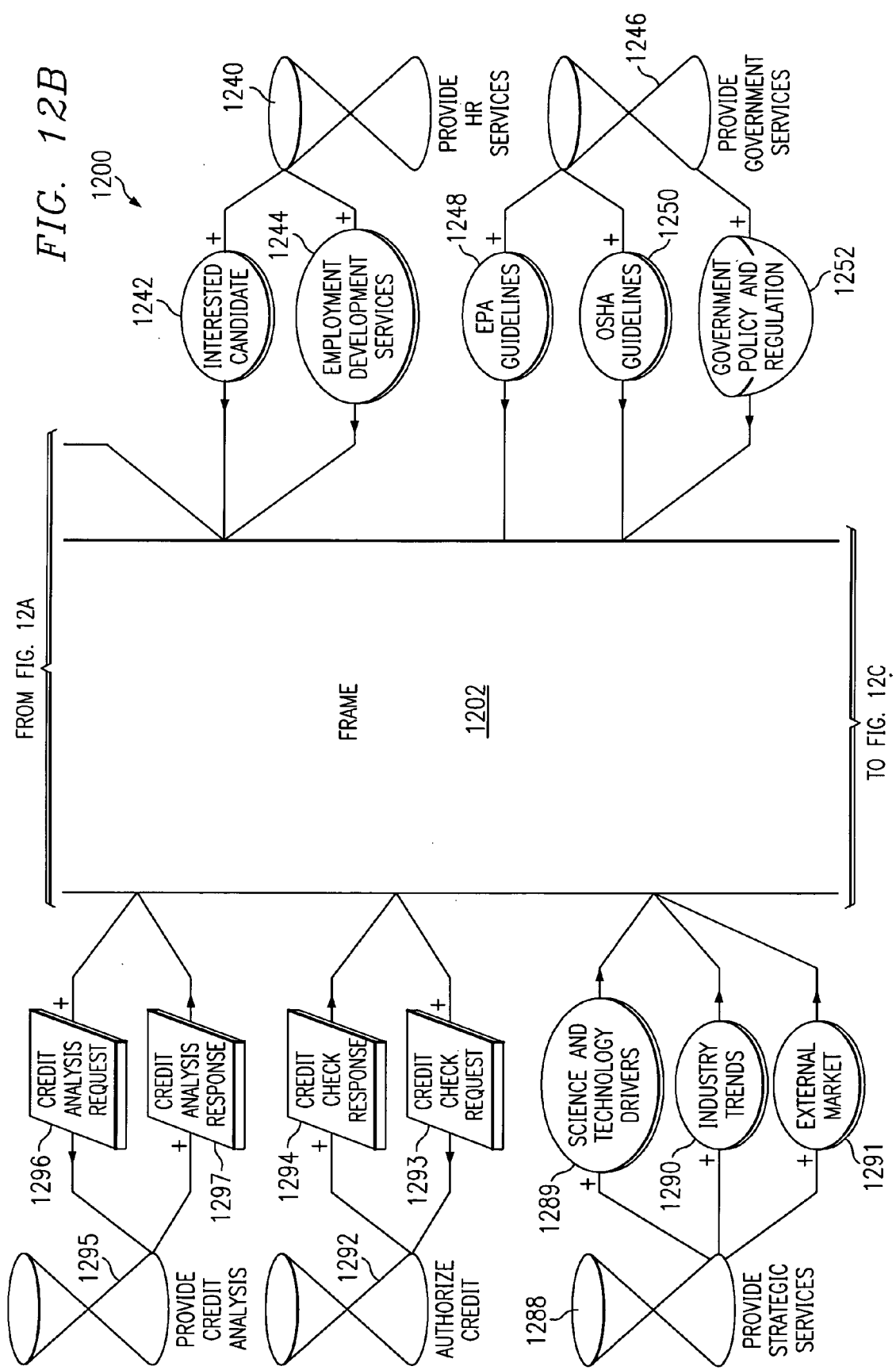

*FIG. 12C*

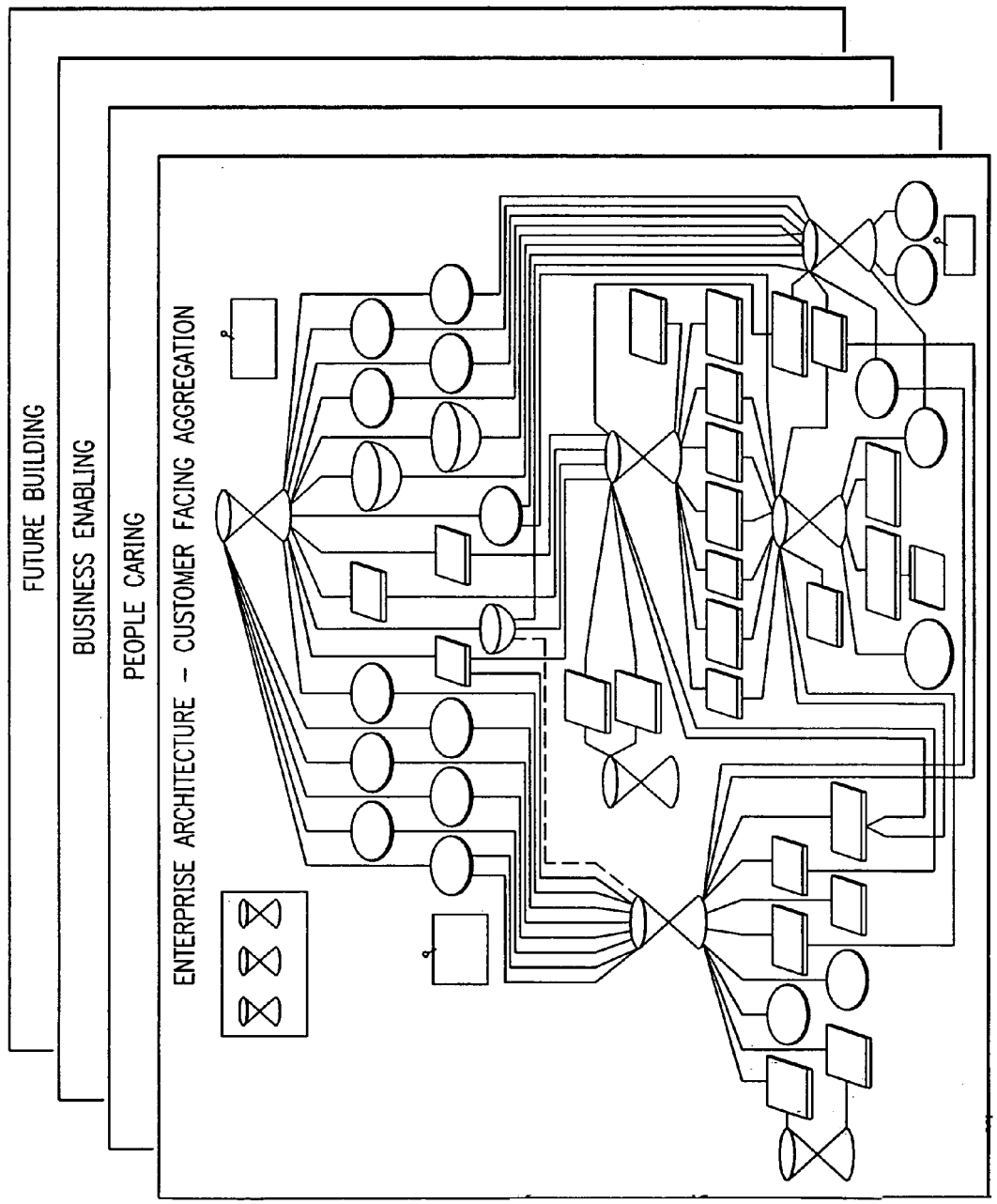

FIG. 14B

Value Stream Event Metrics (one Matrix for each Value Stream)

| Event/Time Frames | Order-to-Cash Value Stream | | | | | | |
|---|---|---|---|---|---|---|---|
| | 1st | 2nd | 3rd | 4th | 5th | 6th | Total |
| Customer/Prospect cruises web site | 1,932 | 2,995 | 3,888 | 3,977 | 4,003 | 2,421 | 19,216 |
| Customer places order | 893 | 1,432 | 1,567 | 1,783 | 2,323 | 1,693 | 9,691 |
| Credit authority responds to credit check request | 402 | 644 | 705 | 802 | 1,045 | 762 | 4,361 |
| Customer makes payment | 491 | 788 | 862 | 981 | 1,278 | 931 | 5,330 |
| Customer reviews order | 125 | 200 | 219 | 250 | 325 | 237 | 1,357 |
| Customer cancels order | 18 | 29 | 31 | 36 | 46 | 34 | 194 |
| Customer changes order | 71 | 115 | 125 | 143 | 186 | 135 | 775 |
| OPS updates ATP | 8 | 8 | 8 | 8 | 8 | 8 | 48 |
| OPS updates ship date | 161 | 258 | 282 | 321 | 418 | 305 | 1,744 |
| Shipping provides ASN | 893 | 1,432 | 1,567 | 1,783 | 2,323 | 1,693 | 9,691 |
| Shipping provides advice of receipt | 893 | 1,432 | 1,567 | 1,783 | 2,323 | 1,693 | 9,691 |
| Shipping provides proof of delivery | 893 | 1,432 | 1,567 | 1,783 | 2,323 | 1,693 | 9,691 |
| FSR orders replacement parts | 45 | 72 | 78 | 89 | 116 | 85 | 485 |
| FSR submits billing inputs | 142 | 166 | 179 | 50 | 50 | 50 | 637 |
| Customer Service authorizes returns | 50 | 50 | 50 | 244 | 123 | 66 | 583 |
| Time to invoice customer | 893 | 1,432 | 1,567 | 1,783 | 2,323 | 1,693 | 9,691 |

Hierarchy of Counts & Amounts
 Business Event–Customer places order
  Media–web,fax,phone–e–mail,mail
   Application Interface–Order Entry to Product Configuration
    Database I/O–Read Product Master
     Table Access–Retrieve Part Number

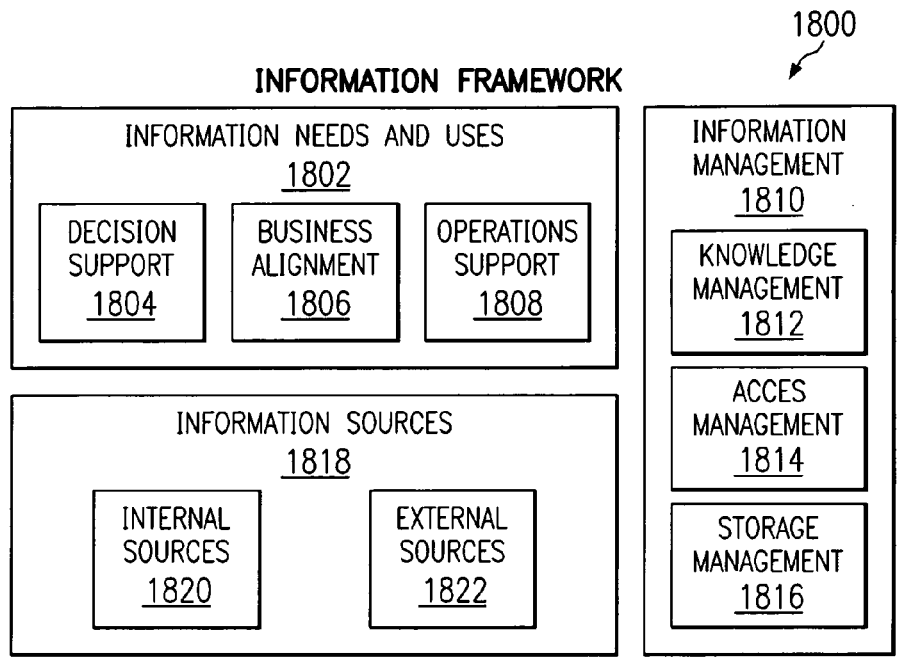

FIG. 18

| IT Component | Design Standard(s) | "Benchmark" Product Set(s) Recommendation (for Requirements Definition) |
|---|---|---|
| Finance/Accounting | GAAP | PeopleSoft Payables or equivalent |
| | FASB | PeopleSoft Receivables or equivalent |
| | EFT | PeopleSoft General Ledger or equivalent |
| | SQL | PeopleSoft Project or equivalent |
| | ODBC | PeopleSoft Expenses |
| | JDBC | PeopleSoft Treasury or equivalent |
| | | |
| Human Resources | COBRA | PeopleSoft HRMS, J.D. Edwards, Geac SmartStream HR of equivalent |
| | | |
| Asset Management | | PeopleSoft Distribution or equivalent |
| | | PeopleSoft Materials Management or equivalent |

FIG. 26

INFORMATION APPLICATIONS SOFTWARE PORTFOLIO (INTEGRATION MATRIX)
ENTERPRISE INFORMATION/APPLICATION/SYSTEMS MANAGEMENT SOFTWARE PORTFOLIO (INTEGRATION MATRIX)

| Value Streams/ Workflow Scenarios | Business Software Applications | | | | Business Intelligence Software Applications | | | | Systems Management Software Applications | | | |
|---|---|---|---|---|---|---|---|---|---|---|---|---|
| | App1 (Sales) | App2 (FI/CO) | App3 (IM) | App4 (GW) | App5 (EIS) | App6 (DIS) | App7 (GIS) | App8 (Data Mining) | App9 (Perf) | App10 (Security) | App11 (Networks) | App12 (Backup) |
| Application Architecture | | | | | | | | | | | | |
| Order to Cash | | | | | | | | | | | | |
| Prospect to Customer | | | | | | | | | | | | |
| Policy to Compliance | | | | | | | | | | | | |
| etc. | | | | | | | | | | | | |
| Information Architecture | | | | | | | | | | | | |
| Profitability Analysis | | | | | | | | | | | | |
| Consumer Intelligence | | | | | | | | | | | | |
| Operating Efficiency | | | | | | | | | | | | |
| etc. | | | | | | | | | | | | |
| Systems Mgmt Architecture | | | | | | | | | | | | |
| Set IT Service Expectation | | | | | | | | | | | | |
| Monitor IT | | | | | | | | | | | | |
| Respond to IT Situation | | | | | | | | | | | | |
| etc. | | | | | | | | | | | | |

INTEGRATED APPLICATION/INFORMATION/SYSTEMS MANAGEMENT ARCHITECTURE (VALUE STREAM ENABLEMENT)

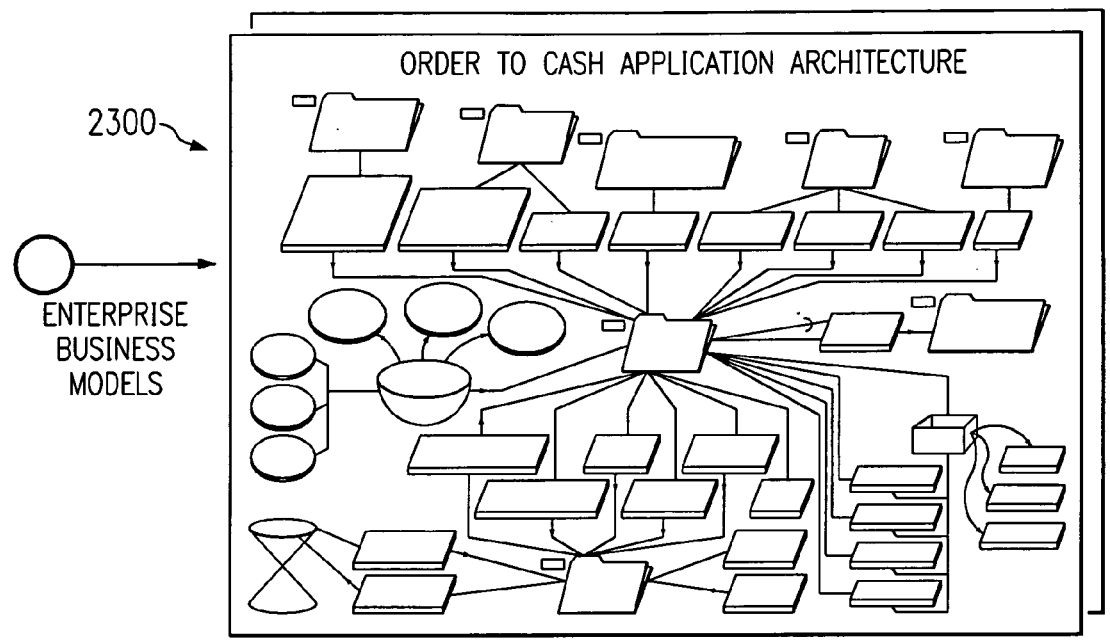

VALUE STREAMS ENABLED

| Aggregate Value Streams | Value Streams |
|---|---|
| Future Building | Insight to Strategy |
| | Vision to Engineered Enterprise |
| | Discovery to Proven Capability |
| | Plan to Business Results |
| | Relationship to Partnership |
| Customer Facing | Prospect to Customer |
| | Order to Cash |
| | Manufacturing to Distribution |
| | Service to Delivery |
| Business Enabling | Forecast to Plan |
| | Requisition to Payables |
| | Aquisition to Obsolescence |
| | Financial Close to Reporting |
| | Resource Expectation to Predictable Results |
| | Policy to Compliance |
| | Arbitration to Settlement |
| People Caring | Awareness to Prevention |
| | Recruitment to Retirement |

*FIG. 23*

ENTERPRISE APPLICATION SOFTWARE PORTFOLIO (INTEGRATION MATRIX)
ENTERPRISE INFORMATION/APPLICATION/SYSTEMS MANAGEMENT SOFTWARE PORTFOLIO (INTEGRATION MATRIX)

| Value Streams/ Workflow Scenarios | Business Software Applications | | | | | Business Intelligence Software Applications | | | | Systems Management Software Applications | | |
|---|---|---|---|---|---|---|---|---|---|---|---|---|
| | App1 (Sales) | App2 (FI/CO) | App3 (IM) | App4 (GW) | App5 (EIS) | App6 (DIS) | App7 (GIS) | App8 (Data Mining) | App9 (Perf) | App10 (Security) | App11 (Networks) | App12 (Backup) |
| Application Architecture | | | | | | | | | | | | |
| Order to Cash | | | | | | | | | | | | |
| Prospect to Customer | | | | | | | | | | | | |
| Policy to Compliance | | | | | | | | | | | | |
| etc. | | | | | | | | | | | | |
| Information Architecture | | | | | | | | | | | | |
| Profitability Analysis | | | | | | | | | | | | |
| Consumer Intelligence | | | | | | | | | | | | |
| Operating Efficiency | | | | | | | | | | | | |
| etc. | | | | | | | | | | | | |
| Systems Mgmt Architecture | | | | | | | | | | | | |
| Set IT Service Expectation | | | | | | | | | | | | |
| Monitor IT | | | | | | | | | | | | |
| Respond to IT Situation | | | | | | | | | | | | |
| etc. | | | | | | | | | | | | |

LOGICAL LOCATION AND LOGICAL SOFTWARE COMPONENT MATRIX

| Logical Software Components | Logical Applications | 1. Mobile User | 2. Customers | 3. Customer Care Center | 4. Corporate Headquarters | 5. Regional Offices | 6. Field Sales Offices | 7. Warehouses | 8. Manufacturing Plants | 9. Partners, Providers and Suppliers |
|---|---|---|---|---|---|---|---|---|---|---|
| Human Resources | Personal Planning and Dev. |   |   | X | X | X | X |   |   |   |
| Human Resources | Personnel Administration | X |   | X | X | X | X | X |   |   |
| Financials | Financial Accounting |   |   |   | X | X | X |   |   |   |
| Financials | Capital Investment Management |   |   |   | X | X |   |   |   |   |
| Financials | Treasury |   |   |   | X | X |   | X |   |   |
| Enterprise Controlling | EIS/DSS |   |   |   | X | X | X | X |   |   |
| Enterprise Controlling | Controlling |   |   |   | X | X | X | X |   |   |
| Enterprise Controlling | Business Planning |   |   |   | X | X | X | X |   |   |
| Enterprise Controlling | Profit Center Accounting |   |   |   | X | X | X |   |   |   |
| Enterprise Controlling | Management Consolidation |   |   |   | X | X |   |   |   |   |
| Enterprise IT Management | Web Management |   | X | X | X | X | X | X |   |   |
| Enterprise IT Management | FAX Management | X | X | X | X | X | X |   |   |   |
| Enterprise IT Management | Security |   |   |   | X | X | X | X |   |   |
| Enterprise IT Management | IT Request Management |   |   |   | X | X | X |   |   |   |
| Enterprise IT Management | IT Systems Management |   |   |   | X |   |   |   |   |   |
| Office Automation | Email | X |   | X | X | X | X | X | X |   |
| Office Automation | Word Processing | X |   | X | X | X | X | X |   |   |
| Office Automation | Spread Sheet | X |   |   | X | X | X | X |   |   |
| Office Automation | PResentation | X |   |   | X | X | X |   |   |   |
| Sales Force Automation | Promaotions | X |   |   |   | X | X |   |   |   |
| Sales Force Automation | Prospect/Lead Tracking | X |   |   |   | X | X | X |   |   |
| Sales Force Automation | Sales Commission | X |   |   |   | X | X | X |   |   |
| Sales Force Automation | Boker Commission |   |   |   |   | X | X | X |   |   |
| Enterprise Customer Management | Customer Information | X |   |   |   | X | X |   |   |   |
| Enterprise Customer Management | Order Entry | X | X |   |   | X | X | X |   |   |
| Enterprise Customer Management | Call Management |   | X | X |   | X | X | X |   |   |
| Enterprise Customer Management | Service Management | X |   | X |   | X | X | X |   |   |
| Enterprise Customer Management | Complaint Management |   |   |   |   | X | X | X |   |   |
| Enterprise Customer Management | Cust Relationship Management | X |   |   |   | X | X |   |   |   |
| Operations | Product Planning |   |   |   | X | X |   |   | X | X |
| Operations | Production Planning |   |   |   |   |   |   | X | X | X |
| Operations | Product Configuration |   |   |   |   |   |   | X | X | X |
| Operations | Materials Mangement |   |   |   |   |   |   | X | X |   |
| Operations | Qualit Management |   |   |   |   |   |   | X | X |   |
| Operations | Plant Maintenance |   |   |   |   |   |   | X | X |   |
| Operations | Engineering |   |   |   |   |   |   |   | X |   |
| Distribution | Shipping |   |   |   |   |   | X | X |   | X |
| Distribution | Logistics |   |   |   |   |   | X | X |   | X |
| Distribution | Supply Chain Management |   |   |   | X |   | X |   |   |   |

2900

TECHNOLOGY INFRASTRUCTURE ARCHITECTURE "BEST PRACTICES" RECOMMENDATIONS

| IT Component | Design Standard(s) | "Benchmark" Product Set(s) Recommendation (for Requirements Definition) |
|---|---|---|
| Data Warehouse Server(s) | SMP Platforms with RAID 5 | Sequent, HP, SunSPARC, or equivalent |
| | 64-bit processors | |
| | PCI – SCSI-3 or Fibre Channel | |
| | OS – UNIX (POSIX)1003.1 | |
| Data Mart(s) | SMP Platform(s) with RAID 3 | HP, Compaq, SunSPARC, or equivalent |
| | 64-bit processors | |
| | PCI – SCSI-3 or Fibre Channel | |
| | OS – UNIX (POSIX)1003.1 | |
| Data Administration Platform(s) | 64-bit processors | HP, Compaq, SunSPARC, or equivalent |
| | PCI – SCSI-2 or SCSI-3 | |
| | OS – UNIX (POSIX)1003.1 | |
| TP Monitors | X/Open XA/XA+ | Tuxedo, Encina, or equivalent |
| | X/Open TxRPC | |
| | OS – UNIX (POSIX)1003.1 | |

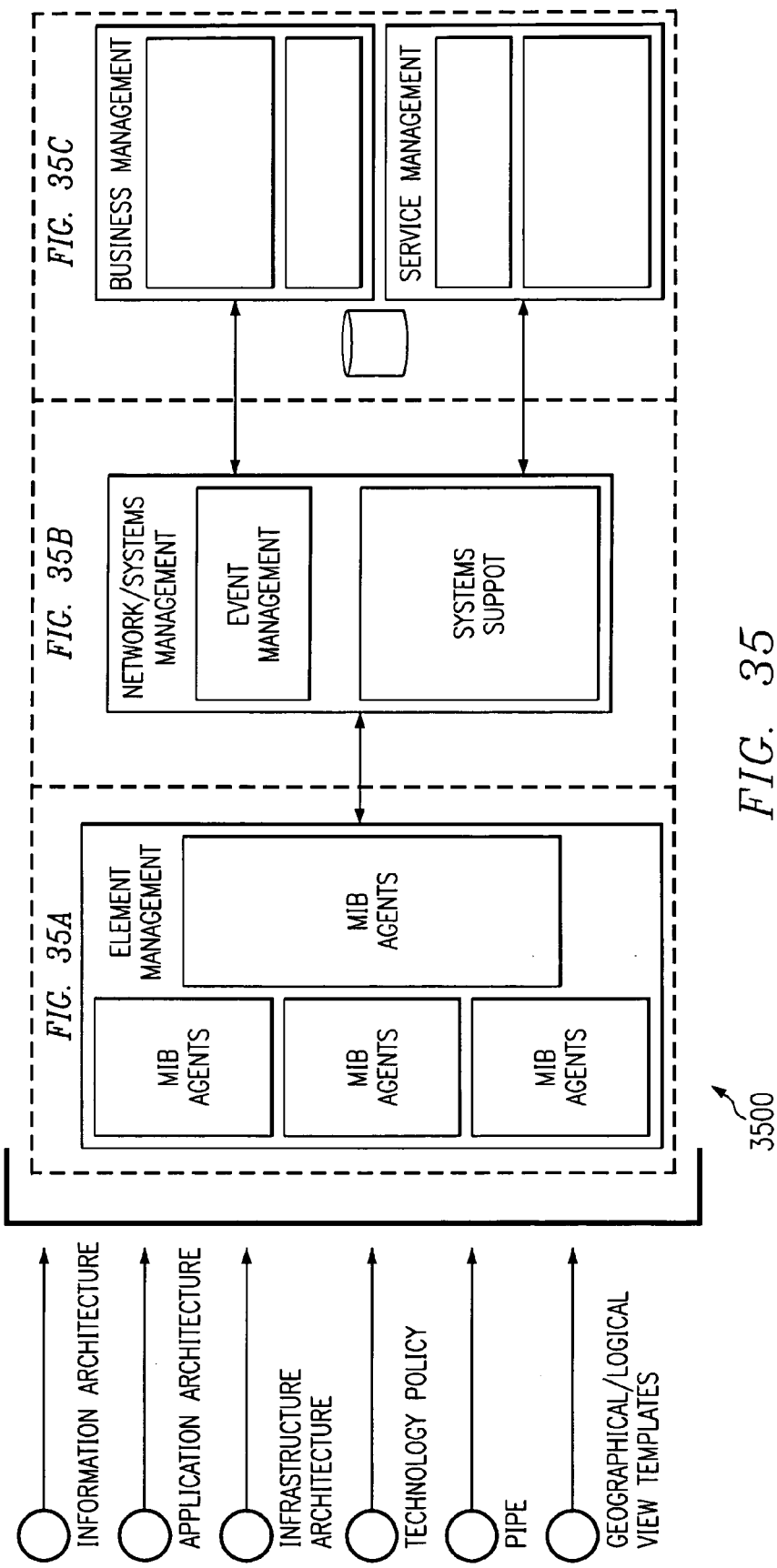

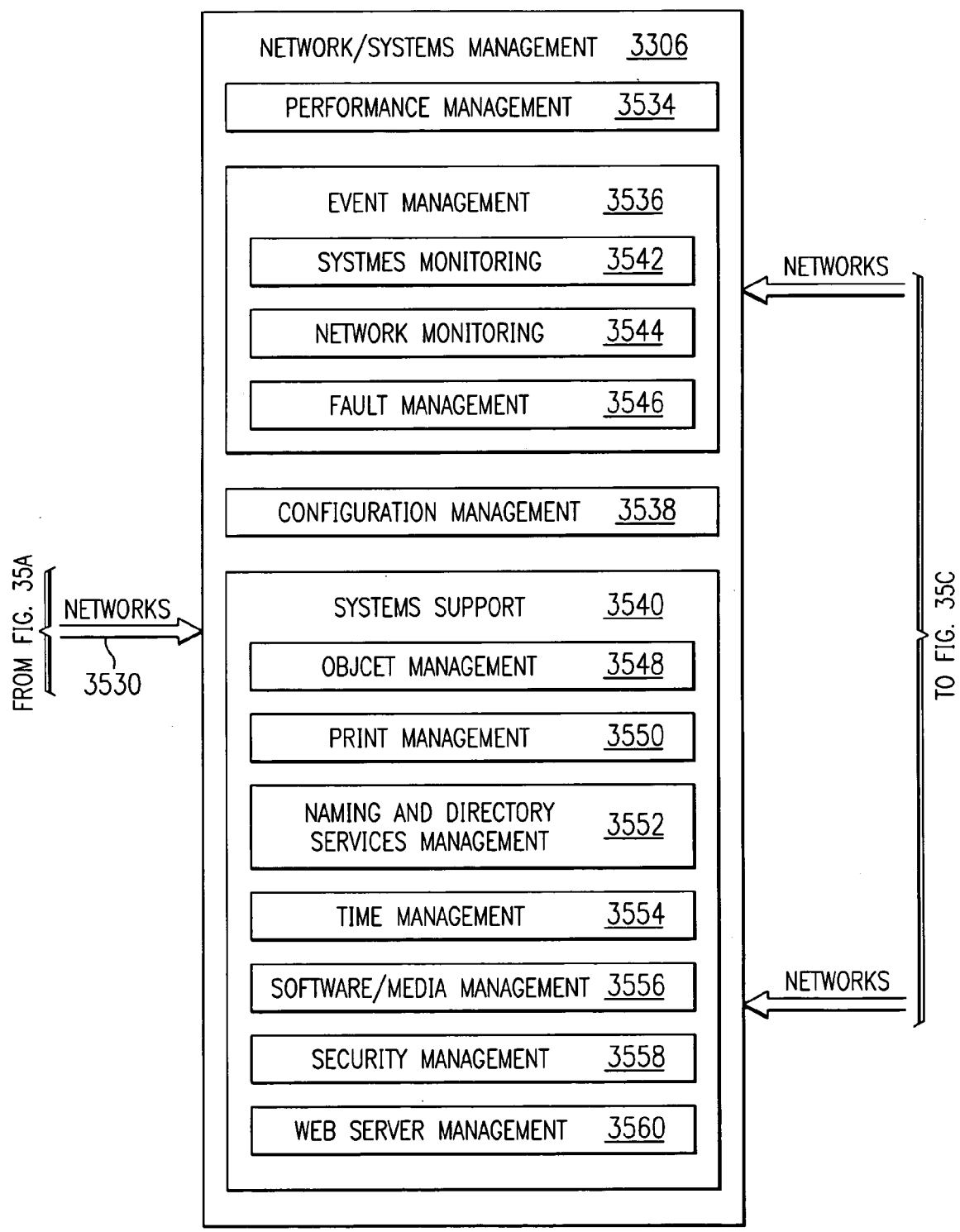

IT SYSTEMS MANAGEMENT APPLICATION SOFTWARE PORTFOLIO (INTEGRATION MATRIX)
ENTERPRISE INFORMATION/APPLICATION/SYSTEMS MANAGEMENT SOFTWARE PORTFOLIO (INTEGRATION MATRIX)

| Value Streams/ Workflow Scenarios | Business Software Applications | | | | Business Intelligence Software Applications | | | | Systems Management Software Applications | | | |
|---|---|---|---|---|---|---|---|---|---|---|---|---|
| | App1 (Sales) | App2 (FI/CO) | App3 (IM) | App4 (GW) | App5 (EIS) | App6 (DIS) | App7 (GIS) | App8 (Data Mining) | App9 (Perf) | App10 (Security) | App11 (Networks) | App12 (Backup) |
| Application Architecture | | | | | | | | | | | | |
| Order to Cash | | | | | | | | | | | | |
| Prospect to Customer | | | | | | | | | | | | |
| Policy to Compliance | | | | | | | | | | | | |
| etc. | | | | | | | | | | | | |
| Information Architecture | | | | | | | | | | | | |
| Profitability Analysis | | | | | | | | | | | | |
| Consumer Intelligence | | | | | | | | | | | | |
| Operating Efficiency | | | | | | | | | | | | |
| etc. | | | | | | | | | | | | |
| Systems Mgmt Architecture | | | | | | | | | | | | |
| Set IT Service Expectation | | | | | | | | | | | | |
| Monitor IT | | | | | | | | | | | | |
| Respond to IT Situation | | | | | | | | | | | | |
| etc. | | | | | | | | | | | | |

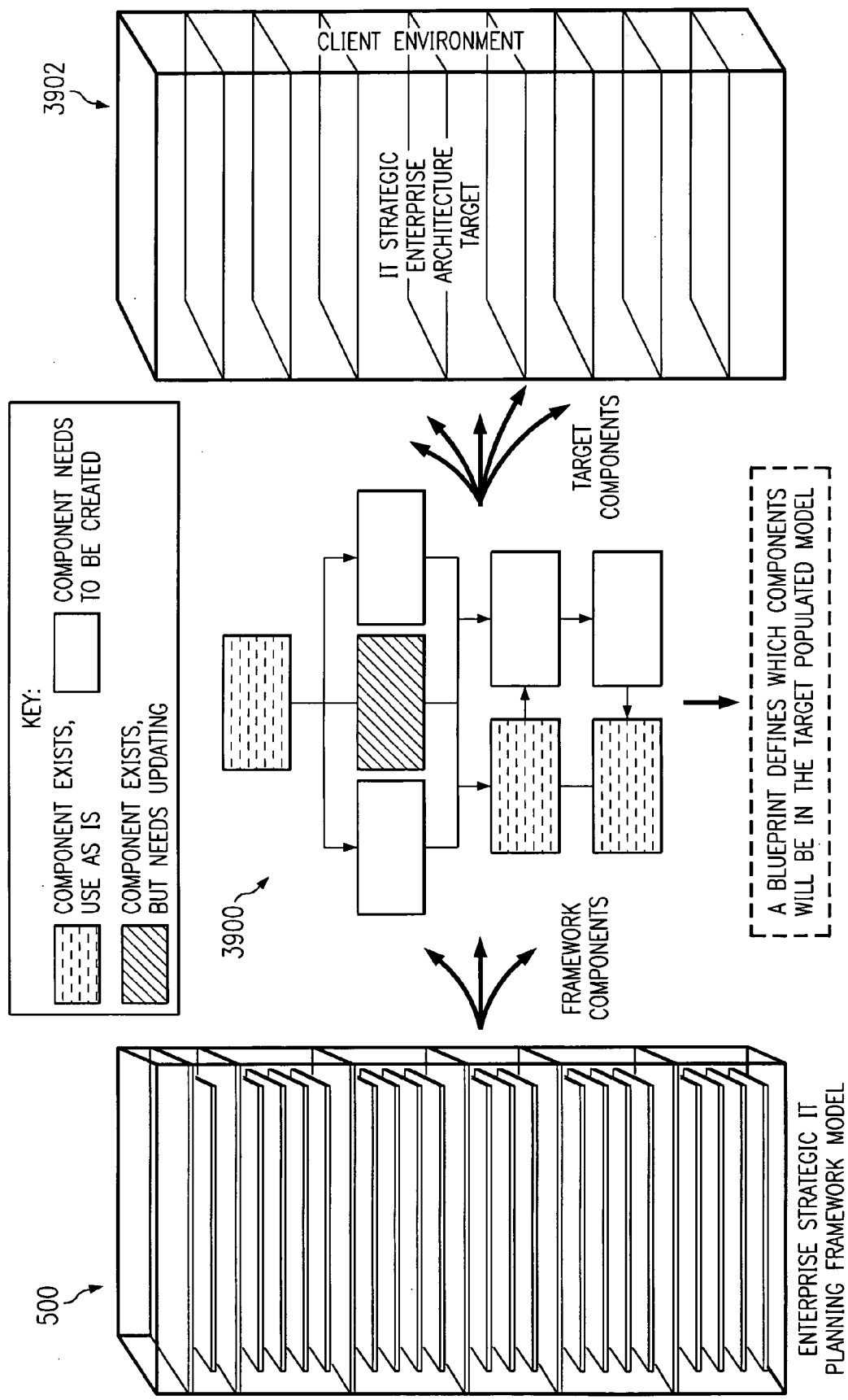

*Noun or Object*

*Frame*

*Pattern*

*Process*

*Sub process*

*Operation
(Execution
scenario)*

*Procedure*

*Content Rule*

*Interface Rule*

*Content Object*

*Content Abstraction*

*Create*

*Create*

*Manipulate*

*Use as information*

*Use as input*

*Use as a rule*

*Collaborating*

*Command*

*Cause*

*Cause to change,
Affect*

*Attribute*
FIG. 48A
*Absence of*
FIG. 48B
*Responsibility*
FIG.48C
*Procedure*
FIG. 48D
*Sub operation*
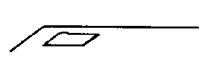
FIG. 48E
*Activity with content rule*
FIG. 48F
*Activity with interface rule*
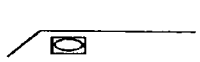
FIG. 48G
*Aligned*
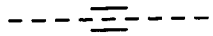
FIG. 49A
*Consistent*
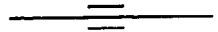
FIG. 49B
*Same*
FIG. 49C
*Implemented by, Partially implemented by*
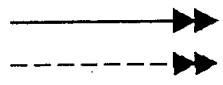
FIG. 49D
*Replaced by, Partially replaced by*
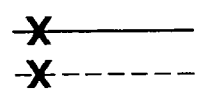
FIG. 49E
*Part of*
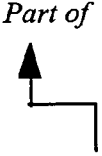
FIG. 49F
*Contained in*
FIG. 49G
*Kind of, Type of*
FIG. 49H
*Time line*
FIG. 50A
*Delay*
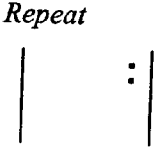
FIG. 50B
*Repeat*
FIG. 50C
*One or more*
FIG. 50D
*Only one*
FIG. 50E
*Any order*
( )
FIG. 50F

STRUCTURE AND METHOD OF MODELING INTEGRATED BUSINESS AND INFORMATION TECHNOLOGY FRAMEWORKS AND ARCHITECTURE IN SUPPORT OF A BUSINESS

TECHNICAL FIELD OF THE INVENTION

The present invention relates in general to business and information technology modeling techniques and in particular to a structure for and a method of modeling integrated business and information technology frameworks and architecture in support of a business.

BACKGROUND OF THE INVENTION

In order for a business enterprise to align and enable business resources, there must be an assessment, identification, construction, modification, enhancement, and integration of business and information technology components. However, most enterprises lack a basis from which strategic information technology planning approaches can be derived and developed to deploy requisite business and information technology components. Thus, a business is not able to ensure a successful information technology enablement of cross functional business processes into end-to-end activities. There is no mechanism or framework in the information technology (IT) industry for a foundation that provides essential integrated business and information technology reference models necessary for defining, constructing, or assessing an enterprise architecture. There is no common integrated, adaptive, or complete benchmark from which business and information technology processes and requirements can be assessed and developed. Therefore, it is desirable to provide a business with a foundation framework or structure that allows the business architecture to drive the technology architecture and also allow the technology architecture to have a direct impact on the construction of the business architecture through enablement or providing new and creative ways of conducting business.

SUMMARY OF THE INVENTION

From the foregoing, it may be appreciated that a need has arisen for an effective technique to model a business. In accordance with the present invention, a method and structure for modeling frameworks and architecture in support of a business is provided that substantially eliminates or reduces disadvantages and problems associated with conventional business and IT modeling techniques.

According to an embodiment of the present invention, there is provided a method of modeling frameworks and architecture in support of a business that includes identifying manageable entities of the business. An overall architecture for the business is determined that defines how the manageable entities relate to each other. The overall enterprise architecture is represented in a tower model with six fundamental components—strategic plan, business architecture, information architecture, application architecture, technology infrastructure architecture, and enterprise information technology management framework. Each fundamental component or plane in the tower model may include sub-planes to further define the architecture of the business enterprise. A common language is implemented in order to articulate the overall architecture. Technology requirements for the business are analyzed, planned for, and implemented according to the overall architecture.

The present invention provides various technical advantages over conventional business modeling techniques. For example, one technical advantage is to provide discipline for delivering repeatable and effective information technology enabling solutions to accomodate business needs. Another technical advantage is to promote integration of business and technology planning and establishing a technology strategy that both sustains and directs business efforts. Yet another technical advantage is to provide a common model for articulating the mandatory components of an enterprise architecture and the baseline for developing information technology planning and integration approaches. Still another technical advantage is to effectively manage a heterogeneous technology environment. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 6 illustrates an operating environment model for the enterprise business;

FIG. 9 illustrates a geo-structural view of the logical business location map;

FIG. 10 illustrates an information technology investment and expenditure profile;

FIG. 11 illustrates a client information technology and industry expenditure benchmark;

FIGS. 12A–12C illustrate the enterprise business frame with the external inputs and outputs and associated entities;

FIGS. 13A–13D illustrate value stream aggregates of the business' enterprise;

FIGS. 14A–14B illustrate a value stream event model and corresponding metrics;

FIG. 18 illustrates enterprise information and data management framework and precepts;

FIG. 22 illustrates an information application portfolio and system integration matrix;

FIG. 23 illustrates an example of an integrated application architecture for value stream enablement;

FIG. 25 illustrates an enterprise application software portfolio and system integration matrix;

FIG. 26 illustrates an example of application portfolio best practices recommendations;

FIG. 29 illustrates a logical location and logical software component matrix;

FIG. 32 illustrates an example of technology infrastructure architecture best practices recommendations;

FIGS. 35 and 35A–35C illustrate a geo-structural component view for an information technology systems management architecture;

FIG. 36 illustrates an integration matrix for a systems management software portfolio;

FIGS. 38A–38B illustrate the enterprise information technology management organizational model;

FIG. 41 illustrates how a blueprint guides formation of target models;

FIGS. 48A–48G illustrate the symbols used for modifier notations used in VDL modeling diagrams;

FIGS. 49A–49H illustrate the symbols used for preposition notations used in VDL modeling diagrams;

FIGS. 50A–50F illustrate the symbols used for conjunction notations used in VDL modeling diagrams.

DETAILED DESCRIPTION OF THE DRAWINGS

Strategic Planning

Strategic planning provides the context and guidance that drives the definition of business functions, processes, systems, and organization. It is the process of defining the vision, mission and long term objectives for a business and the strategies for achieving them. The strategic planning process determines the actions and the allocation of the resources to meet those objectives. The resulting strategic plans allow the enterprise to effectively use its time, resources, intellectual capital and experience and transition from a current state to a new way of conducting business. In this document two enterprise planning processes are of major interest because of their direct correlation and inter-dependencies. First is Strategic Business Planning, which is the process of defining the mission and long-term objectives for the business and the strategies for achieving them. Second is Strategic IT Planning, which is the process of defining frameworks and architectures in support of the business, and creating the plan for implementing those frameworks and architectures. Although the focus is on IT planning, the output of the strategic business planning process, the business plan, is what drives and must always be considered in the creation of a successful IT plan. Through the use of a Strategic IT Planning Framework Tower, an enterprise will have the appropriate strategic information frameworks guiding the appropriate technology direction necessary to effectively implement the organization's business direction.

Figure 1:
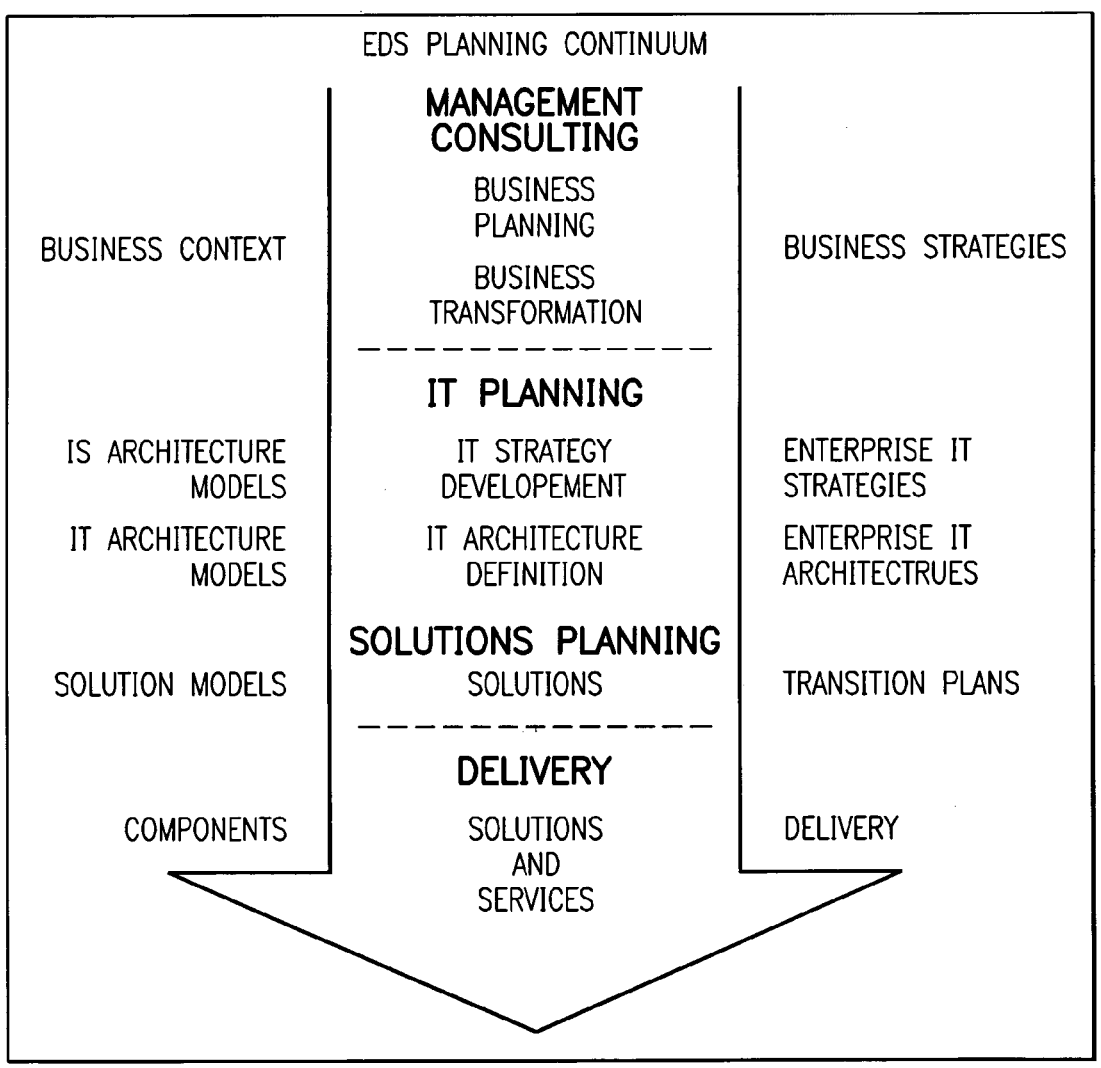
FIG. 1 illustrates a planning continuum showing the intermediate steps from a business strategy to deliver information technology.

FIG. 1 is a high level diagram illustrating a full planning continuum 1000 from business strategy through IT strategy to IT solutions delivery. IT planning is an integral part of that continuum. In today's dynamic business environment, it is critical to make accurate and timely decisions about what technology to invest in, when change should occur, and what value the business will receive by implementing a new technology paradigm. To insure that these decisions are reasonable, the IT strategic planning process and deliverables need to be driven and guided by the business context within which the enterprise will reside.

Figure 2:
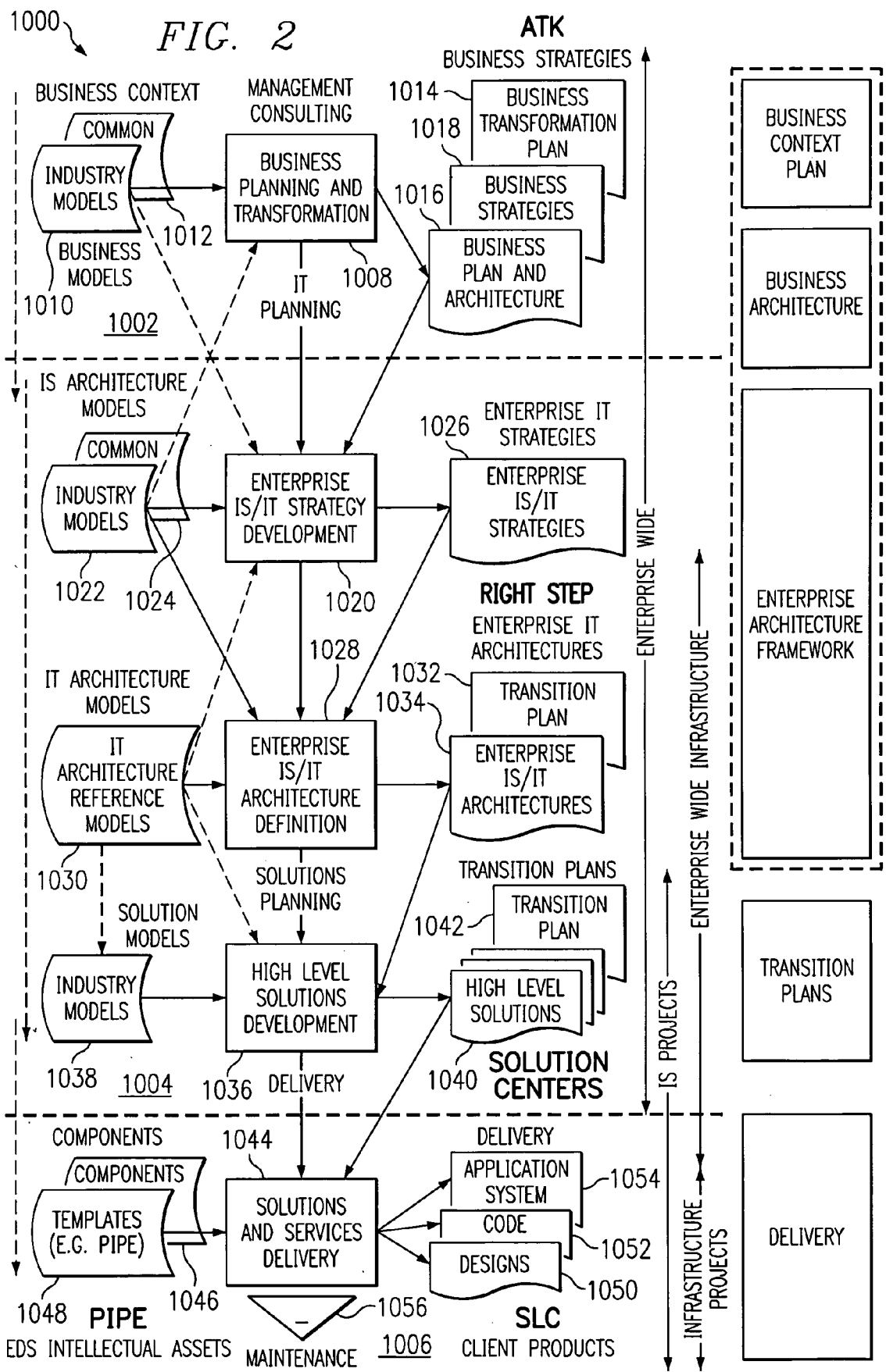
FIG. 2 illustrates the planning continuum in more detail showing inputs, outputs and relationships.

FIG. 2 maps to the high level diagram of FIG. 1 and shows the range of business activities from business planning and process improvement through to the delivery and management of IT solutions to support the business processes. The boxes on the left hand side represent intellectual capital in the form of models and template solutions. The boxes on the right hand side represent the products delivered to a client and are the major components of an IT plan. The process thread running down the diagram illustrates how the activities and inputs and outputs relate to each other. The bars on the right of the diagram depict the scope of activities provided by various organizations and approximate the rudimentary composition of the Strategic IT Planning Framework Tower model. The Enterprise Strategic IT Planning Framework Tower model in conjunction with a suite of IT planning services fills the gap between management consulting and the delivery of IT solutions. The following sections cover the concepts behind the Enterprise Strategic IT Planning Framework Tower and the use of the framework components to provide strategic IT planning.

In FIG. 2, planning continuum 1000 flows from management consulting 1002 through IT planning 1004 to delivery 1006. In the management consulting 1002 phase, business planning and transformation 1008 is performed in response to business context industry 1010 and common 1012 business models and business strategies such as a business transformation plan 1014, business plan and architecture 1016, and other business strategies 1018. Information developed during the management consulting 1002 phase is used to drive enterprise IS/IT development 1020 in the IT planning 1004 phase. Enterprise IS/IT strategy development 1020 reacts to inputs from IS architecture industry 1022 and common 1024 models in order to drive enterprise IS/IT strategies 1026. From strategy development and strategies themselves, an enterprise IS/IT architecture definition 1028 is determined based on IT architecture reference models 1030. Enterprise IS/IT architecture definition 1028 aids in generating transition plans 1032 and enterprise IS/IT architectures 1034 in order to drive high level solutions development 1036. High level solutions development 1036 is based on solution models 1038 and results in high level solutions 1040 and transition plans 1042 for their implementation. Once high level solutions 1040 are generated, solutions and services delivery 1044 is performed based on components 1046 and templates 1048. Deliverables include designs 1050, code 1052, and application systems 1054. Following delivery, a maintenance function 1056 is set up for the deliverables.

Strategic IT Planning

Strategic IT planning is the process of modeling and defining frameworks and architectures in support of the business and creating the plan(s) for implementing those frameworks and architectures. Strategic IT planning is defining, not designing. A strategic IT plan does not design systems, databases, or networks. The design and implementation work is initiated after the definition process has been completed. Based on this premise, a process for defining the frameworks and requisite architectures and their use is demonstrated. In order to convert the initiatives from an enterprise strategic business plan into manageable and implementable results, three things must occur. First, complexity is decomposed into manageable units. Second, architectures and frameworks are built that can be used to model the business and the enabling IT. Third, a common language is decided upon and used to articulate the frameworks and architectures.

First, the enterprise is broken down into manageable entities or components. Just like an airplane can be decomposed into its separate parts using a bill of materials which is a list of products and specifications that describe the product elements, characteristics, and sometimes assembly requirements, the same can be done for an enterprise. A decomposed enterprise needs to be defined so it can be understood within the context of the whole and detailed enough to be analyzed for change, sourcing, and assembly, just like the bill of materials for an airplane. Not only does this enable various teams and organizations to develop processes for transforming inputs into outputs, but also better enables IT to support the transformation.

Second, there is a need for an overall architecture (or framework) to describe how all the parts (or organizational components) fit together and how each part relates to one another. Therefore the architecture of the enterprise is the true enabler of any activity, process or function. If an essential architectural component is not found in the enterprise (or addressed in an outsourcing agreement), associated activities, processes and functions cannot be completed.

Finally, there must be a common language or way to communicate in clear and precise terms that all parties involved will understand. Not one language for the sales people, and another for the back office people, and another for the IT people, but one that all understand and from which all other models and architectures are derived. This common language is not the lowest common denominator, but rather a significant step up in learning how to communicate in objective graphical models.

Having fulfilled these needs and using the models developed of the enterprise, understanding and implementation of the initiatives can begin. In addition to providing boundaries, enterprise models represent the common repository of data, information, and knowledge about the enterprise. The graphical representations precisely describe the enterprise in clear and understandable terms. The scope of the models is four dimensional considering functional activities within a department, cross-functional activities within the company, customer and supplier activities, and finally, competitor activities such as "time to market." This holistic view and understanding enables IT alignment with the enterprise and its objectives and goals.

From these models that the current state of the enterprise is analyzed from which IT architectures and frameworks and a transition plan to the future state can be developed. The models also allow decomposition of the enterprise into manageable and understandable units, thereby reducing complexity. It is from this decomposition that effectiveness, efficiency, and adaptability are designed and optimized by the enterprise. However it must be understood that no single model or decomposed unit provides the "silver bullet" solution for the enterprise. The synthesis of information from the integrated business and IT models provide the "links" which unite the enterprise into a holistic entity, thereby aligning a complete enterprise strategy with people, processes and technology.

In giving definition and structure to the enterprise it is a basic tenet that no complex "system" can be optimum to all parties concerned and have all functions optimized. Consequently, architecting, or the development of an architecture or framework to control and delimit complexity, is a matter of fit, balance, and compromise of many factors and many interests. This is especially true in the development of a structure, or architecture, within which to build complex IT systems that will support and enable the business of the enterprise. A system can be considered to be a set of different elements connected or related in such a fashion as to perform a unique function not performed by the elements alone. The most important and distinguishing characteristic of a system, therefore, is the relationship among the elements. The definition of a system can be further refined and broken into basically two parts: as a complex set of dissimilar elements or parts so connected or related as to form an organic whole, and the whole is greater than the sum of the parts; that is to say, the system has properties beyond those of the individual parts. The purpose of building systems is to acquire those properties provided by the whole. As previously mentioned, the essence of systems is relationships, interfaces, form, fit, and function. Therefore the essence of architecting is structuring, simplification, compromise, and balance. The challenge is in the control, if not the reduction of complexity and uncertainty, and this must be reflected in the architecture.

The development of an architecture must be pragmatic as well. There must be an expansion or reduction of the problem at hand to a realistic, workable, and implementable, size and structure. The framework must dictate structures that are achievable. Experience provides the answer to why there is a need for architectures and frameworks. Enterprises with inadequate, poorly defined, and undocumented architectures are prone to high IT resource expenditures and have difficulty fitting system components together. That is to say, the pieces of a system do not fit and satisfy the intended function. The architecture makes the pieces fit, and facilitates the integration and resolution of structural conflicts. The architecture defines the whole. Serious difficulties arise when the number and nature of elements result in so many complex interfaces that what one subsystem does to the rest is no longer as simple as single inputs and outputs. In this case the relationships between function and form breakdown. The architecture, the creation of a framework or structure, brings order out of chaos, establishes system relationships, and acquires the desired properties of the whole.

As with modeling the business enterprise, an IT architecture can perhaps be best understood as a top-down description of the structure of the system. Therefore models can help in describing the structure. In this case a model is an abstraction of what the participants think and hope the end system and its environment will look like. By implying a great deal of internal structure, a model can communicate a wealth of information in a simple aggregated form. For example a model of a house is quickly understood by all parties, not only in its external shape, but also in its likely electrical, plumbing, and heating systems, its living space, and its relationship to its surroundings. The best architecture is based on the complete submission of the individual parts to the purpose or function of the whole. "Form follows function" becomes a guiding principle. Successful systems can be developed following an architecture that is driven by function instead of form. However it should be noted that successful architectures evolve slowly, and are not created with such detail that they stifle innovation. If an architecture is over defined, the builders will have no choice or flexibility other than to "build to print". That is to say, with too much specificity the system developer or implementer will not have the option to improve or adjust the design to meet changing business environmental demands or technological change.

To simply take what currently exists and try to make it work together in most cases is not realistic, pragmatic, nor will it meet the business needs of an organization. No builder or system developer can remedy a fundamentally flawed concept. However given a sound architectural foundation, success can be realized and will only be contingent on the skill of the builder and the engineers. Finally, enterprise models and IT architectures and frameworks without a plan accomplish little or nothing, never reaching implementation. Therefore strategic IT planning is tantamount to success if anything is to be accomplished in an orderly, efficient, and effective manner in support of the business needs of the enterprise.

The following points summarize the intent and value of enterprise strategic IT planning:

An Enterprise Strategic IT Plan and its implementation will provide the framework and process for defining the vision, mission, and long term objectives for IT and aligning them with the business; define the strategies for achieving them, and define the architecture to enable them. The IT Plan also provides the context and guidance that drives the definition of integrated business and IT systems (in support of business processes and functions), organization structure, and IT solution sets for products and services. The IT Plan determines the actions and parameters for the allocation of resources to meet the objectives. The IT Plan allows for a deliberate, prioritized, planned, and effective utilization of an enterprise's investment in time and resources.

Enterprise Framework

As previously mentioned, strategic IT planning is the process of modeling and defining frameworks and architectures in support of the business and creating the plan for implementing those frameworks and architectures. It must be reemphasized that strategic IT planning is defining, not designing. Therefore, in order to define all of the necessary IT frameworks and architectures in a consistent and repeatable fashion and to insure that all of the mandatory and appropriate components of a comprehensive enterprise IT plan are present, a planning framework and model must be defined and used.

The Enterprise Strategic IT Planning Framework Tower is the primary vehicle through which architectural information is communicated. The use of the Tower model, the concepts behind the makeup of the model, and the concept of the blueprints and work patterns that together can be used to produce strategic IT plans and technology architectures that support the business needs of a corporation will be demonstrated. The Tower is the starting point for determining the context and the foundation components and elements needed to build a strategic IT plan, enterprise architecture, architecture components, and enabling IT solutions and strategies for an enterprise. The components and elements identified in the Tower help planning practitioners to effectively analyze and evaluate technology requirements, put them in the proper business context, and ensure that due consideration is given to all of the business and technology components necessary to address and support business drivers and modernization requirements.

The Tower also provides the baseline against which a business can measure their current environment and initiatives to ensure they are working with and within a comprehensive framework for the design, engineering, acquisition, and deployment of technology-enabled solutions to meet specific business goals. The specifications, or "building codes", for some of the technical component architecture are found in a Technology Policy which covers the governance of standards and design guidelines. Tower blueprints dictate the assemblage of framework model components for the construction of desired deliverables such as a strategic IT plan. The framework components indicated in the blueprint are then incorporated into an approach and consequently processed through work patterns using various methodologies and techniques to produce a customized strategic IT plan, enterprise architectures, or other deliverables. It is in the work patterns that the prescription and execution of approaches, methodologies, processes, techniques, and tools for developing the specific deliverables are determined and take place. A suite of approaches and work patterns deliver strategic IT plans and other associated deliverables.

Figure 3:
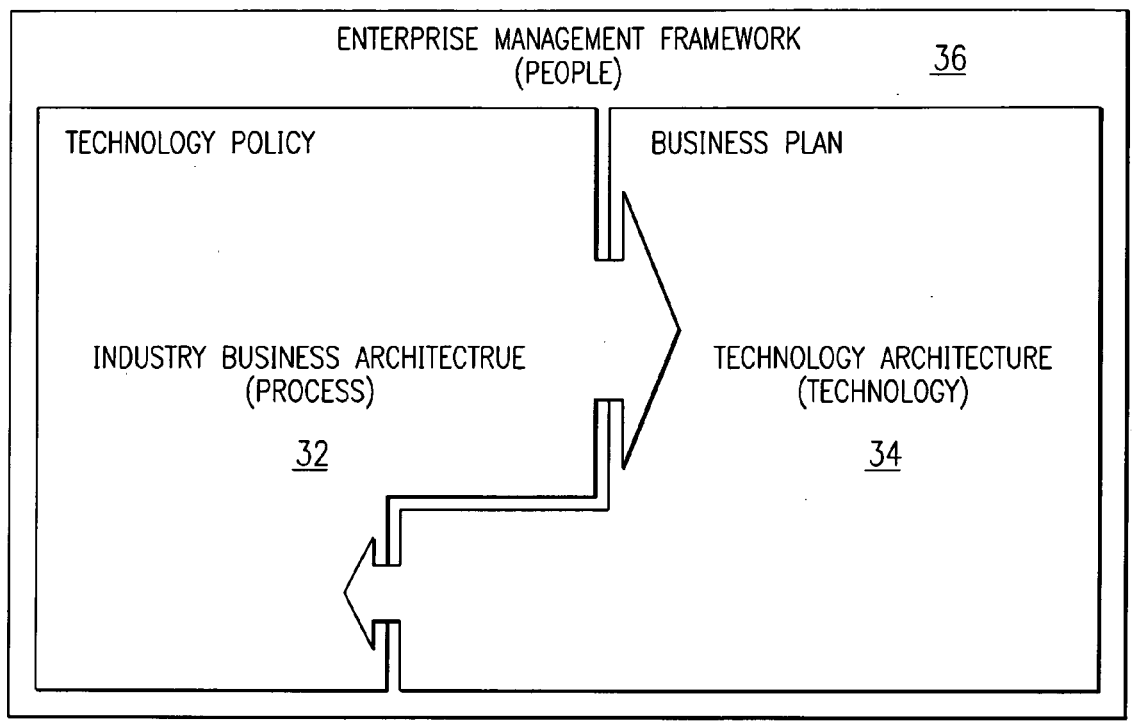
FIG. 3 illustrates a simplified block diagram of an enterprise architecture for a business, and how business and IT interrelate.

In order to develop a comprehensive enterprise strategic IT plan and the requisite enterprise architecture 30 for an organization, two types of architectures must be considered together: the business architecture 32 and the information technology architecture 34, as shown in FIG. 3. The combinations of these two elements make up the enterprise architecture to include an enterprise management framework 36, as shown in FIG. 3 that allows for the management of the two architectures. The business architecture is the main driver for the IT architecture but the IT architecture can also have an impact on the construction of the business architecture through enablement or providing new and creative ways of conducting business, for example, the internet.

Figure 4:
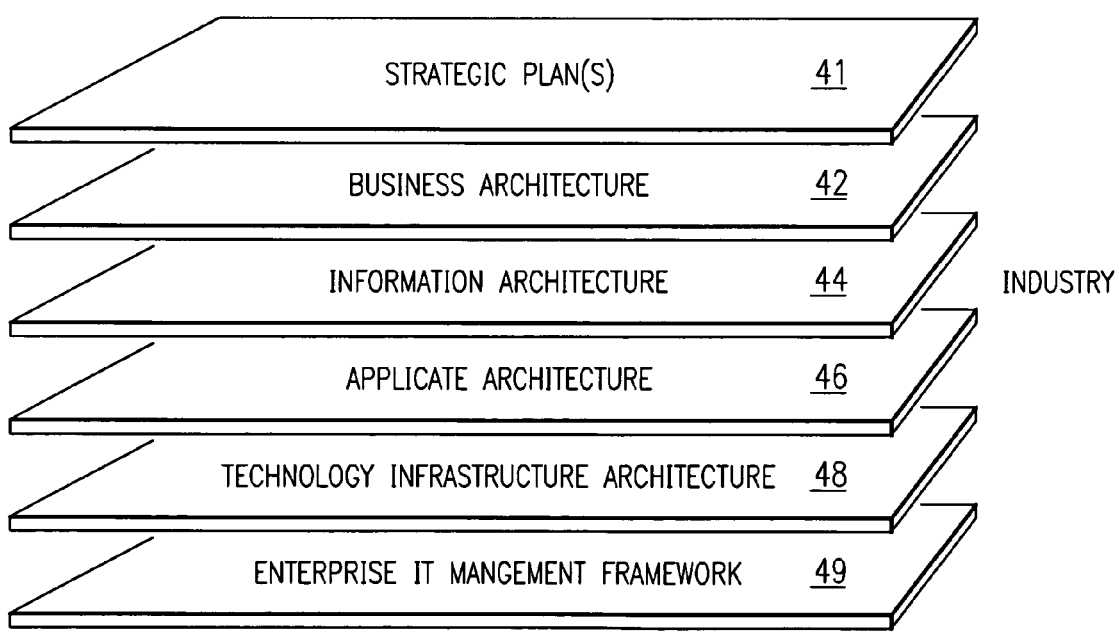
FIG. 4 illustrates fundamental strategic information technology planning framework components.

In order to build client-specific or unique enterprise architectures and ensure that all of the mandatory tenets, processes, components, and elements are present and placed in the proper context, there must be a framework to work within. The framework is built around the essential, mandatory components of an enterprise architecture and addresses people, processes, and technology. The decomposition of the enterprise architecture can be represented by a model made up of six fundamental components 40, depicted as planes shown in FIG. 4 These components make up an enterprise architecture, and include both the business and IT architectures. Each plane represents a mandatory component in enterprise architecture 30 and must be addressed in a strategic IT plan. The intent of the planes is not to imply a sequential flow but to help easily identify and categorize requisite architectural components and their elements. However it should be understood that there are requisite relationships between components and elements though not depicted by this particular model.

For enterprise strategic IT planning and enterprise business and IT architecture development, each component of the framework contains the requisite elements (sub-components). Addressing these elements not only makes each component complete, but also allows a "hard link" to be established to other components in the framework. The components contain everything deemed necessary for completeness—both on the business side as well as the IT side. The following is a high level overview of the content of the fundamental components:

Strategic Plan(s) 41—Every enterprise should have at least six types of strategic plans: Business Plan, Product Plan, Financial Plan, Organization Plan, Marketing Plan, and IT Plan. The plans provide the context and guidance that drive the definition of business functions, processes, systems, and organization. Strategic business planning is the process of defining the mission and long-term objectives for the business and the strategies for achieving them. The IT plan defines and guides the technology enablement of the business and related plans. In both of these plans are the executable roadmaps for implementation and deployment of the plans.

Business Architecture 42—reflects a view of what the business must do today as well as in the future to accomplish particular business requirements. The business architecture defines the business organization structure, IT investment and expenditure profile, functions, business process architectures (value streams), workflow scenarios, and the enterprise operating environment within which they all exist.

Information Architecture 44—represents what information must be delivered to individuals across the enterprise to help them effectively execute the business processes and make informed decisions. This plane contains the information and data management framework and precepts, the business intelligence component processes, the geo-structural view of information specific technology deployment, and the information-application software portfolio.

Application Architecture 46—serves to support business process execution (value stream enablement) and bring information and data to the process. The application architecture defines the application software portfolio and integration relationships. Application inputs and outputs are identified as well as the application geo-structural view for deployment. Guiding principles, standards, and design characteristics support the acquisition as well as development and integration of applications.

Technology Infrastructure Architecture 48—defines the IT components necessary to enable access to information and provide support for the execution of activities. This plane contains the standards and policies or "building codes" for technology infrastructure construction. This plane also contains a characterization of the target environment, and identification and views of the future geo-structural layouts with IT platform requirements and characteristics that will provide the basis for engineering blueprints.

Enterprise IT Management architecture 49—deals with the business and organizational management of providing IT services and products, the management of the services, IT systems and network management, to include security, as well as element management. This layer also encompasses the enterprise IT management organization capabilities, competencies, skills and performance models necessary to implement the desired culture and behaviors.

Figure 5:
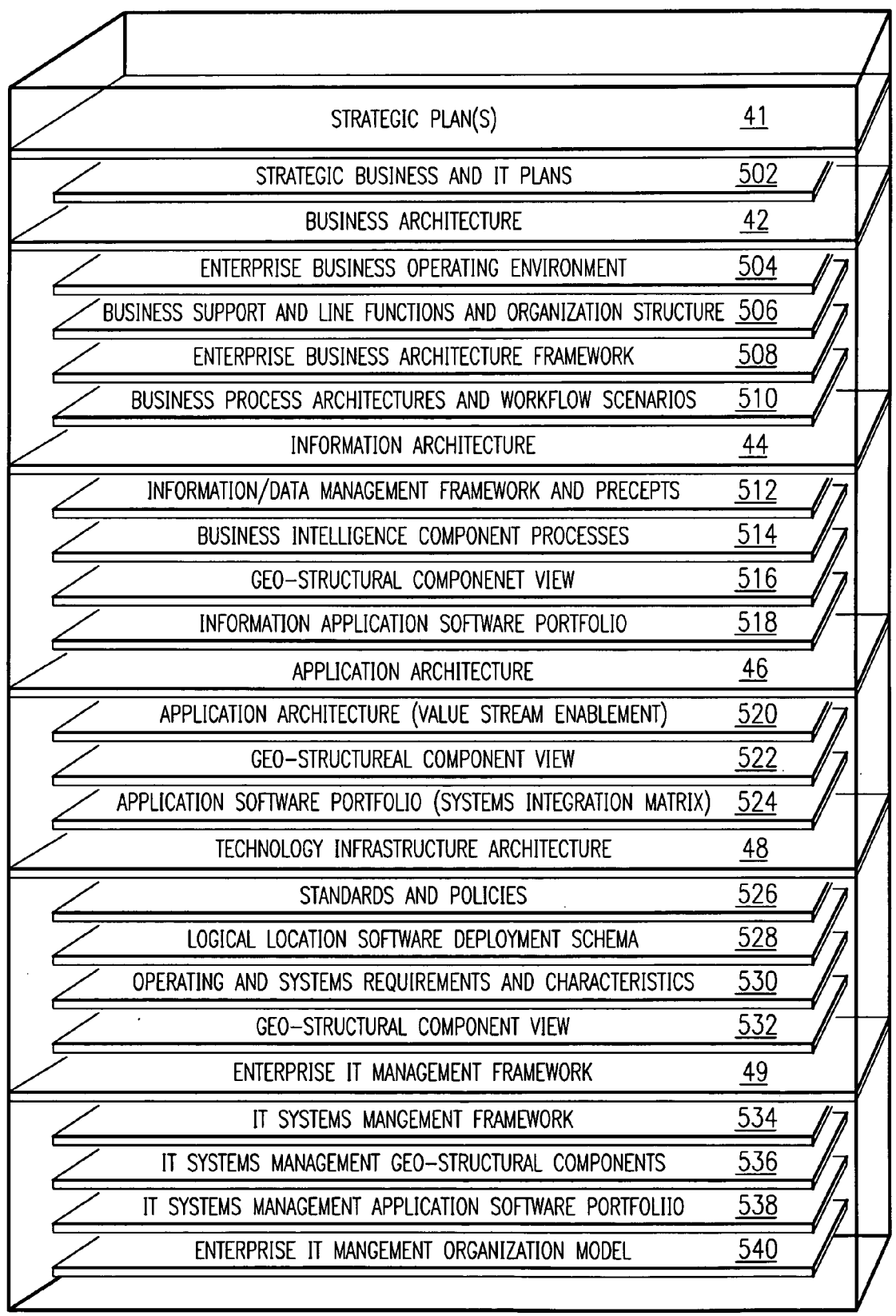
FIG. 5 illustrates an enterprise strategic information technology planning framework tower model.

FIG. 5 shows the Tower model 500 and graphically depicts the decomposition of the mandatory components (depicted in gray) into sub-planes. A sub-plane is a convention to clarify and detail the element content of a mandatory component. For example, a business architecture is typically composed of those elements associated with: an enterprise business operating environment, business support and line functions and organization structure, an enterprise business framework of architectures, and business process architectures (value streams) and workflow scenarios, hence four sub-planes.

In FIG. 5, Tower model 500 includes the mandatory components and their sub-planes. For the strategic plan 41 component, there may be a strategic business and IT plans 502 sub-plane. For the business architecture 42 component, there may be enterprise business operating environment 504, business support and line functions and organization structure 506, enterprise business architecture framework 508, and business process architecture and workflow scenarios 510 sub-planes. For information architecture 44, there may include information/data mangement framework and precepts 512, business intelligence component processes 514, geo-structural component view 516, and information application software portfolio 518 sub-planes. Application architecture (value stream enablement) 520, geo-structural component view 522, and application software portfolio (systems integration matrix) 524 sub-planes may be a part of application architecture 46. Standards and policies 526, logical location software deployment scema 528, operating and systems requirements and characteristics 530, and geo-structural components view 532 sub-planes may be included in technology infrastructure architecture 48. Enterprise IT management framework 49 component may include sub-planes of IT systems management framework 534, IT systems management geo-structural components 536, IT systems management application software portfolio 538, and enterprise IT management organization model 540.

The following describes how the Enterprise Strategic IT Planning Framework Tower model is interpreted and consequently used to create a strategic IT plan. The systematic process of modeling the enterprise through the development of succinct business process and IT architecture models in support of an enterprise's business architecture is described in each description of the Tower model components. The enterprise business architecture is based on a framework comprised of a series of business process models that integrate the numerous business processes into a series of workflow activities that collectively are called value streams. The value streams produce specific results for a customer based on business goals, objectives, critical success factors, and performance metrics.

The concept for strategic IT planning outlined in this section is based on the premise that there are six fundamental and mandatory enterprise architecture components in every enterprise. The six enterprise architecture components are developed to portray a strategic view of the business while identifying what and where enabling technology should be deployed within business processes. The architecture components are intrinsically linked and are mutually supportive of each other for modeling the enterprise. As previously discussed, the six mandatory architecture components shown in the Enterprise Strategic IT Planning Tower model of FIG. 5 are: Strategic Plans, Business Architecture, Information Architecture, Application Architecture, Technology Infrastructure Architecture, and Enterprise IT Management Framework. The concepts and rationale behind each of the architecture component planes of the Enterprise Strategic IT Planning Framework Tower will be discussed and developed in the following sections.

The reference models that are contained in each of the component layers are an "icon" or symbol shorthand that represent graphically a great deal of content that can be found in the methodologies, processes, industry models, and intellectual capital. The models in and of themselves are not as important as the implied content behind them. The models are only representative in nature and will vary for each enterprise as to depth and actual content. However, there are certain essential ogjectives of each model that must be satisfied and will be discussed for each model.

Based on the framework Tower, a strategic IT plan will achieve the following IT planning objectives. An organization's business architecture for aligning IT with the business will be addressed. An information architecture for operational needs and establishing business intelligence within a corporation for managing itself, conducting economic analysis, and developing business scenarios for expansion or establishing new business activities for competing in the marketplace will be provided. An application architecture that enables and supports business processes (value streams), and ensures that the business operations within the corporation have been fully integrated and optimized for efficiency and effectiveness will be defined. A technology infrastructure architecture in support of the information, application, and enterprise IT system management architectures will be developed. An integrated enterprise system management approach and IT organization framework for ensuring the reliability, availability, and service consistency of a organization's enterprise information system in support of its business operations and services, including extensions to customers, partners, and suppliers will be defined.

Strategic Plans

Definition:

Strategic plans provide the context and guidance that drive the definition of business functions, processes, systems, and organization. Strategic plans define the mission and long range objectives for conducting the business, and the strategies for achieving them. In addition they determine the actions and allocation of resources to meet strategic objectives, allowing for the effective utilization of an organization's investment in time and resources. Each strategic plan serves a specific and useful function. Every enterprise should have at least six fundamental types of strategic plans—Business Plan, Product Plan, Financial Plan, Organization Plan, Marketing Plan, IT Plan Purpose:

Strategic business planning is the process of defining the mission and long-term objectives for the business enterprise and the strategies for achieving them. The strategic IT Plan defines and guides the IT enablement of the business and related plans. The executable roadmaps for implementation and deployment of the strategic plans would normally be found in a business transformation plan (part of the Business Plan) and an IT transition plan (part of a strategic IT Plan).

Elements:
  Business Plan:
    Vision
    Objectives
    Critical success factors
    Business Strategy (integrated)
      Market segment
      Products and services
      Operating Principles (guiding principles)
      Distribution channels
      Operations (management)
      Organization
      Science and Technology Strategy
        Modernization drivers
        Information Management Precepts
        Technology Guiding Principles
    Financial Strategy
    Business Transformation Plan
  Product Plan
  Organization Plan
  Financial Plan
  Marketing Plan:
    External factors, drivers
    Industry trends and "best practices"
    Market analysis
    Competitive analysis
    Performance gaps
    Brand positioning and Identity
    Advertising and Promotion
  IT Plan
    Business Context
    Enterprise IT Architecture(s)
    Technology Policies
    Transition Plan Dependencies:
  Strategic Business Plan:
    Business Vision Statement
    Business Goals and Objectives
    Critical Success Factors
    Science and Technology Modernization Drivers
    Business Performance Metrics
    Business Information Management Precepts
    Business Intelligence Precepts
    Business Operating Principles
    Logical Business Organization Structure Rationale:

Strategic plans provide the context and guidance that drive the definition of business operations, functions, processes, systems, and organization.

Discussion:

Strategic business planning is the process of defining the mission and long-term objectives for the business enterprise and the strategies for achieving them. The strategic business plan consists of the following essential elements: vision, objectives, critical success factors, integrated business strategy, market assessment, products and services, operating principles, distribution channels, operation, organization, science and technology strategy, modernization drivers, information management precepts, technology guiding principles; financial strategy, business transformation plan, The strategic IT Plan defines and guides the IT enablement of the business and related plans. The executable roadmaps for implementation and deployment of the strategic plans would normally be found in a business transformation plan (part of the Business Plan) and an IT transition plan (part of a strategic IT Plan). An organization's business architecture is formulated in support of the enterprise strategic business plan(s) by developing enterprise value streams of "How a Corporation Wants to Operate in the Future", and what factors must be considered. It is from the business plans and business environments that the IT drivers are derived and the corporate direction is indicated.

Business Architecture

Definition:

A Business Architecture reflects an enterprise view of what the business must do today as well as in the future to accomplish particular business requirements. This view is based on the business context and the guidance provided by strategic business plans. The business architecture defines the business organization structure, IT investment and expenditure profile, functions, business process architectures (value streams), workflow scenarios, and the enterprise operating environment within which they all exist. It is the business context and business architecture that will provide the rationale for the future enterprise IT architecture baseline and development.

Purpose:

The business architecture provides an operational overview of the enterprise business functions and their supporting processes (value streams). The business architecture will be used for understanding and assessing the business processes to effectively identify how information technology can enable an enterprise to meet its business objectives. The enterprise business operating environment provides a high level overview of the environment for designing an enterprise business and IT architecture. This characterization allows for designing the logical enterprise business and IT architectures and understanding the enterprise information and systems environment, defining the geographical requirements for the information, application, infrastructure, and IT systems management architectures, and developing a business and information technology alignment perspective Elements:
    Business Drivers
    Business Enterprise Model
    Business Function Process Model
    Logical Location Model(s)
    IT Investment and Expenditure Profile
    Enterprise Business Framework of Architectures
        Enterprise Business Frame—external input/output aggregate
        Value stream aggregates
        Value Stream(s) Architecture Models:
            Event model
            Process architecture(s)
            Environment models Process workflow scenarios Dependencies:
    Strategic Business Plan:
        Business Vision Statement
        Business Goals
        Business Objectives
        Critical Success Factors
        Science and Technology Modernization Drivers
        Business Performance Metrics
        Business Information Management Precepts
        Business Intelligence Precepts
        Business Operating Principles and Environment
        Logical Business Organization Structure Rationale:

The Business Architecture identifies the drivers for making IT decisions, captures the primary line and support functions and business processes for aligning the enterprise business and IT towards reaching its strategic purpose, identifies the necessary business process architectures (value streams), and workflow scenarios from which the technology requirements and architectures to support them can be derived, and provides the basis for developing the enterprise logical location software deployment schemas and models. The Business Architecture also provides an overview of the integration required to effectively support the business processes across the enterprise, provides a high-level framework and mechanism for consistently displaying information, application, and infrastructure architecture information in logical location views, defines the models for business critical actions such as facilitating change management and providing a framework for process integration, and presents a geographical view of the logical and physical locations and the relative functions needed to determine the business and logical organizational structure to meet corporate goals and objectives Discussion:

An organization's business architecture is formulated in support of the enterprise strategic business plan(s). For IT planning purposes it is the compilation of essential information about the business which will be the basis for defining how information and technology will be used to support that business. A business environment 600 within which the enterprise operates as shown in FIG. 6, as an example, is impacted by outside influences. Therefore, these external factors affecting the business must be understood. These influences include the type of markets 602 the business is in or wishes to enter, competitors 604 faced in markets 602, government legislation 605 and regulations 606 with which to abide by, parameters placed upon it by a parent corporation 608 or the impact it might have by subsidiaries 610, services to provide to its customers 612, and accounting to its partners 614. Inside influences include production of goods, sales, and administration of the corporation 616. In the development of a comprehensive IT plan these factors could preclude certain choices in the technology selection.

Figure 7:
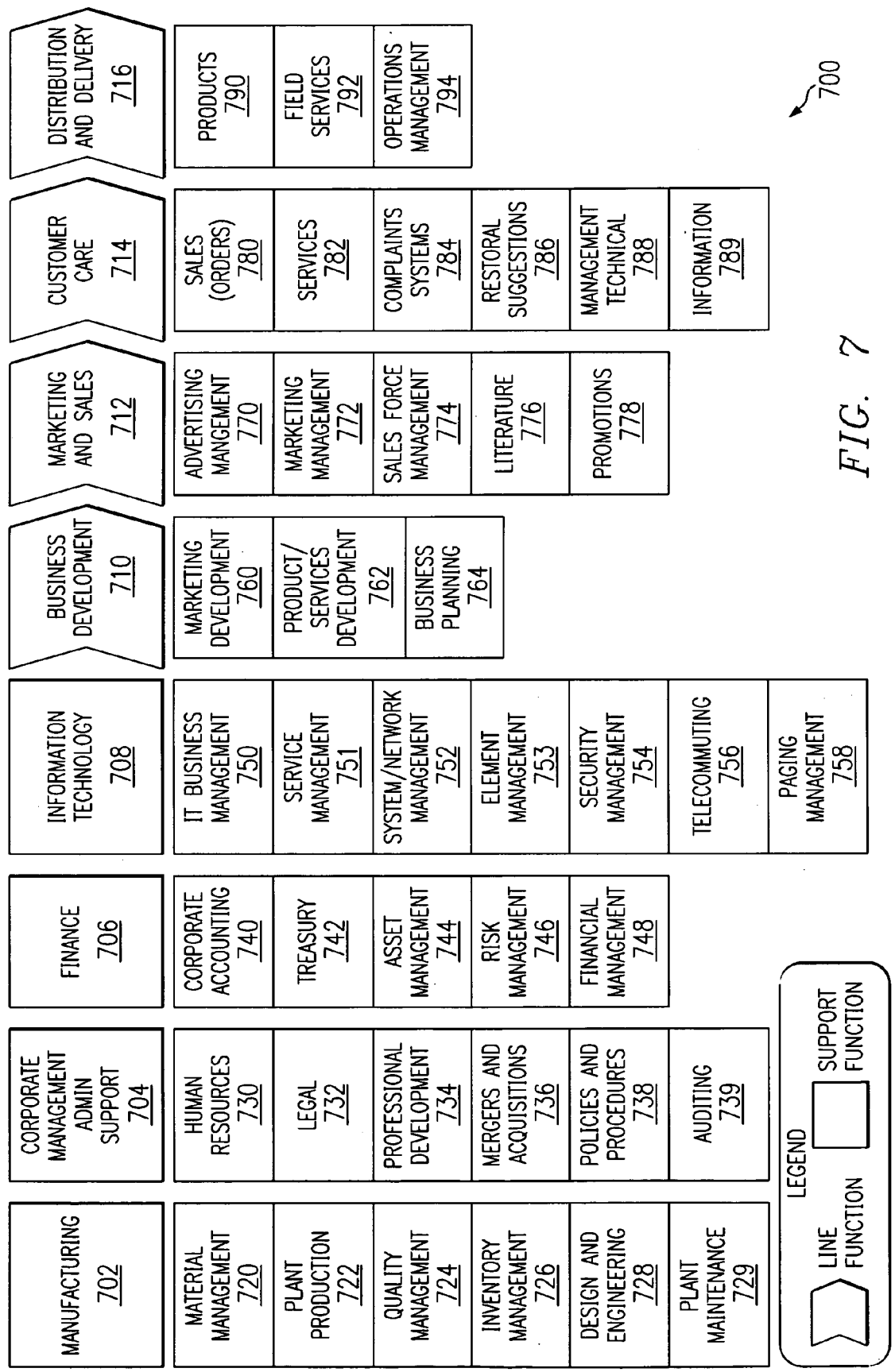
FIG. 7 illustrates support and line functions for the enterprise business.

The operating framework can be represented by a Business Function/Process Model 700 shown in FIG. 7. For discussion purposes, a manufacturing company is used as an example business to model. Model 700 articulates a firm's loose organizational structure and the line business functions and supporting business processes. It allows for a summary view to facilitate an understanding of the relevant functions in the current as well as future enterprise, identifying the existing and potential sources for competitive differentiation and advantage, and provides a way of focusing on areas that could benefit from strategic analysis. The essential objective of model 700 is to depict the current functional view of the enterprise by illustrating the primary line functions, which directly relate to the delivery of the enterprises products and services (e.g. Sales 712, Distribution and Delivery 716) and the supporting functions, which enable the primary functionality (e.g. 706 Finance). The specific content in the individual figures are only representative in nature and will vary for each enterprise. In model 700, a manufacturing company may have different departments to include support functions of manufacturing 702, corporate administration 704, finance 706, and information technology 708. Primary line function examples include business development 710, marketing and sales 712, customer care 714, and distribution and delivery 716. Within manufacturing support function 702, there may be sections of material management 720, plant production 722, quality management 724, inventory management 726, design and engineering 728, and plant maintenance 729. Under corporate administration 704, sections may include human resources 730, legal, 732, professional development 734, mergers and acquisitions 736, policies and procedures 738, and auditing 739. Sections under the finance support function 706 may include corporate accounting 740, treasury 742, asset management 744, risk management 746, and financial management 748. Under the information technology support function 708, there may be sections of IT business management 750, service management 751, systems/network management 752, element management 753, security management 754, telecommuting 756, and paging management 758.

For primary line functions, business development 710 may contain marketing development 760, product/services development 762, and business planning 764. Sections under the marketing and sales line function 712 may include advertising management 770, marketing management 772, and sales force management 774, literature 776, and promotions 778. For the customer care line function 714, sales 780, services 782, complaints 784, systems restoral 786, suggestion management 788, and technical information 789 groups may be provided. Sections under distribution and delivery 716 may include products 790, field services 792, and operations management 794.

Figure 8:
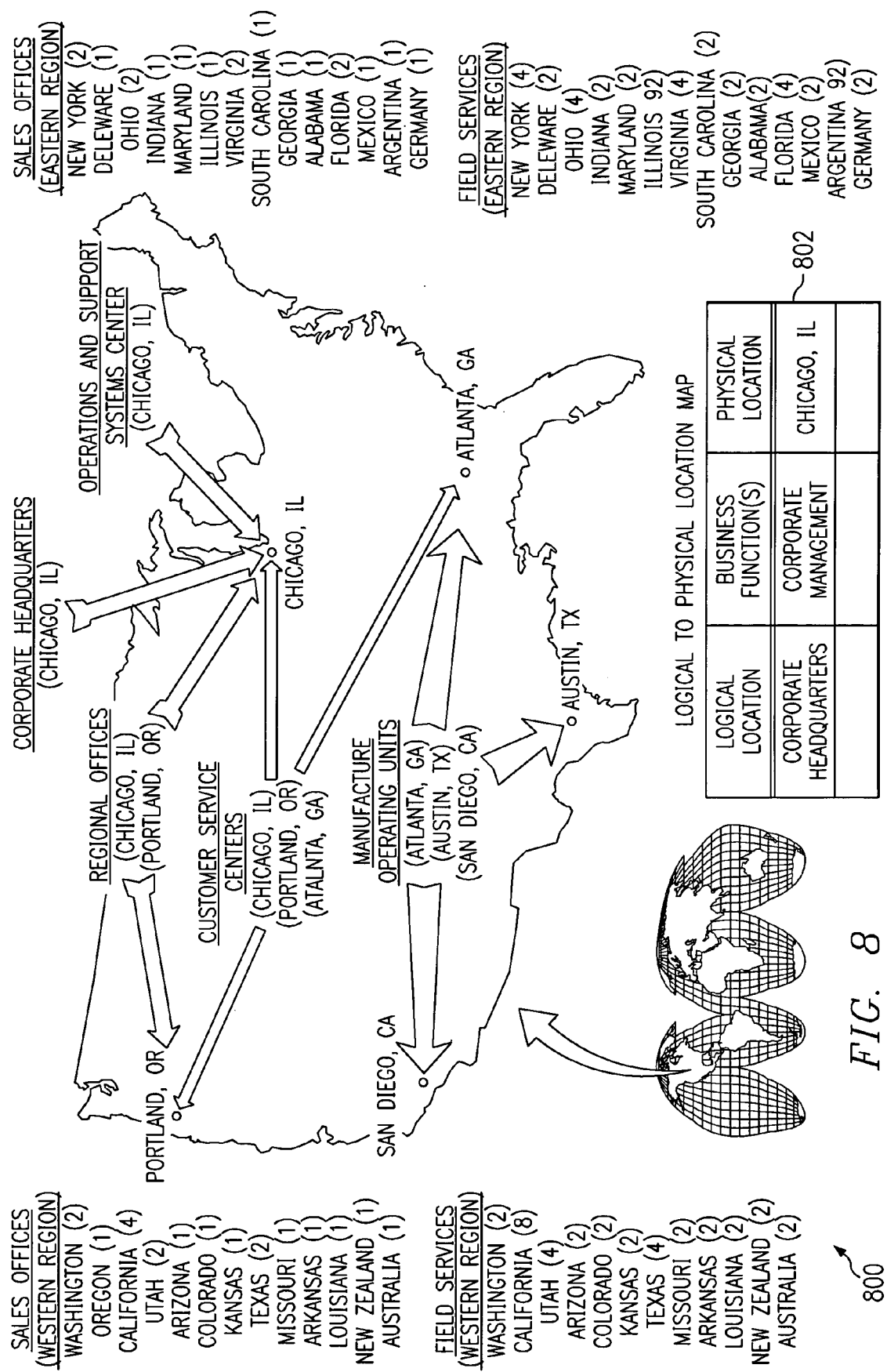
FIG. 8 illustrates a logical business location map.

The operating environment also reflects a view of the logical and physical operating environment 800 shown in FIG. 8 within which an enterprise exists and operates. Operating environment 800 illustrates an example of how the components of Business Function and Process Model 700 may be separated by geographical as well as logical boundaries. This environment will have a direct bearing on the design, engineering, implementation and deployment of IT.

Figure 30:
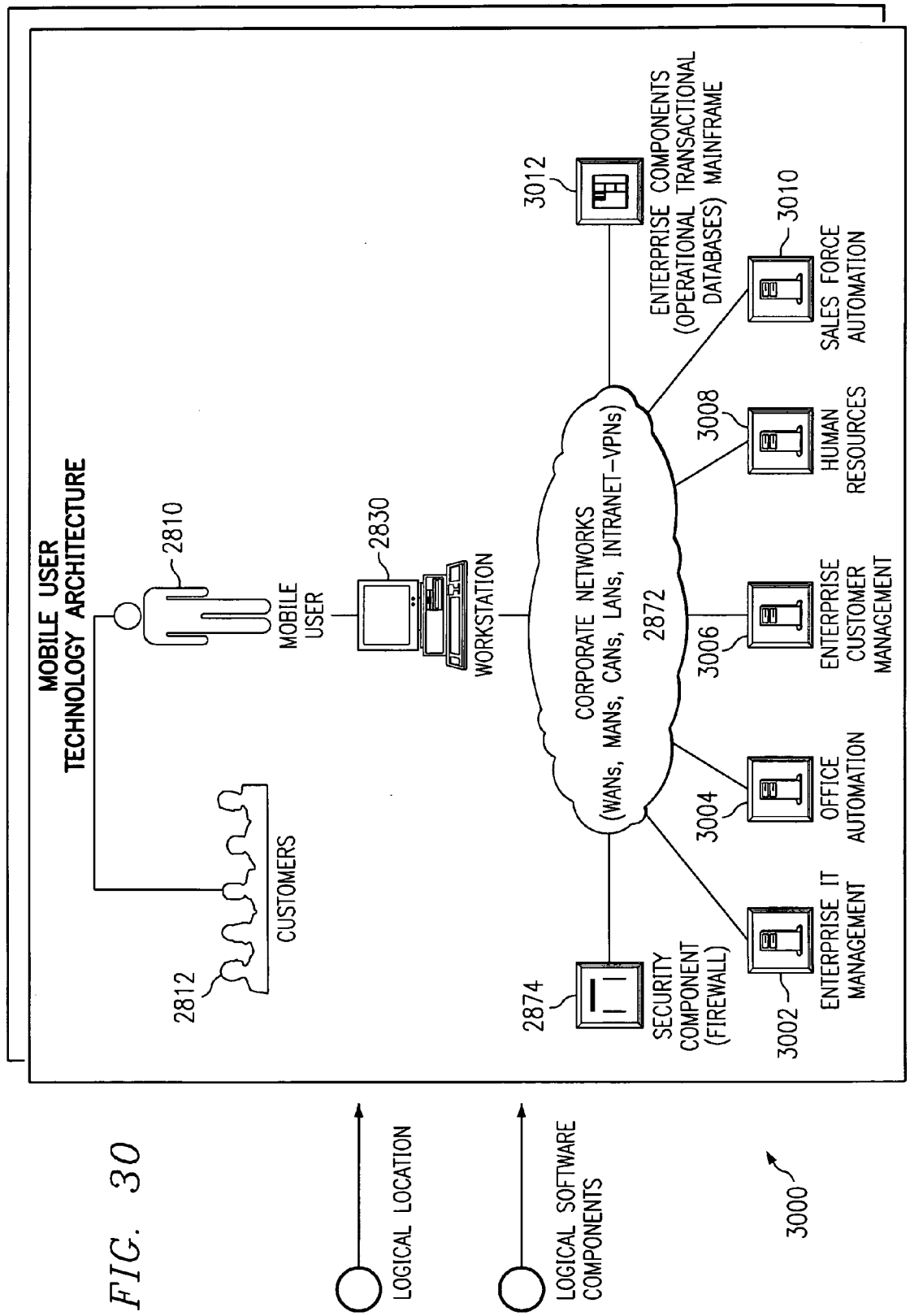
FIG. 30 illustrates a logical location software deployment scheme.
Figure 31:
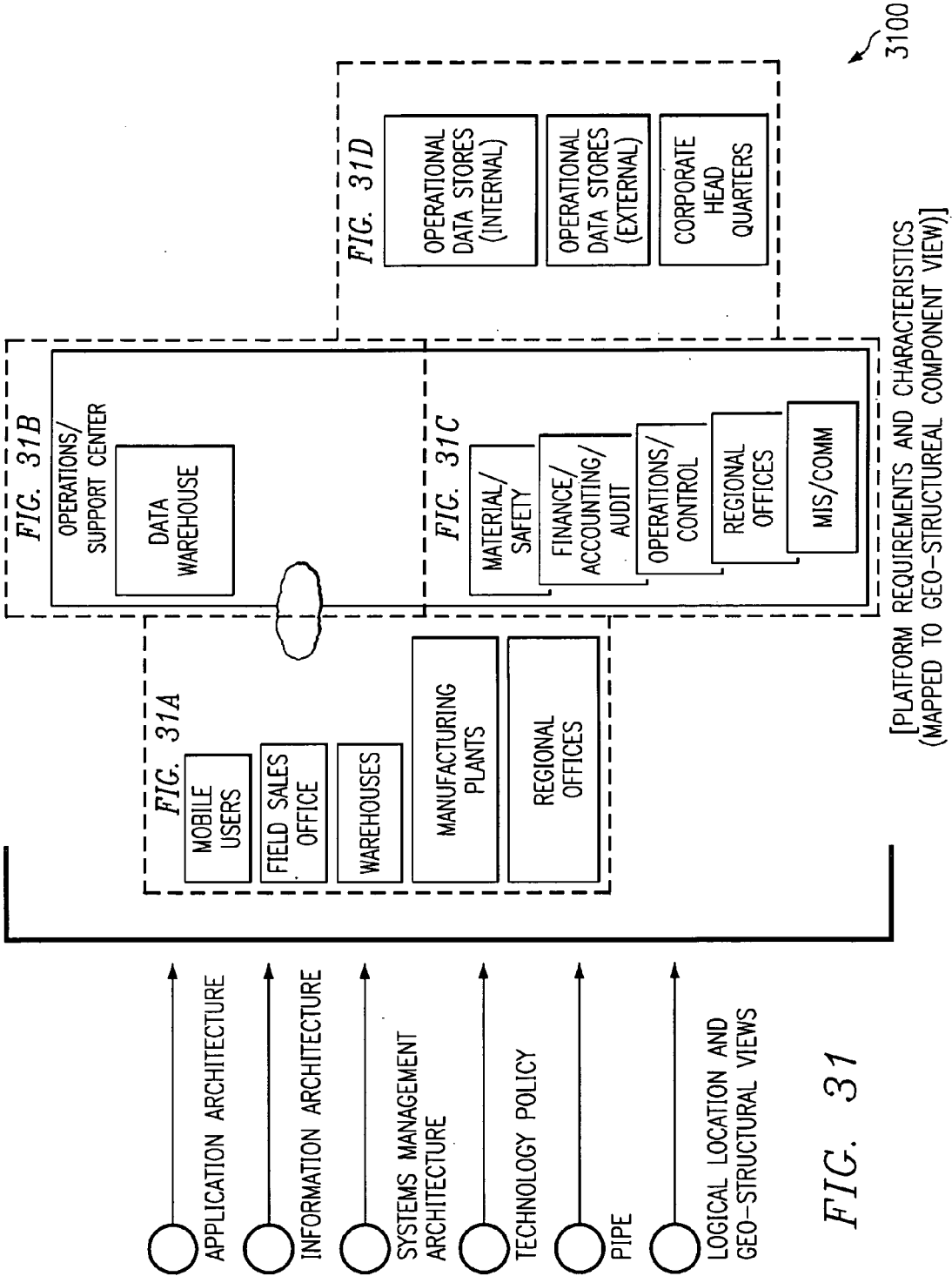
FIGS. 31 and 31A–31D illustrate a geo-structural component view for a technology infrastructure architecture.
Figure 31A:
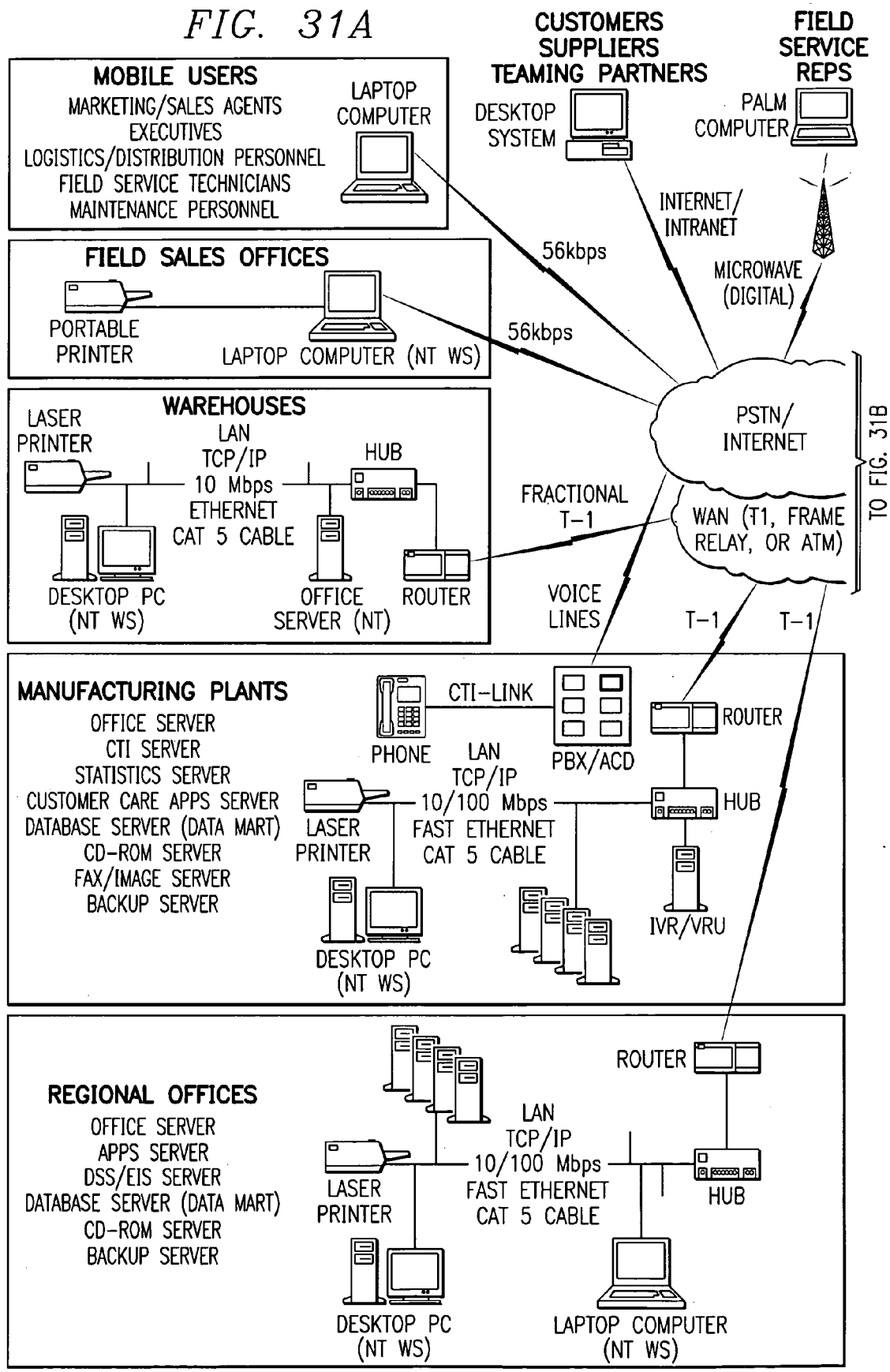
Figure 31B:
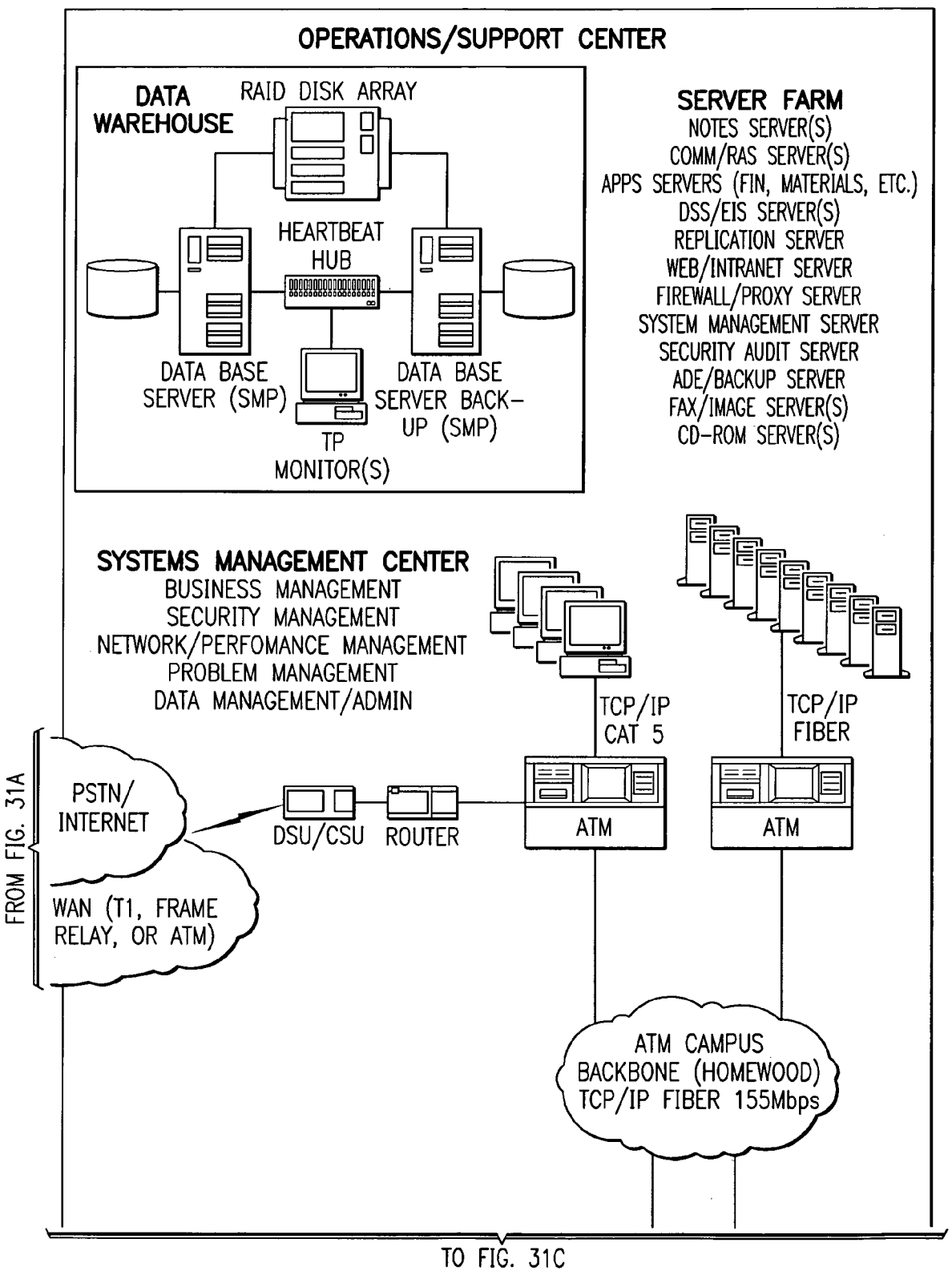
Figure 31C:
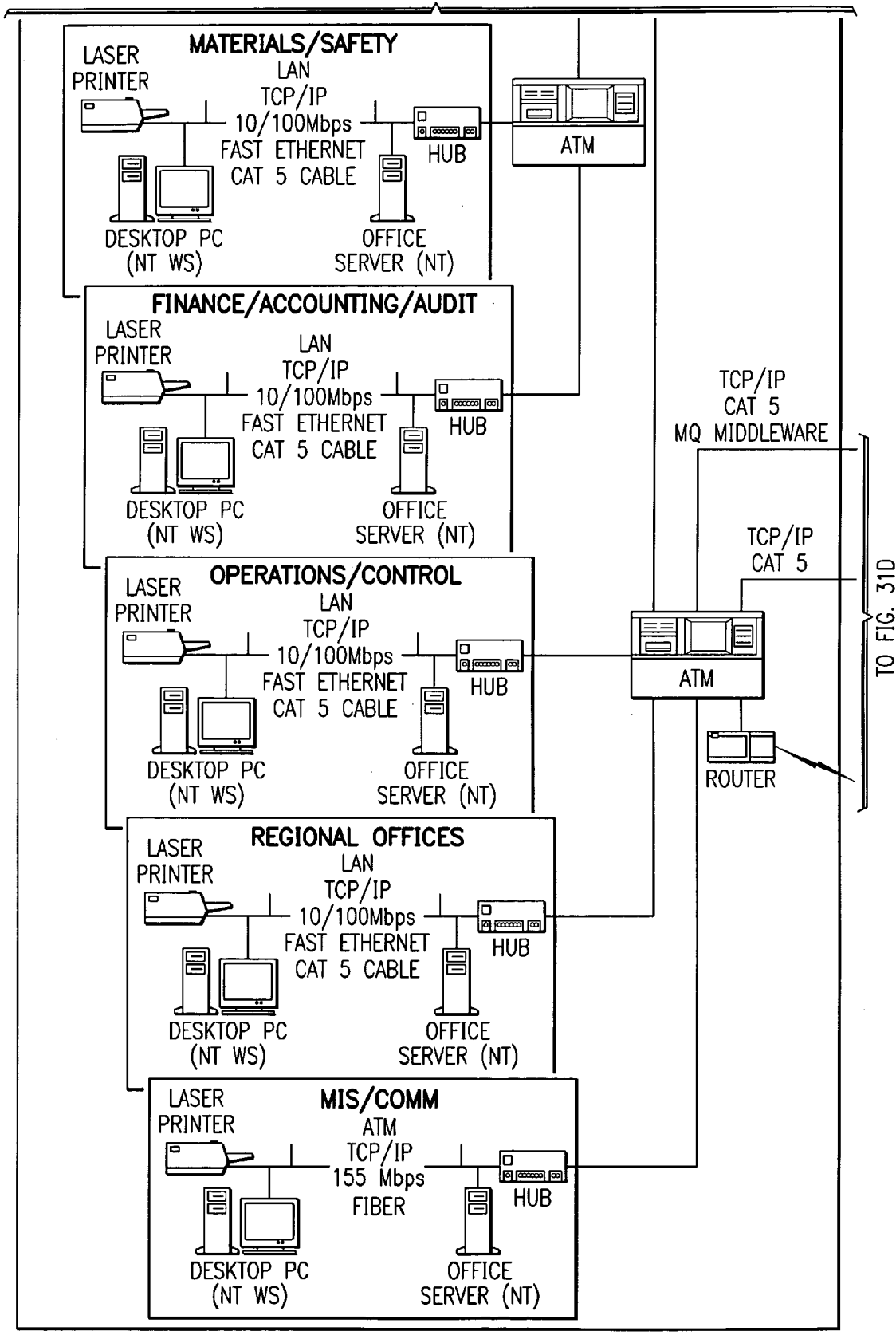
Figure 31D:
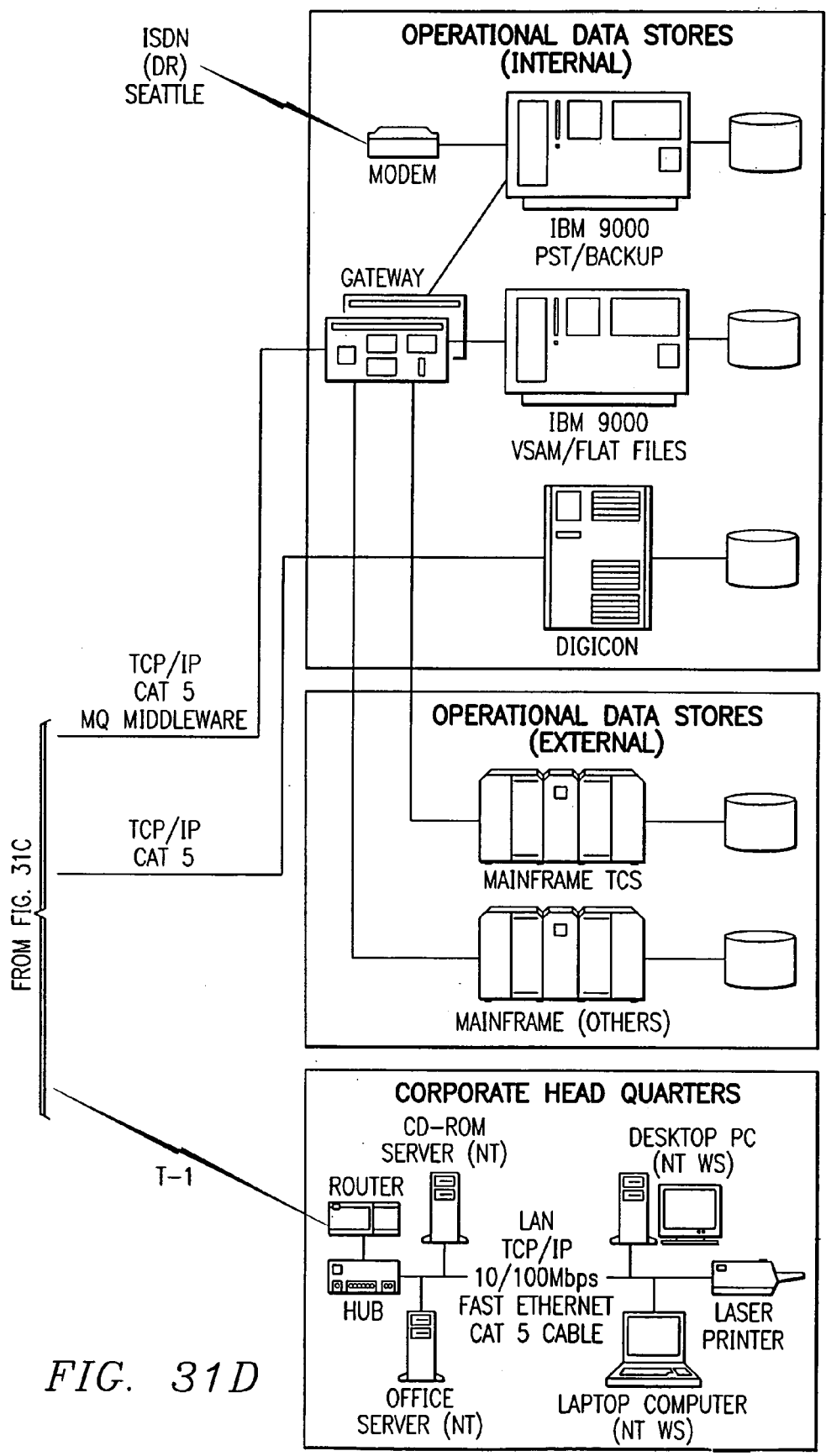

The identification of logical business locations defines the various areas of business activity encompassed by the enterprise. The separation between logical locations may be physical (such as geographic boundaries), or purely logical (such as organizational, cultural, and political boundaries). The definition of logical business locations provides a key ingredient for analyzing IT resource needs and determining the design, implementation, deployment, and management of those resources throughout the enterprise. This view provides input into the distribution of applications as well as the information and infrastructure requirements for the definition of those architectures. A logical location map 802 provides the necessary correlation between logical and physical locations for the various business functions of the enterprise. In order to support the logical design of IT architectures and consistently illustrate the distributed needs of the enterprise, a geo-structural view 900 shown in FIG. 9, for example, is created from the logical business location map 802 to provide the template upon which to construct the IT systems management, technology infrastructure, application, and information architectures. This would include the logical location software deployment schema 3000, as shown in FIG. 30, that will ultimately lead to the physical design of IT solutions. The critical elements of this geo-structural view is the distinct representation of each of the logical operating locations. An operations and support systems center 902 provides communication among mobile users 904, sales offices 906, manufacture operating units 908, customer service centers 910, regional offices 912, and teaming partners 914. Operations and support systems center 902 has access capability to corporate data stores 916, operational data stores 918, and corporate headquarters 920. The specific content in the individual figures are only representative in nature and will vary for each enterprise.

An IT investment profile 999 example shown in FIG. 10 reflects the company's overall investment in IT and where it is focused. To some degree, profile 999 illustrates the perceived value the enterprise places on IT. Investment and expenditure profile 999 provides a view of the monetary delimiters on the IT operating environment and sets the tone and expectations for future IT expenditure. This will directly impact the feasibility of certain technology choices and recommended IT initiatives to reach targeted architectures and environment.

Capturing the client IT systems expenditure data and determining where it is focused provides the baseline against which the appropriateness of current IT expenditures can be determined and against which transition planning recommendations and future budgeting calculations can be made. FIG. 11 shows an example of a client IT expenditure and industry expenditure benchmark 1100. It also provides a way in which to determine client standing in regards to an industry norm benchmark for business, competitive, and industry measures.

Figure 12A:
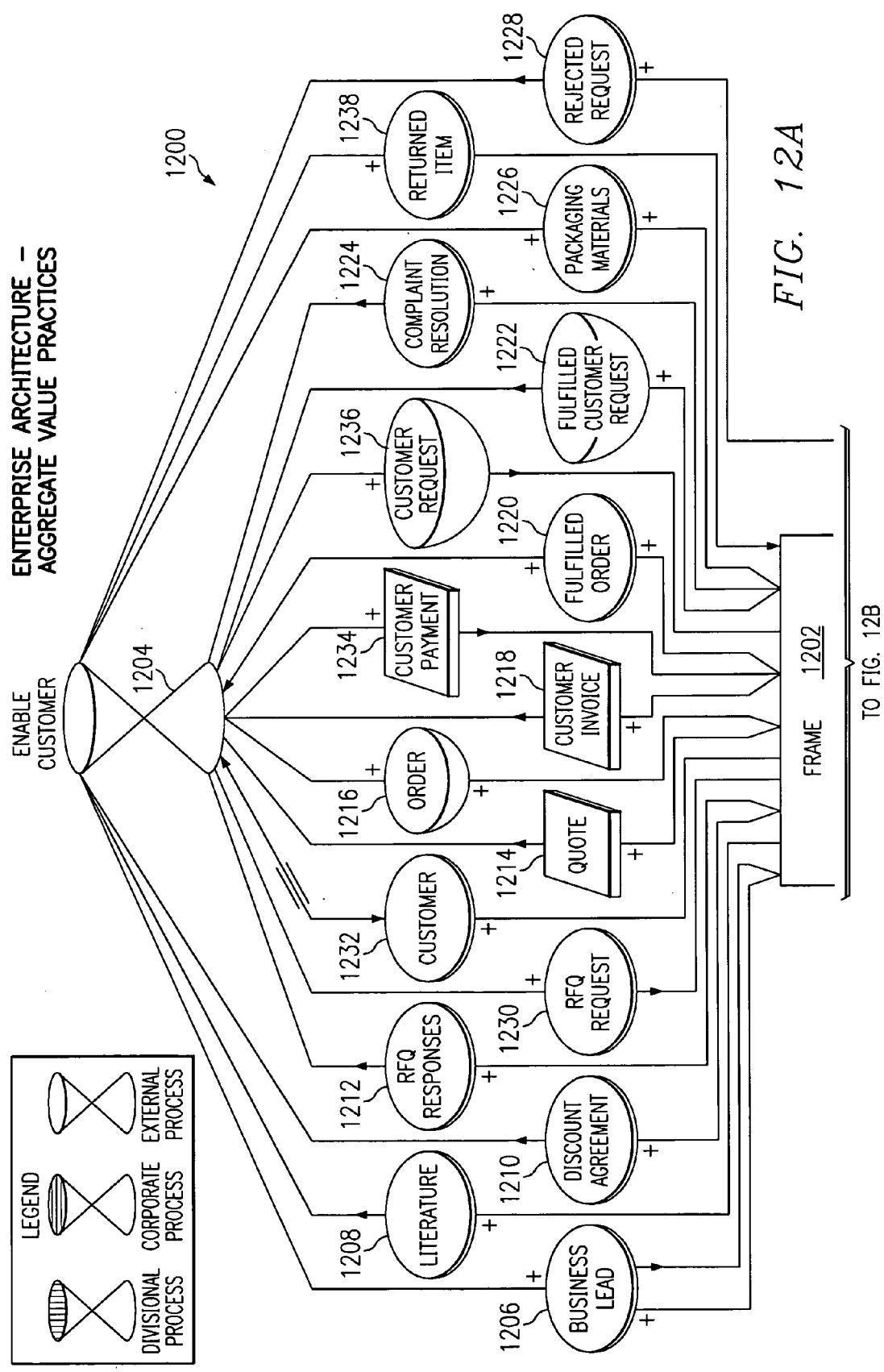
Figure 12C:
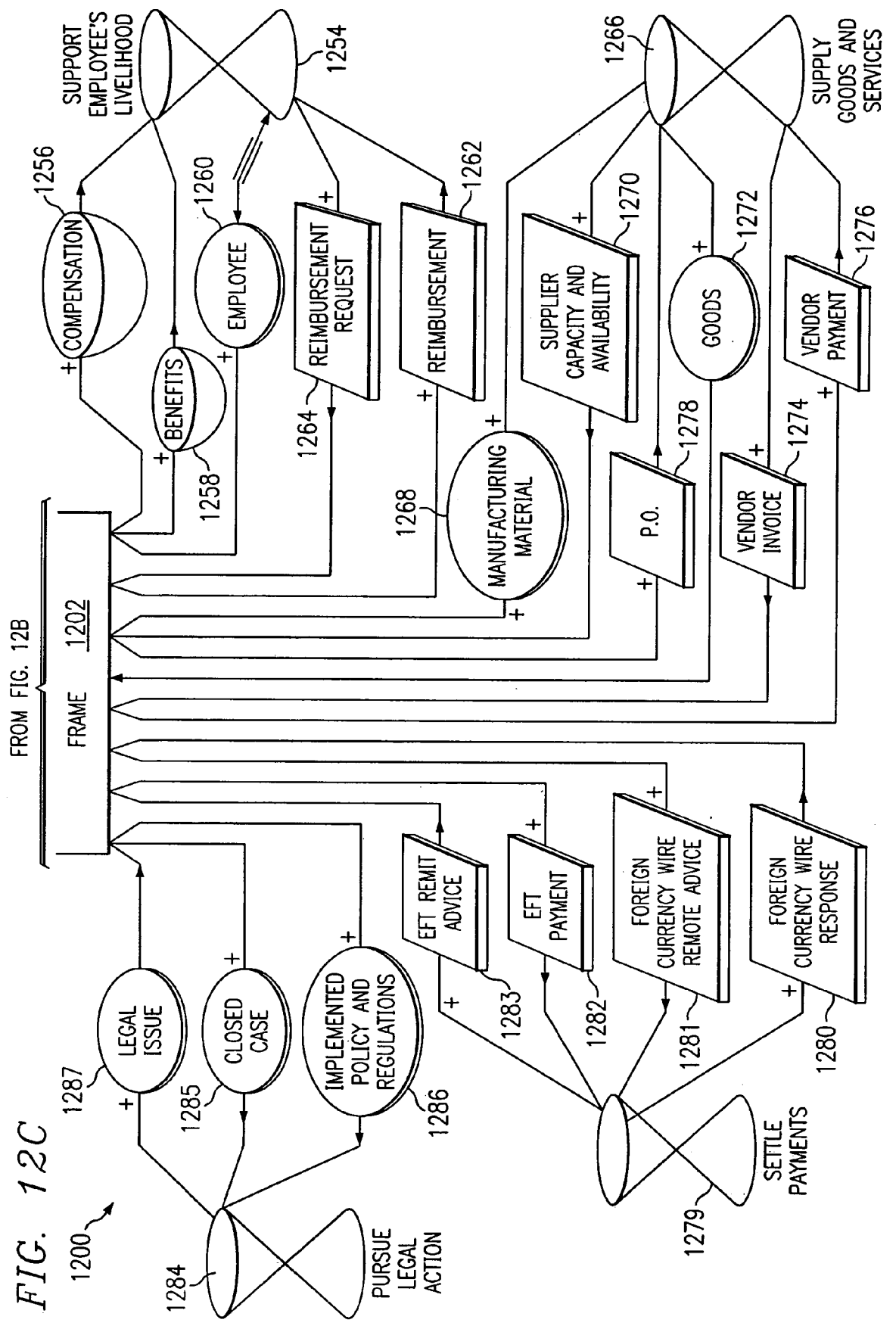
Figure 13A:
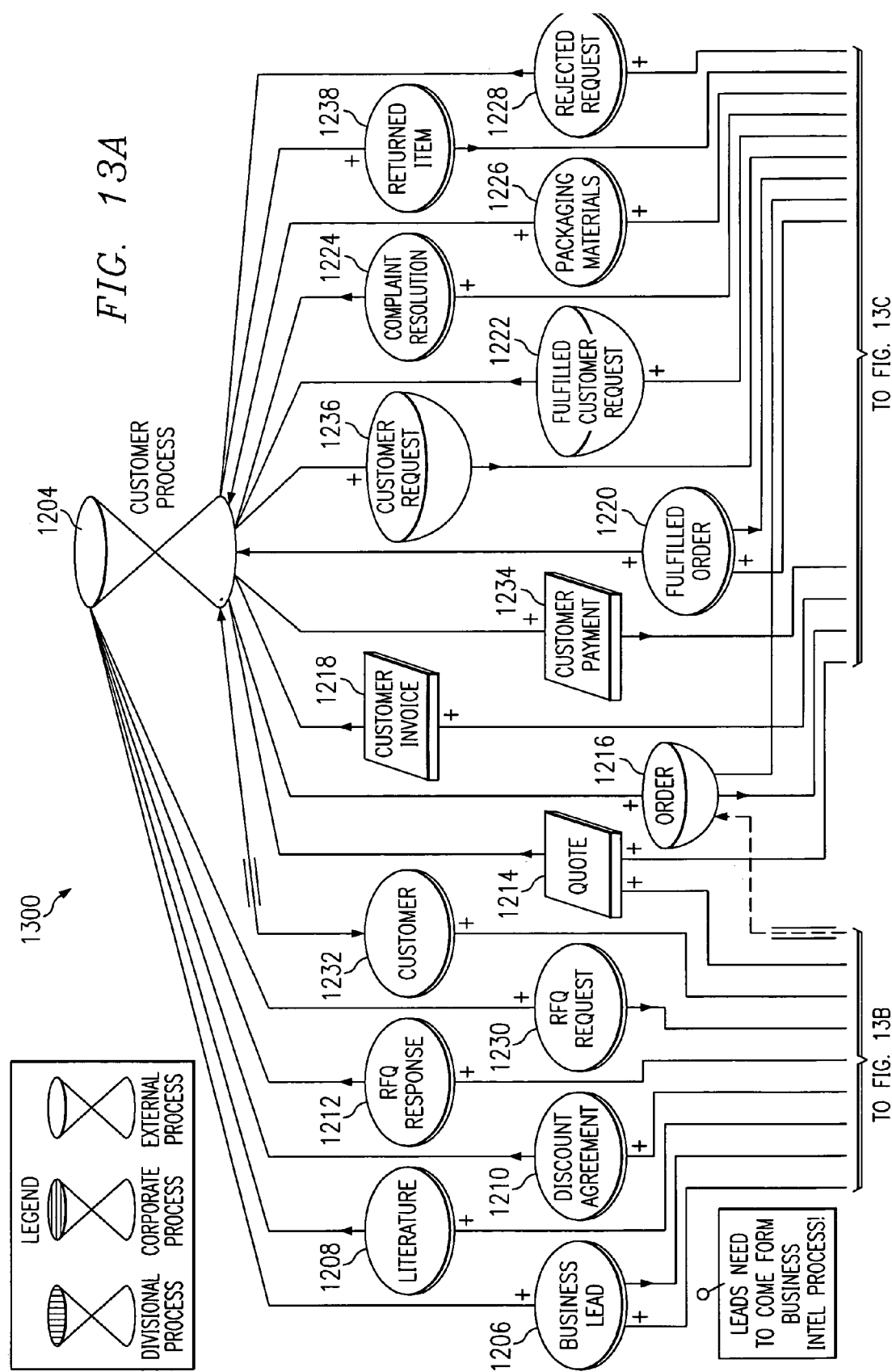
Figure 13B:
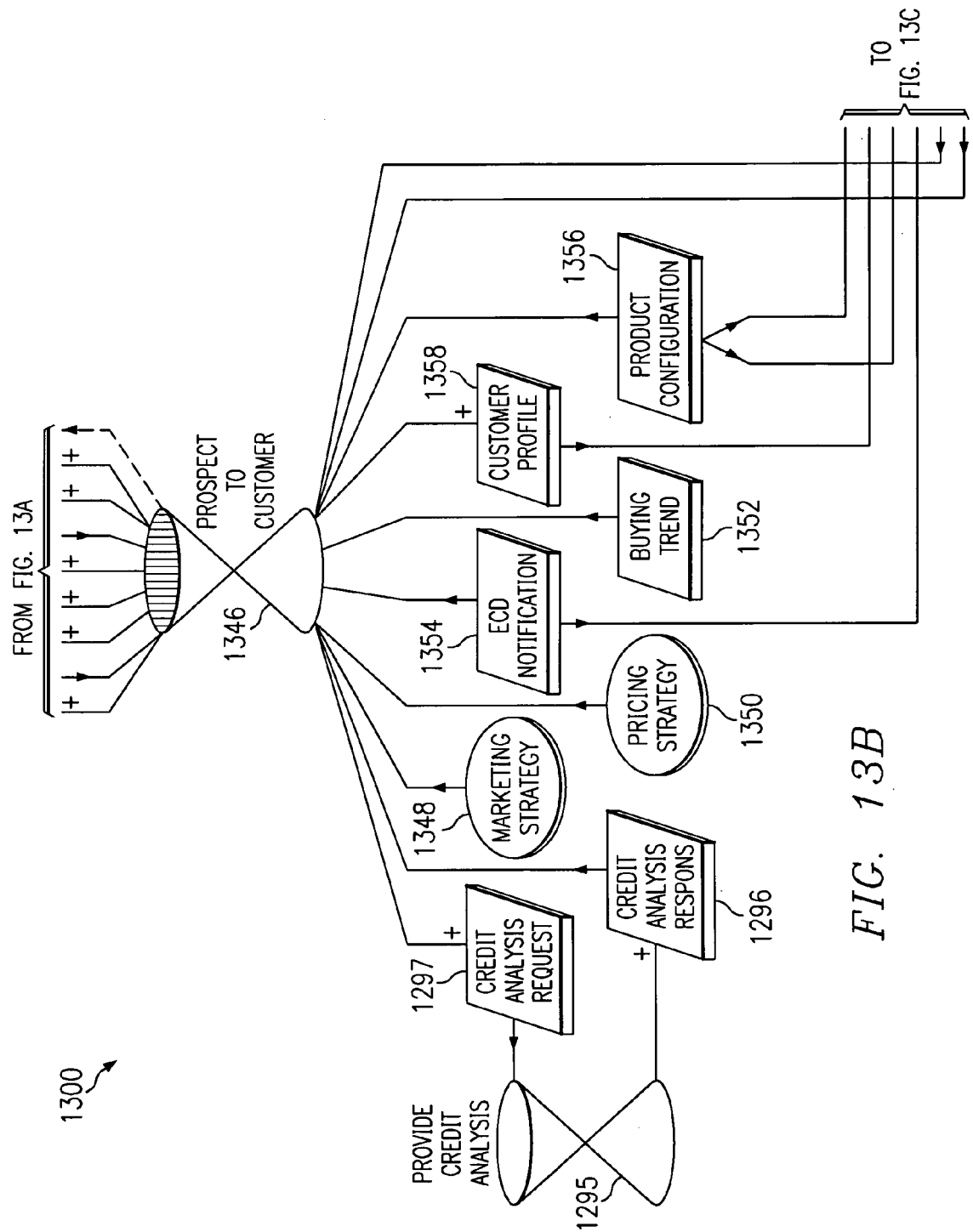
Figure 13C:
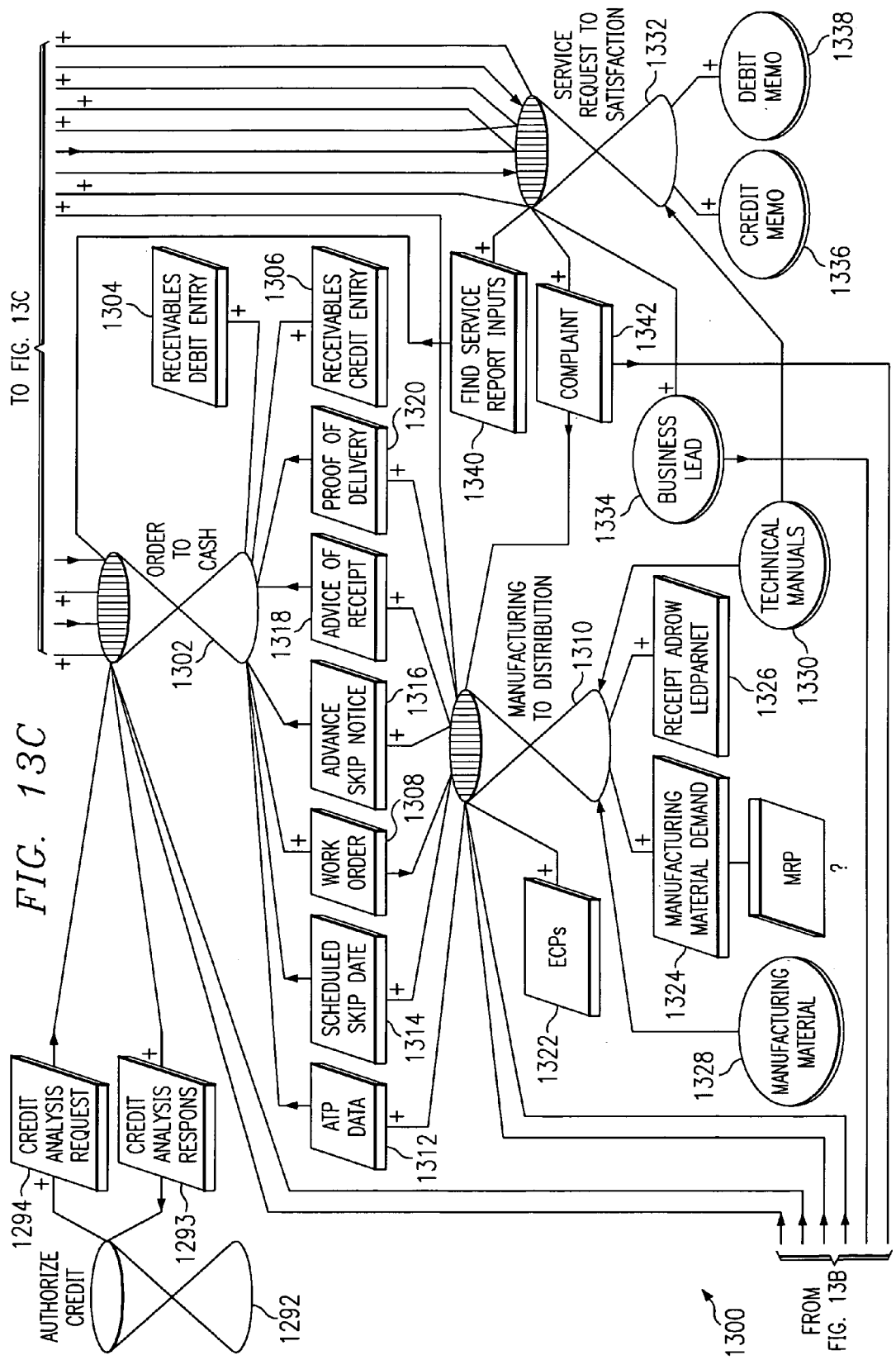

The enterprise business architecture is key to the business success of a corporation as well as the development of effective strategic IT plans. From the strategic business models articulating the business process architectures (value streams) the requisite enabling technology and information requirements can be derived. The level of detail and accuracy applied to these models will directly impact the robustness of the IT plans that can be developed for an enterprise as well as the success of their subsequent implementation. At the highest level, the business architecture is represented by an enterprise model 1200 that shows the essential elements of primary external business processes 1295 and the respective inputs 1230 from and outputs 1208 to external sources 1204. As shown in FIGS. 12A–12C, the frame 1202 in the middle of the model represents the client enterprise. This model is an example of a manufacturing industry enterprise and the specific content in the individual figures are only representative in nature and will vary for each enterprise.

Enterprise frame 1202 handles various inputs and provides various outputs for interfacing with external processes. An enterprise frame 1202 may create such elements as business leads 1206, literature 1208, discount agreements 1210, request for quote responses 1212, quotes 1214, orders 1216, customer invoices 1218, fulfilled orders 1220, fulfilled customer requests 1222, complaint resolution 1224, packaging material 1226, and rejected requests 1228 as inputs to customer process 1204. Likewise, customer process 1204 may create elements such as business leads 1206, request for quote requests 1230, customer information 1232, orders 1216, customer payments 1234, customer requests 1236, and returned items 1238 as inputs to enterprise frame 1202. Enterprise frame 1202 may receive inputs from a human resources services process 1240 for such items as interested candidates 1242 and employment development services 1244. A government services process 1246 may create items such as Environmental Protection Agency guidelines 1248, Occupational Safety and Health Administration (OSHA) guidelines 1250, and government policies and regulations 1252 for input to enterprise frame 1202. Other processes of the aggregate input/output model 1200 include an employee support process 1254 that may receive compensation 1256, benefits 1258, employee information 1260, and reimbursements 1262 inputs generated by enterprise frame 1202 while creating reimbursement requests 1264 and other employee issues 1260 for processing by enterprise frame 1202. A supply goods and services process 1266 creates manufacturing material 1268, supplier capacity and availability 1270, goods 1272, and vendor invoice 1274 inputs to enterprise frame 1202 while responding to vendor payment 1276 and purchase order 1278 inputs created by enterprise frame 1202. A settle payments process 1279 handles electronic funds transfer payments 1280 and foreign currency wire request inputs 1281 generated by enterprise frame 1202 and provides electronic funds transfer remit 1282 and foreign currency wire remit advices 1283 to enterprise frame 1202. A legal action process 1284 handles closed case 1285 and implemented policy and regulation 1286 issues and generates legal issues 1287. A strategic services process 1288 issues science and technology drivers 1289, industry trends 1290, and external market 1291 data to enterprise frame 1202 for strategic planning consideration. An authorize credit process 1292 responds to credit check requests 1293 with credit check responses 1294. Similarly, a credit analysis process 1295 responds to credit analysis requests 1296 with credit analysis responses 1297.

Identification of value streams within the enterprise will allow the enterprise to establish valued-added services in support of its customers and provide a mechanism for understanding and evaluating results. A value stream can be defined as an end-to-end array of activities that collectively create a valuable result for both internal and external customers. The value streams reconcile all the views a customer may have of the enterprise and create the views of a single, serving enterprise dedicated to the customer. The value streams satisfy the customer wishes as fully as possible, rather than focusing on internal procedures (or functions) such as accounting or selling or shipping.

The value streams can be grouped in to four categories: Customer Facing, People Caring, Business Enabling, and Future Building. FIGS. 13A–13D represent a model 1300 of the aggregation of the processes within a particular category (e.g. Customer Facing) and the external inputs and outputs to support the value streams. This view shows not only the integration within a category but depicts the required inputs and outputs from the other categories within the enterprise as well as sources outside the enterprise such as enable customer process 1204 of FIGS. 12A–12C. The elliptical elements such as fulfilled order 1220 represent tangible objects. The hard cornered or rectangular objects such as customer invoice 1218 represent IT objects exchanged with other value streams or external entities. The specific content in the individual figures are only representative in nature and will vary for each enterprise.

In FIGS. 13A–13D, enable customer process 1204 of FIGS. 12A–12C is shown with its inputs and outputs interacting with both internal and external processes, such as order to cash process 1302 and credit analysis process 1295. An order to cash process 1302 generates customer invoices 1218 and quotes 1214 for enable customer process 1204 and generates credit check requests 1293 for authorize credit process 1292. Order to cash process 1302 also generates receivable debit entries 1304 and receivable credit entries 1306 as well as work orders 1308 for input to a manufacturing to distribution process 1310. Order to cash process 1302 handles credit check responses 1294 from authorize credit process 1292 along with orders 1216 and customer payments 1234 from customer process 1204. Order to cash process 1302 also handles Availability to Promise ATP data 1312, scheduled ship date 1314, advanced ship notice 1316, advice of receipt 1318, and proof of delivery 1320 inputs generated by manufacturing to distribution process 1310. Manufacturing to distribution process 1310 generates engineering change reports 1322, manufacturing material demands 1324, and receipt acknowledgments 1326 along with handling manufacturing material 1328 and technical manual 1330 inputs.

Technical manual 1330 inputs are also processed by a service request process 1332. Service request process 1332 generates orders 1216, fulfilled customer requests 1222, complaint resolution 1224, packaging material 1226, and rejected request 1228 inputs to customer process 1204. Service request process 1332 handles fulfilled order 1220, customer request 1236 and returned item 1238 inputs generated by customer process 1204. Service request process 1332 also generates credit memos 1336 and debit memos 1338. Service request process 1332 generates field service reports 1340 for use by order to cash process 1302. A complaint 1342 input is generated by service request process 1332 for processing by manufacturing to distribution process 1310. Complaint 1342 and a business lead 1344 input are generated by service request process 1332 for use by prospective customer process 1346.

Prosepective customer process 1346 handles business leads 1206 and request for quote requests 1230 from customer process 1204. Prospective customer process 1346 generates business leads 1206, literature 1208, discount agreements 1210, request for quote responses 1212, customer interfaces 1232, and quote 1214 inputs for processing by customer process 1204. Prospective customer process 1346 interfaces with credit analysis process 1295 through credit analysis requests 1296 and credit analysis responses 1297. Prospective customer process 1346 responds to marketing strategy 1348, pricing strategy 1350, and buying trend 1352 information. An engineering change order notification 1354 provides input to prospective customer process 1346 and manufacturing to distribution process 1310. A product configuration 1356 drives prospective customer process 1346, manufacturing to distribution process 1310, and order to cash process 1302. Prospective customer process 1346 also generates a customer profile 1358 for use by order to cash process 1302.

Subsequent to the enterprise business value stream aggregation, each of the value streams identified in the enterprise business architecture is further decomposed into event, process, and environment architectures and workflow scenario models. The event models illustrate the activities that happen outside the Enterprise/Value Stream to which the value stream must react in a predetermined manner. The architecture models depict the style and method of design and construction that comprises the elements of a system and defines the purpose and interrelationships of those elements. Each value stream is depicted with at least one process architecture and an environment model. The workflow scenario models illustrate the sequence of activities necessary to transform the inputs into the required outputs.

Figure 14A:
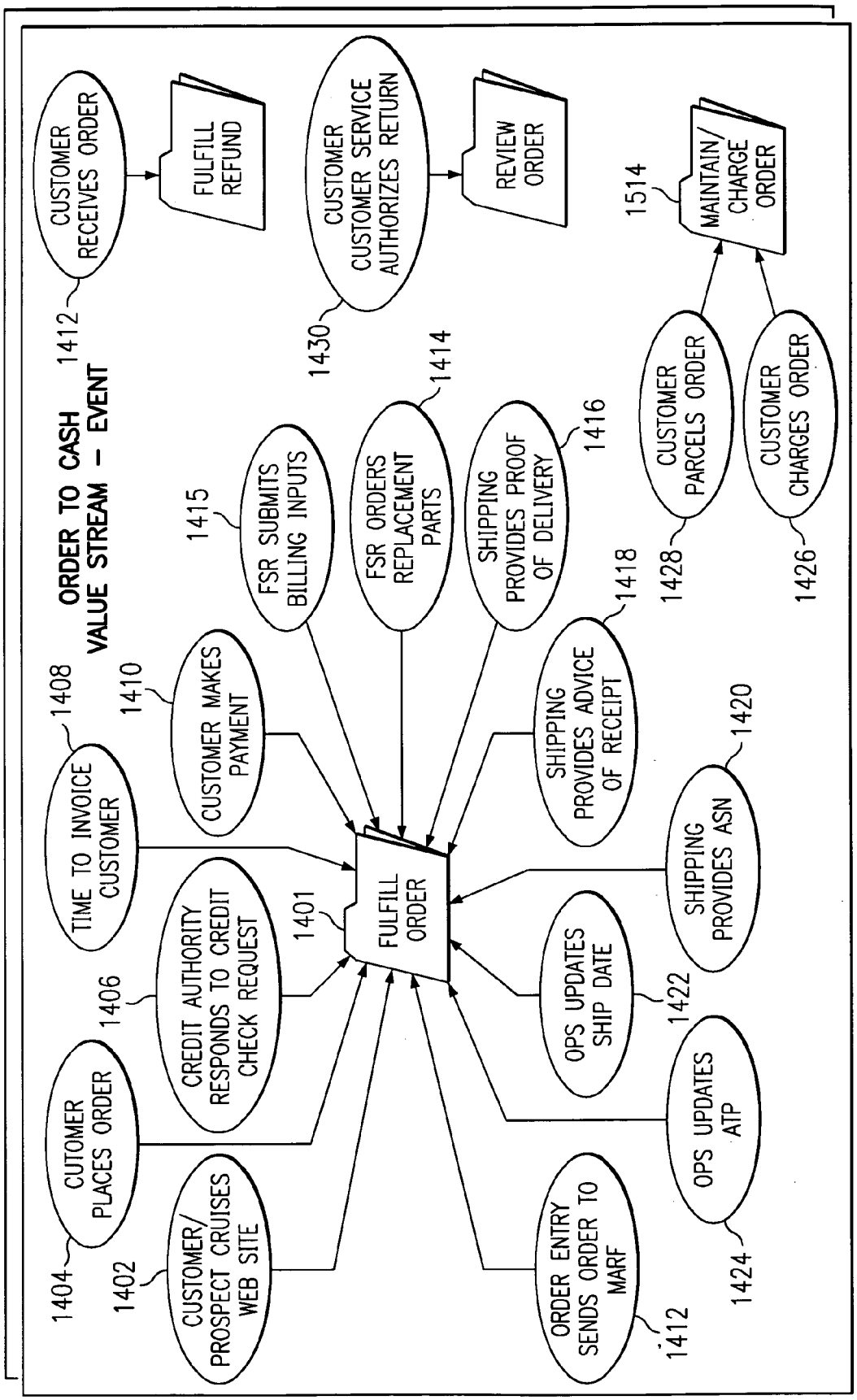

FIGS. 14A–14B represent an example of a generic event model 1400 for a value stream such as "Order to Cash". This concept requires that for each value stream identified in the enterprise business architecture there will be a corresponding event model. The event model articulates each event that triggers a workflow scenario within the value stream. The value stream event metrics matrices capture the number of events that occur over some specified time periods. These events could be either external or internal to the enterprise. For each event identified in the model a logical location software deployment schema will be derived.

In FIGS. 14A–14B, the fulfill order scenario 1401 is initiated by various events including customer cruising the web site 1402, customer placing order 1404, and credit authority responds to credit check request 1406, all of which are external events. Time to invoice the customer 1408, is an example of an internal event. Other internal events include time to invoice customer 1408, and customer makes payment 1410, order entry sends order to manufacturing 1412. Subsequently, field service repair orders replacement parts 1414, submits billing inputs 1415, shipping provides proof of delivery 1416, advice of receipt 1418, and Advance Ship Notice (ASN) 1420 as well as operations updates to ship date 1422 and ATP 1424 to assist in keeping track of the order. The maintain/change order scenario 1550 is driven by the customer changing an order 1426 or canceling an order 1428. Authorization to refund an order for fulfill refund scenario 1514 is given by customer service 1430. A review order scenario 1432 processes a customer's review request 1434. The specific content in the individual figures are only representative in nature and will vary for each enterprise.

Figure 15:
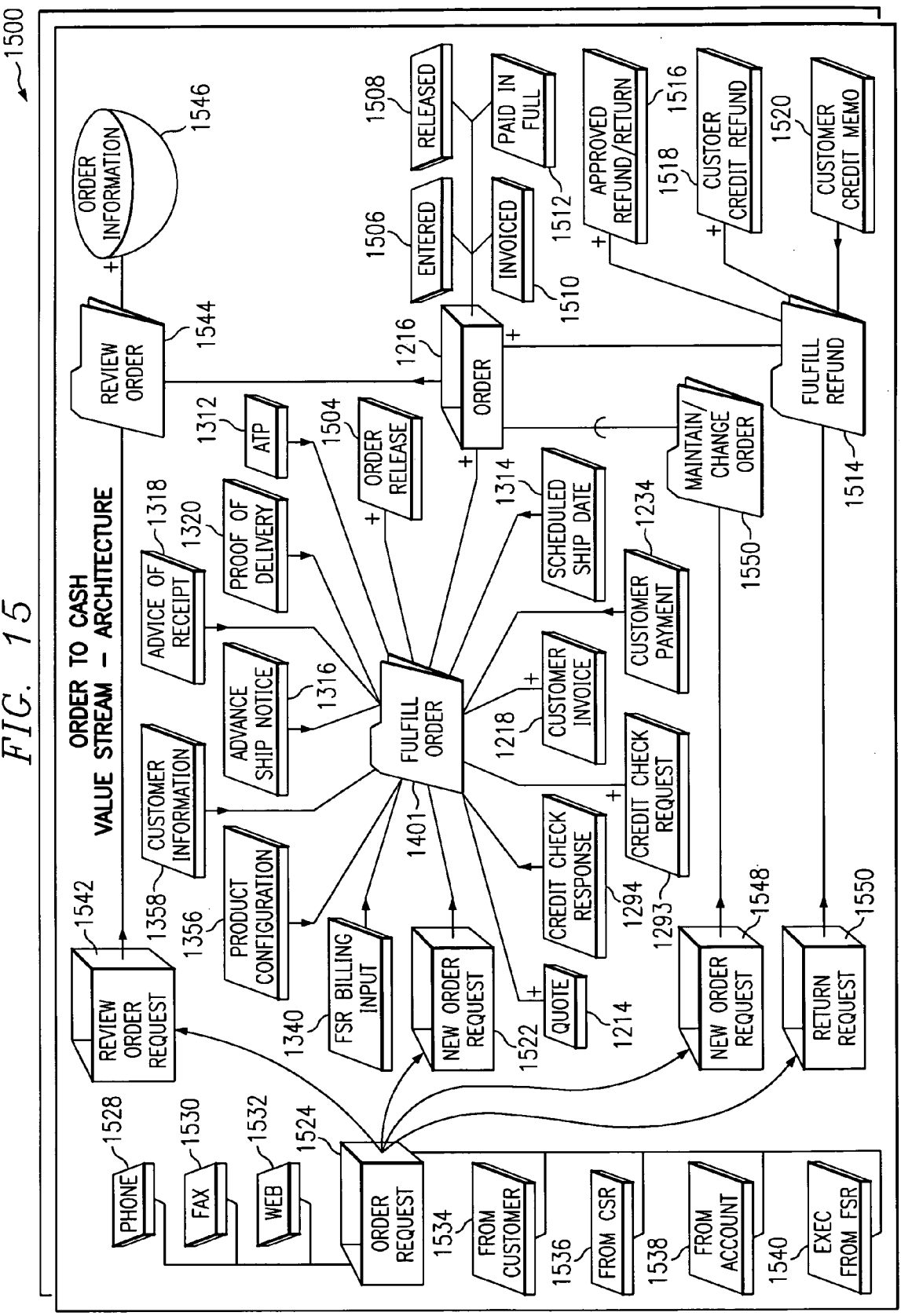
FIG. 15 illustrates a process architecture for a value stream of the business enterprise.

FIG. 15 represents an example of a generic process architecture 1500 for a value stream such as "Order to Cash". This concept requires that for each value stream identified in the enterprise architecture there will be at least one corresponding process architecture. These architectures provide the structure within which workflow scenario models can be derived depicting various business scenarios for that value stream.

In FIG. 15, the essential elements are the work elements being executed as represented by fulfill order scenario 1401 and the information being created and used as represented by new order request 1522. In FIG. 15, a fulfill order scenario 1401 may process field service billing input 1340, product configuration 1356, customer profile 1358, advanced ship notice 1316, advice of receipt 1318, proof of delivery 1320, customer payment 1234, credit check responses 1294, and ATP data 1312 inputs and generates scheduled ship date 1314, customer invoice 1218, credit check request 1293, quote 1214, and an order release 1504. A customer data to consumer intelligence process drives the information for customer profile 1358. An order 1216 is generated by fulfill order scenario 1401. Order 1216 includes information with respect to an order such as being entered 1506, released 1508, invoiced 1510, and paid 1512. Order 1216 may be generated by fulfill refund scenario 1514 that can create a credit refund 1516 or a customer credit memo 1518. Fulfill refund scenario 1514 is triggered upon an indication by approved refund/return 1520.

An order 1216 is initiated by fulfill order scenario 1401 in response to a new order request 1522 generated by a direct order request scenario 1524. Direct order request scenario 1524 receives information from an order request generated by phone 1528, fax 1530, or web page 1532 from a customer 1534, CSR 1536, account executive 1538, or FSR 1540. Direct order request scenario 1524 may generate a review order request 1542 that initiates a review order scenario 1544 that receives information from order 1216 in order to generate order information 1546. Direct order request scenario 1524 may also generate a maintain/change order request 1548 that provides information to a maintain/change order scenario 1550 in order to perform any alteration to order 1216. Direct order request scenario 1524 also generates a return request 1550 for use by fulfill refund scenario 1514. The specific content in the individual figures are only representative in nature and will vary for each enterprise.

Figure 16:
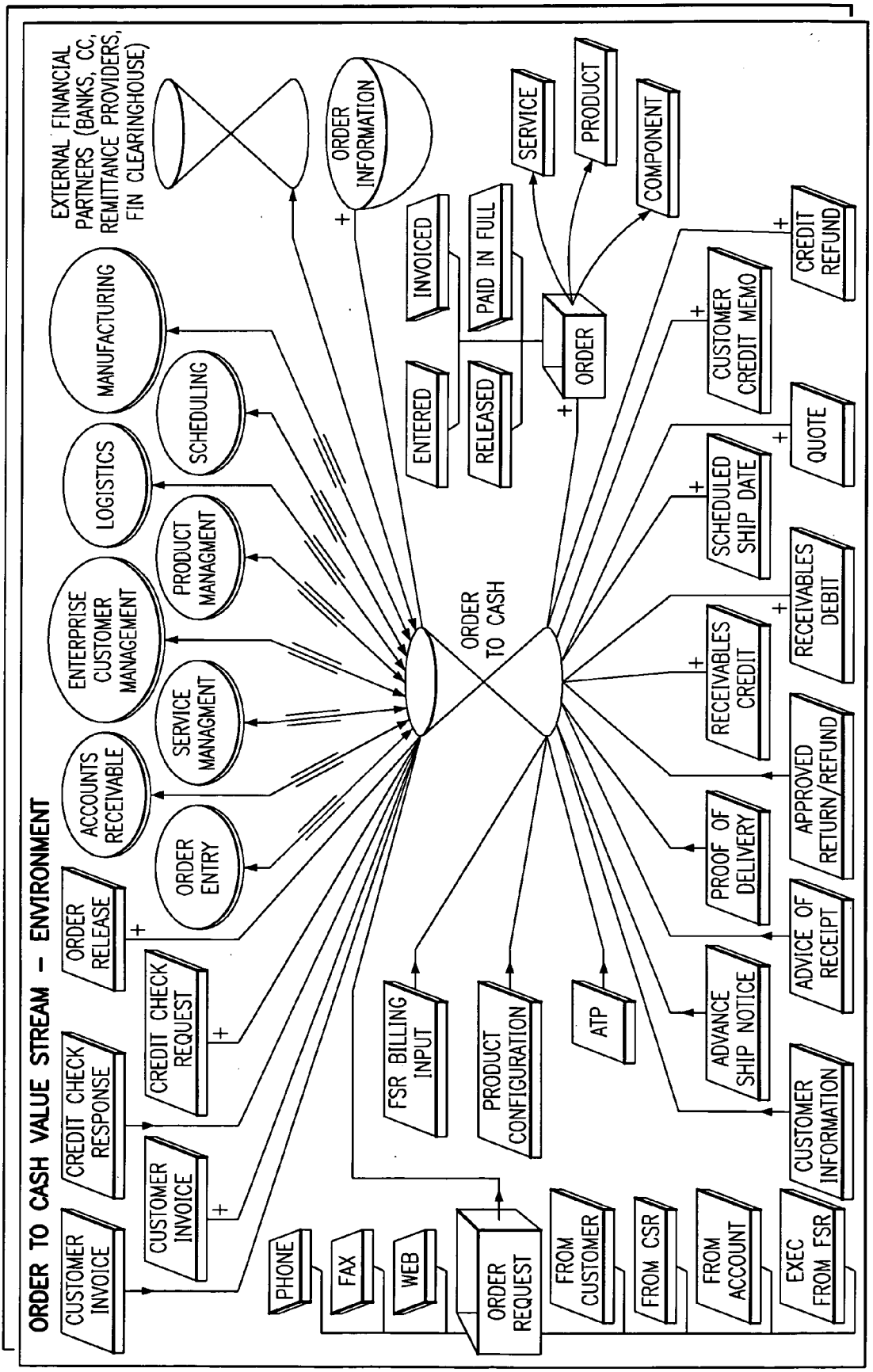
FIG. 16 illustrates a value stream environment model.

The environment model 1600 for a value stream, as shown in FIG. 16, depicts the interaction with external entities, as indicated with the darkened hourglass figures, as well as the interfaces with the other value streams of the enterprise. The elliptical spheres in this model represent physical, real world objects. The rectangular or "hard cornered" shapes represent IT objects and therefore integration points between the value streams as well as external entities. These interface objects are the "whats" that are reflected in the Enterprise Information/Application/Systems Management Software Portfolio integration matrices. FIG. 16 shows an overall environment view for the order to cash example as discussed above.

Figure 17:
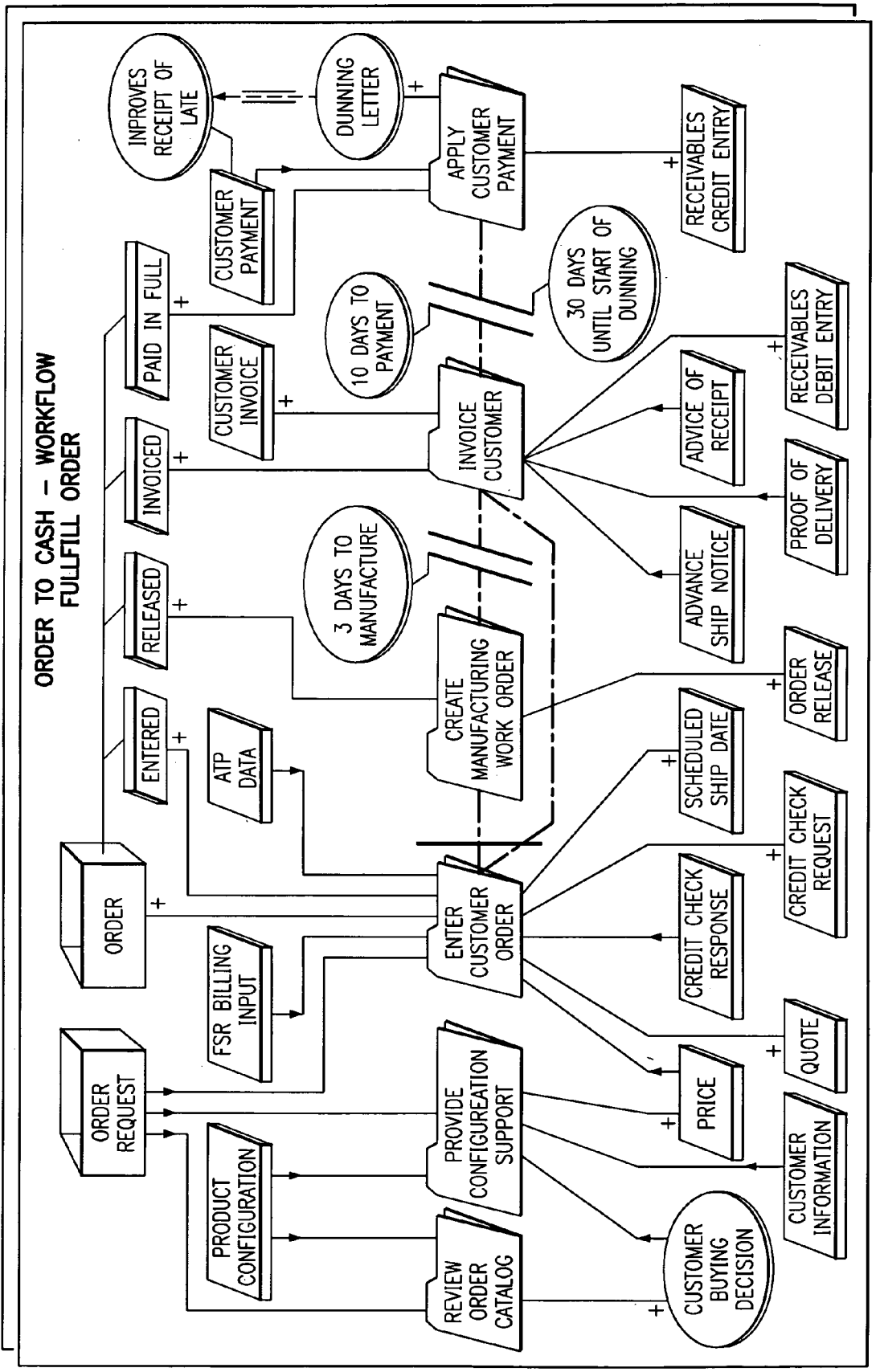
FIG. 17 illustrates a process workflow scenario model for a value stream.

The workflow model 1700, as shown in FIG. 17, depicts one of the workflow scenarios based on the process architecture. There could be several workflow scenarios for each process architecture and the number of workflow scenarios is directly linked to the events identified in the associated value stream event model. The workflow scenarios actually depict the sequence of activities necessary to transform the inputs into the required outputs. From these granular models, most of the requisite inputs and outputs for the enterprise will be defined as well as the logical applications (either physical or IT) that support the accomplishment of the particular workflow. From these models, the basis for the application portfolios and information architectures are derived. Therefore these models will support the construction and provide the rationale for the IT architectures (e.g. application portfolios) developed in the an enterprise IT Plan.

Information Architecture

Definition:

An Information Architecture represents what information must be delivered to individuals across the enterprise to help them effectively execute business processes and make informed decisions. The information architecture plane in the Tower contains the information and data management framework and precepts; the models for the integrated information, application, and systems management architectures; the geo-structural technology components view; and the information-applications software portfolio that address business intelligence scenarios.

Purpose:

To provide the business intelligence structure for providing employees with the ability to analyze the performance of a business and its capability to achieve the business goals, objectives, critical success factors, and performance metrics outlined in the enterprise strategic business plan. The information architecture is the cornerstone of an organization's ability to effectively manage information. This capability is critical to the discovery and exploration of information related to the critical factors and trends of a business and its industry.

Elements:
- Information and Data Management Framework:
  - Business Information Management Precepts
  - Business Intelligence Precepts
  - Information Needs and Uses
  - Information Sources
- Integrated, Application/Information/Systems Management Architecture:
  - Business Intelligence Scenarios
- Information Technology Architecture—Geo-structural Component View
- Information-applications Software Portfolio Dependencies:
- Business Goals and Objectives
- Critical Success Factors
- Business Performance Metrics
- Science and Technology Modernization Drivers
- Business Operating Principles
- Enterprise Operating Environment
- Business Architecture Rationale:

The Information Architecture provides focus on the operation of business processes and their interaction with other business functions and processes (value streams) within the enterprise, provides the ability to continually evaluate business performance and productivity and readily identify business directions for ensuring achievement of business goals, objectives, critical success factors, and performance metrics, and provides business intelligence and value-added information for strategic decision making. The Information Architecture also effectively consolidates both macro and micro information requirements and perspectives of the organization to insure information and data integrity and helps assure compatibility between informational and operational transaction systems.

Discussion:

A corporation's enterprise information architecture for enabling business intelligence is characterized by a framework that establishes decision making principles, precepts, and standards for the identification and use of information as a business resource, identifies the business intelligence scenarios within business value streams, identifying the high-level inputs and outputs, occurring in the enterprise from internal to external sources, to include those being generated by both legacy and client/server systems. The framework includes a data warehouse structure that provides the necessary high-level management and operations reports. The framework facilitates the establishment of the underlying infrastructure for managing the information asset by highlighting the required information databases and information-application components, provides a supporting application portfolio and system integration table for identifying the business intelligence applications and integration requirements, and provides a geo-structural view for relating the information and data architectural components to their corresponding logical and physical locations FIG. 18 shows an information and data management framework and precepts 1800 of the enterprise. The definition of an enterprise's information architecture includes several views that describe the information needs and uses, its owners and users and management, the forms the information is stored in and the information sources. The information and data management framework establishes decision making principles, precepts, and standards for the identification and use of information as a business resource. Also part of the framework is understanding the informational needs of the operational (tactical) side and the informational (strategic) side.

In FIG. 18, information needs and uses 1802 of the enterprise is driven by decision support 1804, business alignment 1806, and operations support 1808. Information management 1810 is controlled through knowledge management 1812, access management 1814, and storage management 1816. Information sources 1818 include internal sources 1820 as well as external sources 1822.

Figure 19:
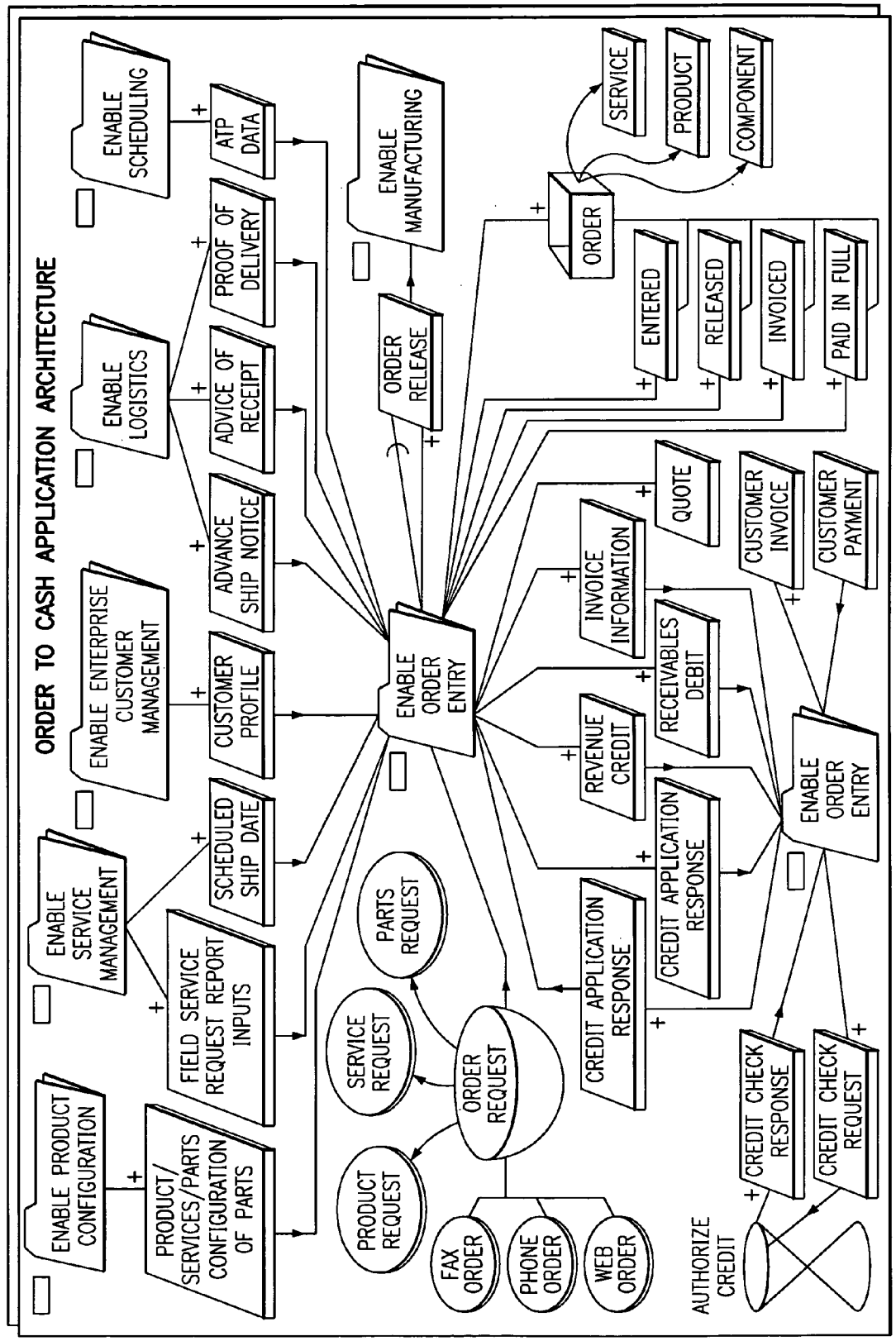
FIG. 19 illustrates business intelligence scenarios.

FIG. 19 shows an example of business intelligence scenarios 1900 for the enterprise. As a result of the overall strategic business plan and its supporting business architecture, an enterprise information architecture is required for providing business intelligence on both the internal and external business environment. For example this architecture should enable a business to explore sales, profit, forecasts, and what-if information. The information requirements (inputs and outputs and the relationships with other applications as well as value stream requirements) are identified and articulated in the enterprise strategic business models found in the enterprise business architecture. Depending on the business operating philosophy of an enterprise, the business intelligence scenarios can be designed to allow the empowerment of information-based employees throughout the enterprise. They can provide them with the ability to analyze the operations and performance of the business in accordance with established policies and rules. From available information employees should be able to identify trends within and without the enterprise and determine the required changes in response.

Figure 20:
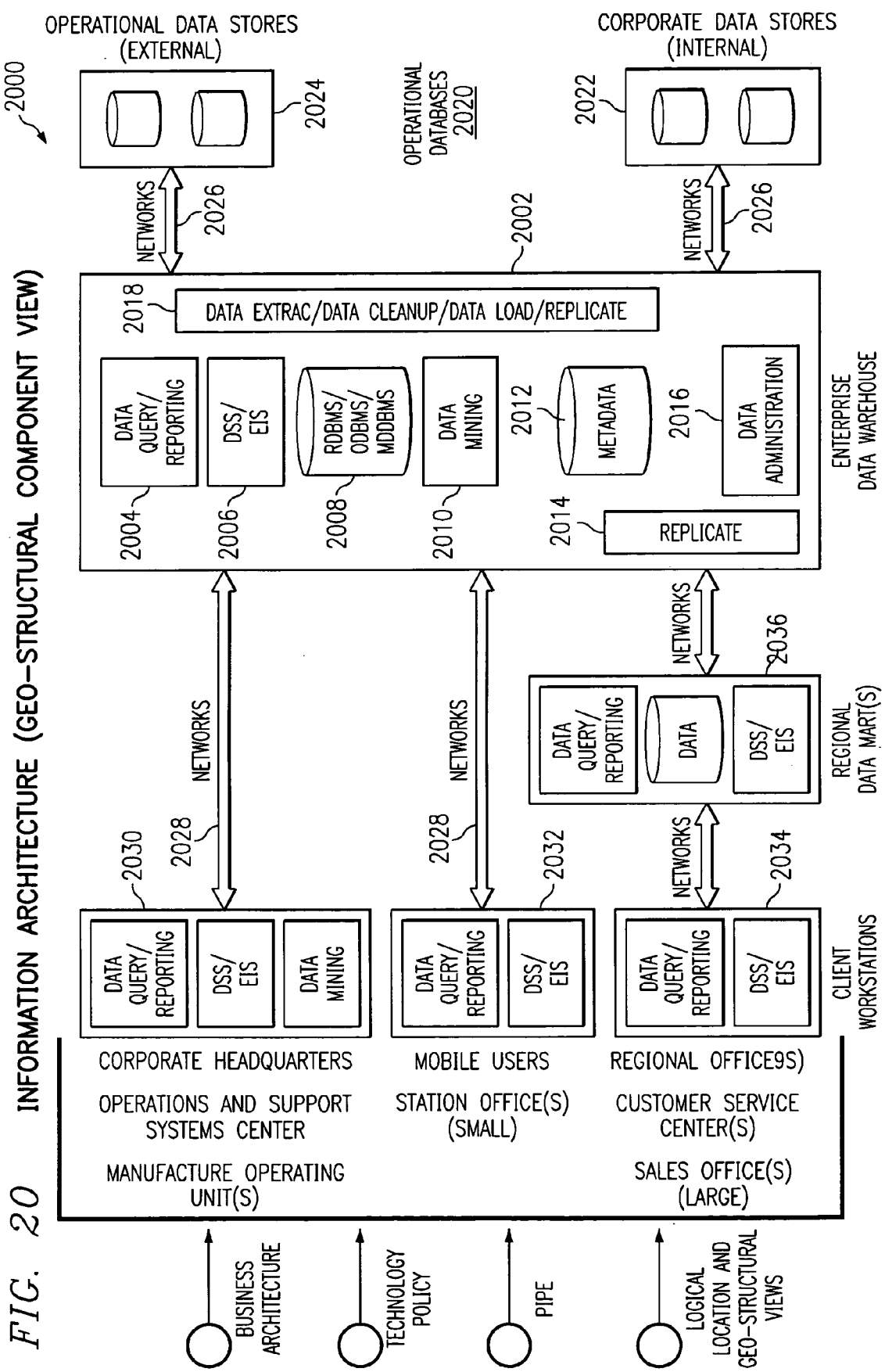
FIG. 20 illustrates a geo-structural component view for information architecture.

Finally, the enterprise information and data architecture is mapped into a geo-structural view. FIG. 20 provides an example of a geo-structural component view 2000. This view maps the information and database components of the enterprise to the pertinent business functions of the firm. The geo-structural view shows the logical location of the information and data architecture components that must be integrated and supported by a technical infrastructure. This layout will be used to develop a supporting logical technology infrastructure architecture.

In FIG. 20, information for the enterprise is controlled by an enterprise data warehouse 2002. Enterprise data warehouse 2002 may include a data query and reporting function 2004, a DSS/EIS 2006, a database management system 2008, a data mining function 2010, a metadata function 2012, a replicate function 2014, a data administration 2016, and a data processor 2018. Enterprise data warehouse 2002 has access to operational databases 2020, either internal corporate data stores 2022 or external operational data stores 2024, over networks 2026. Information is exchanged over networks 2028 by enterprise data warehouse 2002 with corporate headquarters 2030, mobile/small office users 2032, and regional/customer support/sales large office 2034 workstations. A regional data mart 2036 may support large office communications.

Figure 21:
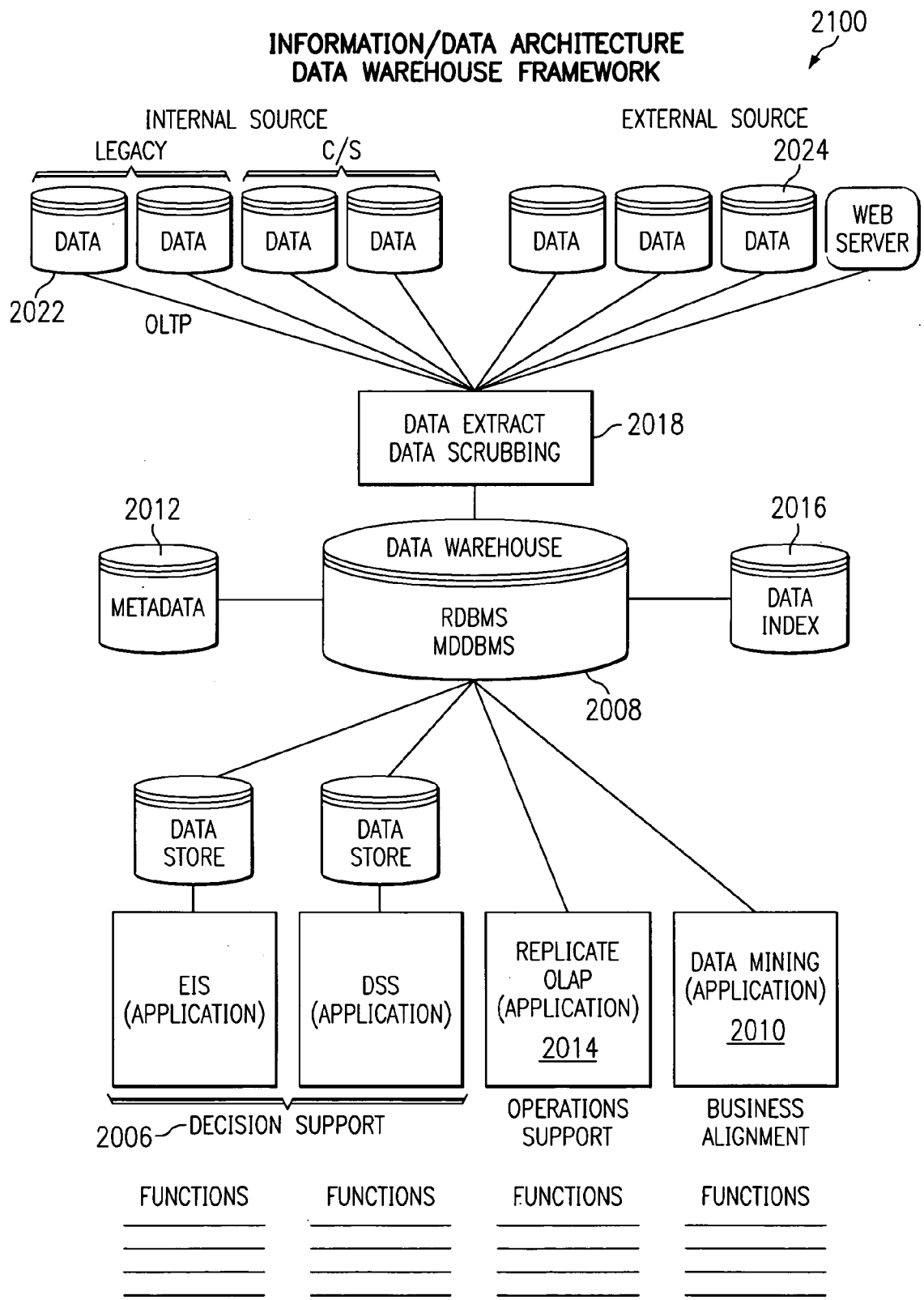
FIG. 21 illustrates an information and data architecture data warehouse framework.

Based on the databases that are required to enable business intelligence, an enterprise information and data technology data warehouse framework is formulated that identifies all the business transactions that are occurring within the enterprise from both internal and external sources. In addition the architecture identifies all of the pertinent high-level management and operations reports. This framework is oriented around the transaction and information components required to develop a data warehouse capability and enabling business intelligence within a corporation. FIG. 21 provides an example of a data warehouse framework 2100.

In FIG. 21, enterprise data warehouse 2002 operates around database management system 2008 that processes data to and from internal corporate data stores 2022 and external operational data stores 2024. Data processor 2018 performs data extraction and scrubbing between database management system 2008 and data stores 2022 and 2024. Database management system 2008 interfaces with metadata 2012 and data administration 2016 in order to execute DSS/EIS 2006, replicate 2014, and data mining 2010 applications.

In support of the business intelligence scenarios, an information-application portfolio must be identified to provide the necessary operational and management reports as well as accessing the appropriate data for other information systems. FIG. 22 provides an example of an enterprise information application portfolio and system integration matrix 2200. This matrix identifies for each of the value streams the enabling application components that should be integrated and is derived from the business process architectures and workflow scenarios. This matrix will also be found in the application architecture and enterprise IT systems management architecture because there is the possibility of cross functionality integration requirements. If this should occur, using the same matrix will make it evident.

Application Architecture

Definition:

An Application Architecture serves to support business process execution (value stream enablement) and bring information and data to the process. The application architecture defines the application software portfolio and integration relationships. Application inputs and outputs are identified as well as the application geo-structural view for deployment. Guiding principles, standards, and design characteristics support the acquisition as well as development of applications.

Purpose:

To provide a logical portfolio of applications for supporting the various business processes of an enterprise. The application portfolio is designed to illustrate the optimum distribution of applications and components across multiple business functions, processes, sites and platforms for enabling business workflow scenarios that will insure efficient and effective business operations.

Elements:

Integrated Application/Information/Systems Management Architecture (Value Stream Enablement Views)
Application Portfolio Architecture—Geo-Structural Component View
Enterprise Application Software Portfolio Integration Matrix Dependencies:

Business Goals and Objectives
Critical Success Factors
Business Performance Metrics
Business Information Management Precepts
Business Intelligence Precepts
Science and Technology Modernization Drivers
Business Operating Principles
Logical Location Models Business Architecture
Enterprise Operating Environment Characterization Rationale:

The Application Architecture identifies the appropriate enterprise business applications and the integrating requirements to support the business process architecture (value streams) and workflow scenarios, provides a means to incorporate business policies, processes, procedures, and rules to effectively operate and manage the enterprise, provides an organization the ability to streamline and integrate the operation and management of its business processes, and identifies the application portfolio and technology infrastructure requirements.

Discussion:

In support of the overall strategic business plan and its supporting business architecture, an enabling application portfolio and architecture is required for performing business operations. The application architecture identifies the logical applications required for optimizing business operations and the logical locations of those enabling applications. An enterprise application architecture consists of a portfolio of applications that enable the value streams and associated workflow scenarios. The application architecture addresses the combination of functional software applications that must be integrated to enable the business process value streams and the workflow scenarios outlined in the business architecture. The integrated application portfolio should empower the information-based employees within the company to manage the day-to-day operations of the enterprise, and allow management and business analysts to concentrate on analyzing and operating the business. A corporation's enterprise application architecture will be characterized by the required application components for enabling the enterprise value streams, a geo-structural view for relating the application architectural components to their corresponding logical and physical locations and organizational structures, and integration requirements for applications.

Identification of business enabling applications can be derived from the value stream process architecture and workflow scenario models that comprise the enterprise business architecture. In addition these models highlight the cross functional relationships with other applications and consequently identify the applications that must be integrated as well as the information and data that is passed between them as inputs and outputs. FIG. 23 provides an example of the application architecture 2300 for order to cash. This view correlates the required logical application inputs and outputs to the value streams they support. Based on the required logical applications, an enterprise application software portfolio table is formulated to show the applications that must be integrated.

Figure 24A:
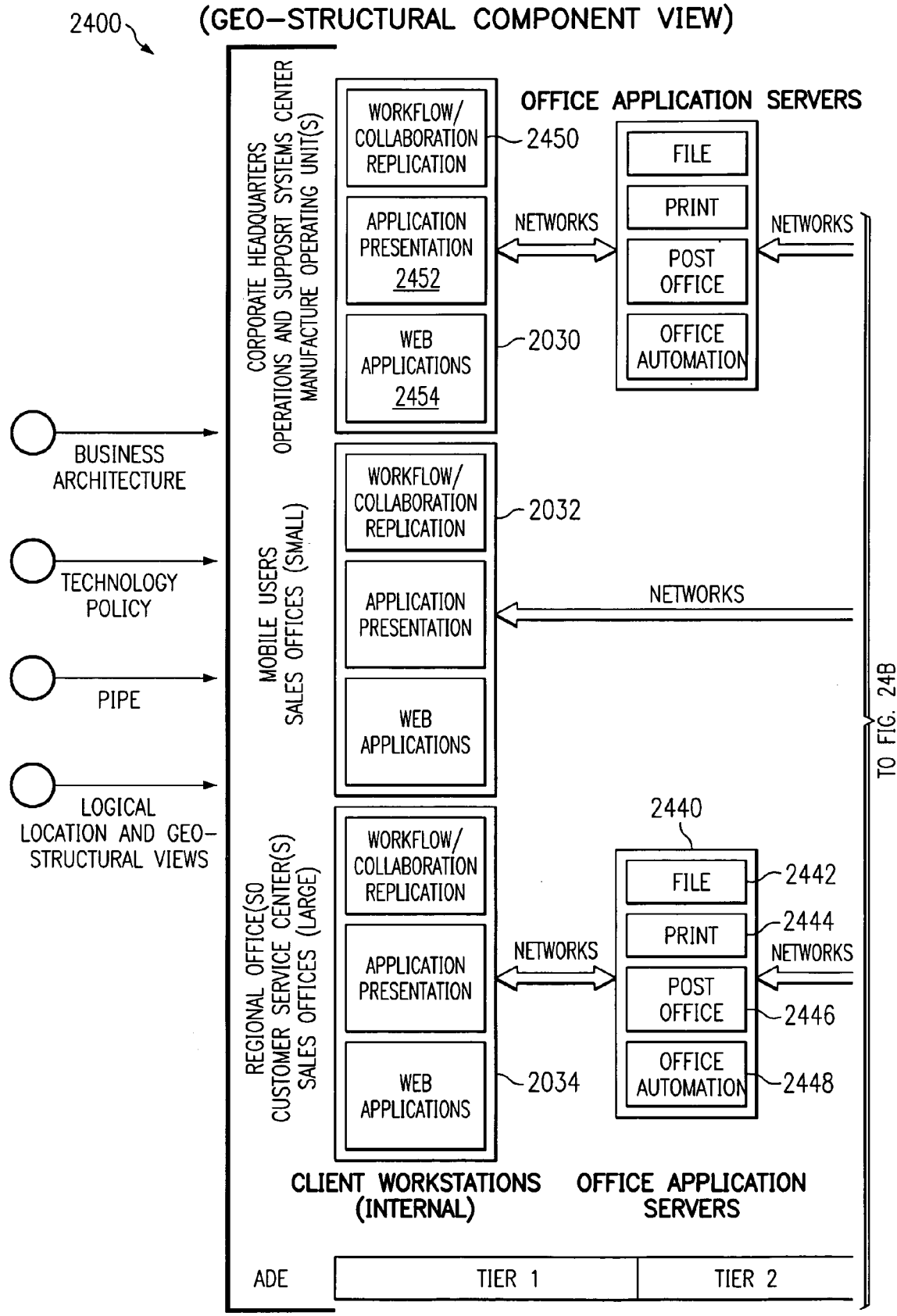
FIGS. 24A–24B illustrate a geo-structural component view for an application architecture.
Figure 24B:
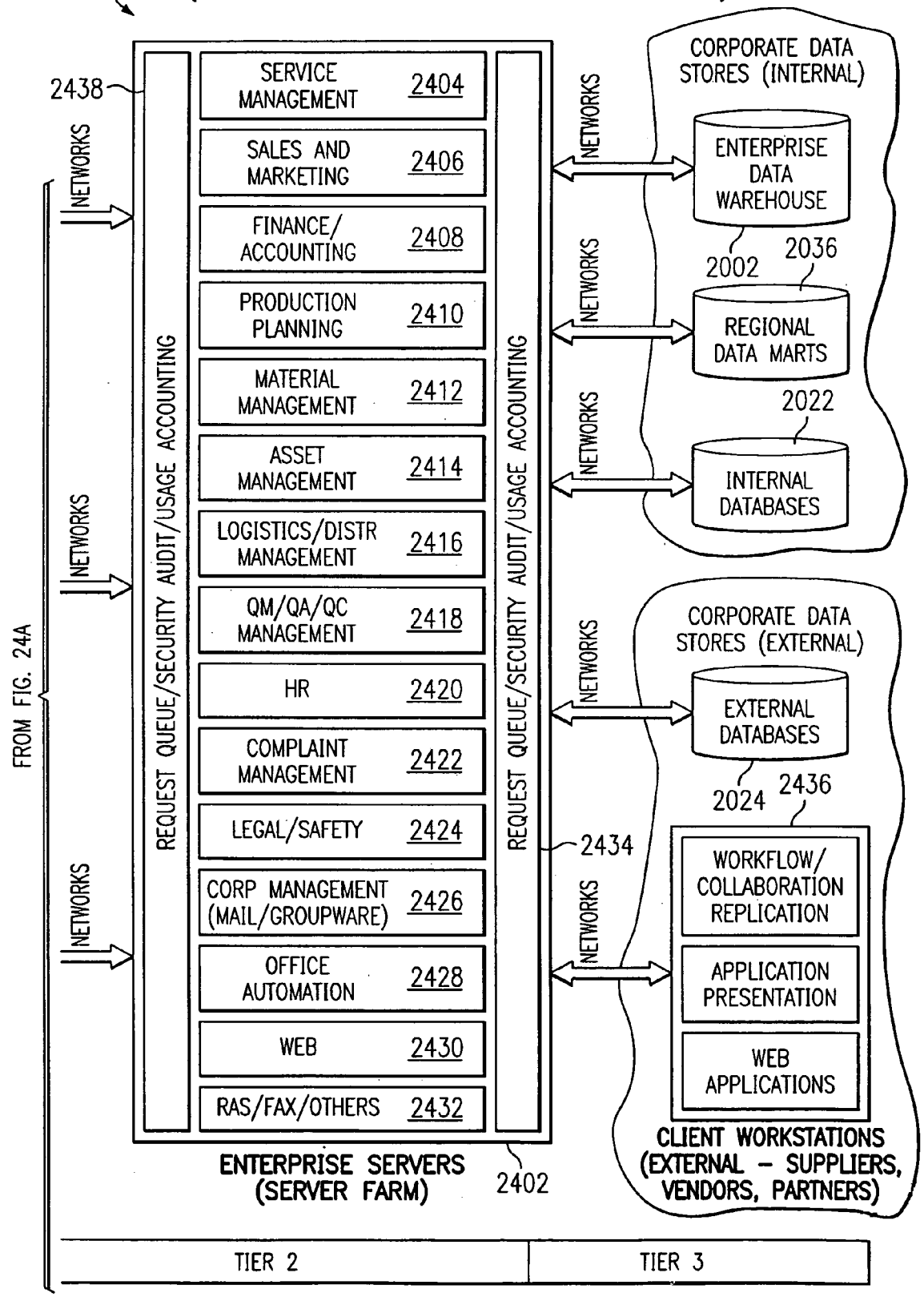

The enterprise application portfolio is then summarized into a geo-structural view. FIGS. 24A–24B provide an example of geo-structural view 2400 for a generic manufacturing company. This geo-structural view shows the logical location of the logical application portfolio components that must be integrated through a technical infrastructure in order to form the required, integrated, corporate enterprise business system.

FIGS. 24A–24B, applications for an enterprise are supervised by an enterprise server farm 2402. Enterprise server farm 2402 includes servers for service management 2404, sales and marketing 2406, financial accounting 2408, product planning 2410, material management 2412, asset management 2414, logistics and distribution management 2416, QA/QC/QM management 2418, human resources 2420, complaint management 2422, legal and safety 2424, corporate management 2426, office automation 2428, web 2430 and others 2432. An external request processor 2434 handles server access to internal corporate data stores through enterprise data warehouse 2002, regional data mart 2036, and internal databases 2022. External request processor 2434 may also provide server access to external databases 2024 and external client workstations 2436. An internal request processor 2438 provides server access to client work stations at large regional/sales offices 2034, mobile/small users and offices 2032, and corporate headquarters 2030 either directly or through an office application server 2440. Office application server 2440 may include print 2442, file 2444, post office 2446, and office automation 2448 functions. Client workstations may include workflow/collaboration replication 2450, application presentation 2452, and web applications 2454 capabilities.

FIG. 25 provides an example of a template 2500 for capturing an enterprise application portfolio. This matrix is derived from the business process architectures and workflow scenarios. This matrix will also be found in the information architecture and enterprise IT systems management architecture because there is the possibility of cross functionality integration requirements. If this should occur, using the same matrix will make it evident. In support of the enabling applications portfolio, a corresponding application portfolio "best practices" recommendations table can be developed that highlights "best of breed" products. PIPE or a similar process is the logical extension of making integrated technology recommendations.

FIG. 26 provides an example of a recommendations table 2600 that could be derived that highlights the "best of breed" products for enabling business processes.

Technology Infrastructure Architecture

Definition:

A Technology Infrastructure Architecture enables access to information and provides support for the execution of activities. This plane contains the standards and policies or "building codes" for infrastructure construction. This plane also contains the logical location software deployment schemas as well as a characterization of the infrastructure environment to provide the base line for the target environment. It also provides identification and views of the future geo-structural layouts with IT platform operating requirements and characteristics that will provide the basis for engineering blueprints and deployment.

Purpose:

The enterprise technology infrastructure architecture provides the technology structure to support the information, application, and enterprise IT systems management architectures. The infrastructure architecture describes the underlying systems and associated platforms to integrate the business intelligence and business application portfolios into an enterprise information system.

Elements:
  Standards, Policies, and Governance
  Logical Location Software Deployment Schemas
  Operating and Systems Requirements and Characteristics
  Technology Infrastructure Architecture—Geo-structural Component View (with Linkages to Lower Level Technical Component Architectures)

Dependencies:
  Business Goals and Objectives
  Critical Success Factors
  Business Performance Metrics
  Business Information Management Precepts
  Business Intelligence Precepts
  Science and Technology Modernization Drivers
  Business Operating Principles
  Logical Location Models
  Business Architecture
  Enterprise Operating Environment Characterization
  Information/Data Architecture
  Application Architecture Rationale:

The Technology Infrastructure Architecture provides the supporting platforms and technology structure for information-empowered employees (e.g. business analysts, knowledge-based marketing and sales agents, operations and support system managers, and corporate executives) within an enterprise. The Technology Infrastructure Architecture also produces the technical structure for a seamless flow of information throughout the business enterprise to support enabling business processes, helps leverage economies-of-scale for IT procurement, improves the quality and efficiency of IT support, and eases integration efforts through technical consistency.

Discussion:

In support of the information and application architectures, and IT system management framework, an underlying technical infrastructure architecture must be defined. The infrastructure architecture addresses the systems and networking structures that support the application portfolios that enable the value streams and workflow scenarios outlined in the business architecture. The infrastructure framework allows common and consistent operating environments to be established. The infrastructure architecture identifies and graphically depicts the underlying networking structures and associated platforms, operating systems, and protocols that enable the information, application and systems-management systems. The technical infrastructure architecture is characterized by highlighting in the corporation's enterprise infrastructure view the required system components for enabling the value streams and ensuring effective and efficient performance of these systems, establishing a common operating environment that will standardize operating practices throughout the enterprise and allow for ease-of-use and ease-of-training of end users, and developing a supporting Technical Infrastructure "Best Practices" Recommendations table or process that highlights the "best of breed" products for integrating the firm's enterprise information systems that allow for optimizing and controlling costs.

A technology policy, based on The Open Group Architectural Framework (TOGAF) model, (see the technical reference model 2700 in FIG. 27) is a vehicle to articulate consensus and provide a basis so that those involved in making decisions concerning acquisition and application of various technologies will have adequate and appropriate information on which to base their decisions. Technology policies provide guidelines on which technologies to use and which to avoid and recommends specific tools, vendors, or systems when appropriate, and establish a common operating environment that will standardize operating practices throughout the enterprise and allow for ease-of-use and ease-of-training of end users.

A technology policy will be characterized by providing an overview of each technology, making statements of policy concerning the specified technologies and provides details on the components involved, providing a time frame for the deployment of recommended technologies, providing guidelines for decisions or recommendations of specific tools, and documenting current views on technology and communicating a consistent technology direction.

Figure 27:
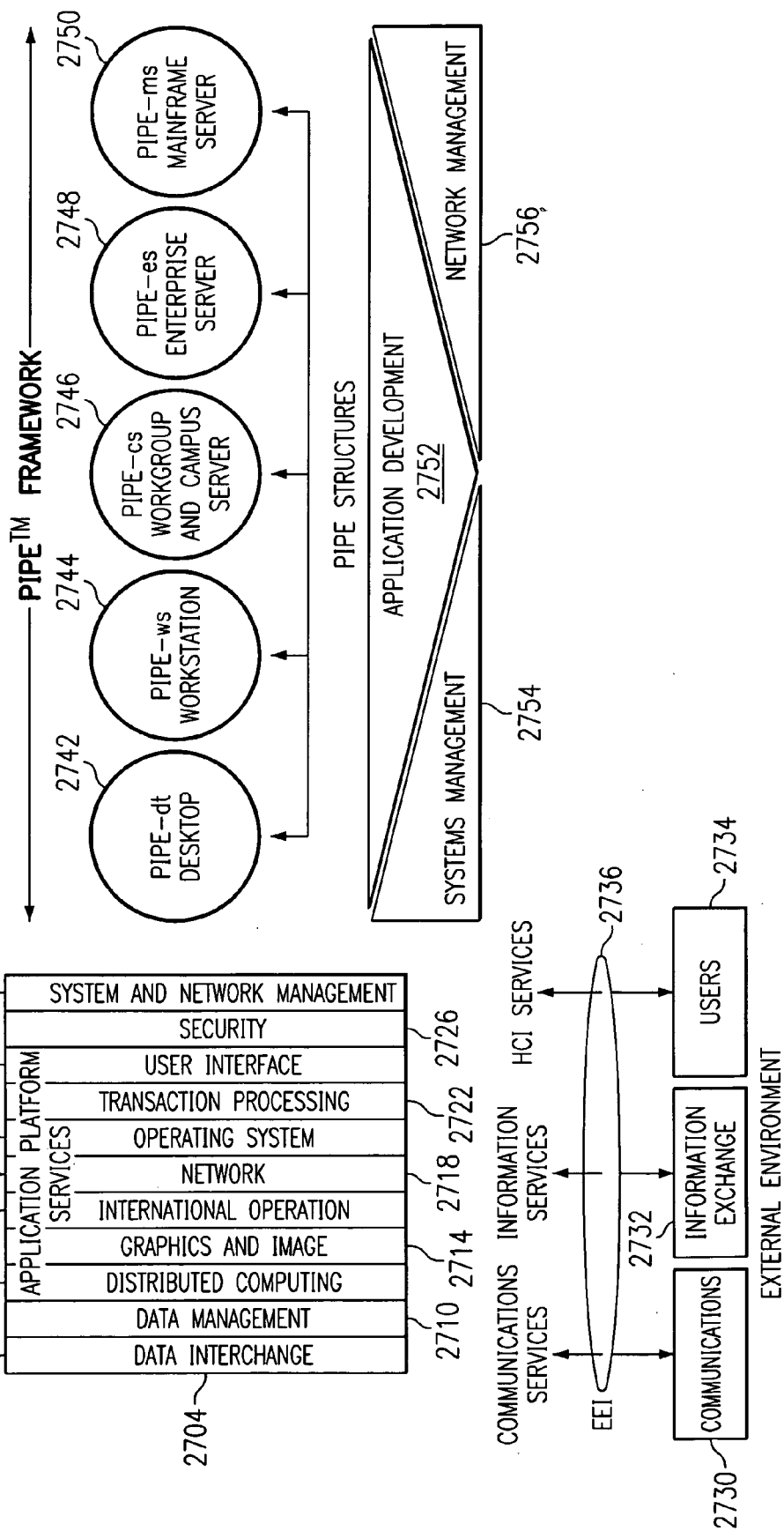
FIG. 27 illustrates a technical reference model, associated platform, and governance structure of policies and standards.

In FIG. 27, Technical reference model 2700 includes application software 2702 that executes on application platform services 2704 through an application programming interface 2706. Application platform services 2704 encompasses items such as data interchange 2708, data management 2710, distributed computing 2712, graphics and imaging 2714, international operation 2716, network 2718, operating system 2720, transaction 1 processing 2722, user interface 2724, security 2726, and system and network management 2728. Access to applications platform services 2704 is provided to communications 2730, information exchange 2732, and users 2734 of an external environment through an external environment interface 2736.

A Primary Integrated Platform Environment (PIPE) framework 2740 includes PIPE applications for desktop 2742, workstation 2744, workgroup/campus server 2746, enterprise server 2748, and mainframe server 2750. Structures for the PIPE framework 2740 include applications development 2752, systems management 2754, and network management 2756.

When possible, standards are listed in addition to specific products that comply with the stated standards. The technology policy is meant to provide technology direction. The focus is on core standards that can be used as the foundation for information technology implementations. A PIPE type process should work in hand with the technology policies. The PIPE process and strategy of selecting, refreshing, testing and certifying IT products and platforms will insure a validated, consistent, and integrated compute environment.

In order to arrive at the consolidated technology infrastructure architecture a series of models are derived from the models created in the business architecture. The logical location connectivity model, depicted in FIG. 28 connects the logical locations identified in the business architecture with the input media for each event found in the value stream event model to the logical application software identified in the application architecture.

Figure 28:
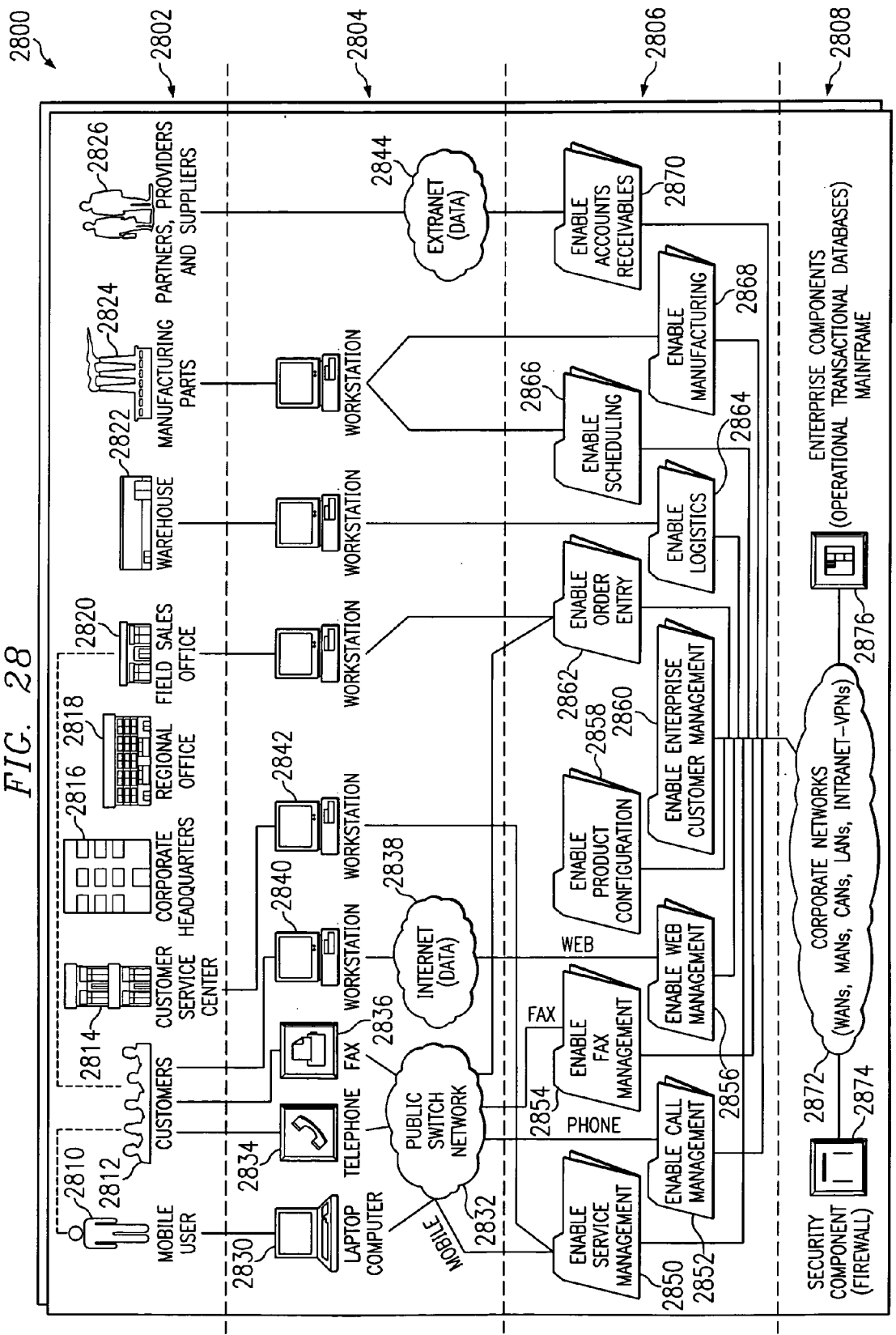
FIG. 28 illustrates a logical location connectivity model.

In FIG. 28, connectivity model 2800 is separated into logical locations 2802, event medium 2804, application portfolio 2806, and technology infrastructure 2808. Logical locations include mobile users 2810, customers 2812, customer service 2814, corporate headquarters 2816, regional offices 2818, field sites 2820, warehouses 2822, manufacturing plants 2824, and partners/providers/suppliers 2826. Event medium 2804 includes laptop computers 2830 to allow mobile users access to application portfolio 2806 through a public switched network 2832. Customers 2812 gain access to application portfolio 2804 via public switched network 2832 using telephones 2834 and by fax 2836. Customers 2812 may also be given access via an internet network 2838 using a workstation 2840. Access to application portfolio 2806 for other logical locations 2802 may be through worstations 2842 or an extranet connection 2844.

Logical locations 2802 access specific applications in the application portfolio 2806 dependent upon the triggering event in the value stream. Applications within application portfolio 2806 may include enable service management 2850, enable call management 2852, enable fax management 2854, enable web management 2856, enable product configuration 2858, enable enterprise corporate management 2860, enable order entry 2862, enable logistics 2864, enable scheduling 2866, enable manufacturing 2868, and enable accounts receivables 2870. Content and supervision of application portfolio 2806 is performed by corporate networks 2872 in conjunction with a security component 2874 and enterprise departments 2876 in technology infrastructure 2808.

The logical location connectivity model is created for each value stream. Aggregation of these models is accomplished by mapping the logical applications identified for each logical location into the matrix 2900 in FIG. 29. The logical applications are grouped into logical software components equivalent to software that can be readily obtained as commercial off the shelf. These logical software components set the initial basis for the software deployment over a geographical or logical area. By taking the individual logical location entries found in FIG. 29 and modeling each instance, as shown in FIG. 30, the engineering premise begins to emerge that upon consolidation gives the technology infrastructure geo-structural component view.

In FIG. 30, modeling of a simplified logical software deployment 3000 for a mobile user 2810 is shown. Mobile user 2810 may interface with customers 2812 which would require access to specific software applications within the enterprise. Mobile user 2810 gains access to logical software components through laptop computer 2830 or other workstation and corporate networks 2872. Logical software components may include security 2874, enterprise information technology management 3002, office automation 3004, enterprise customer management 3006, human resources 3008, sales force automation 3010, and other enterprise components 3012.

FIGS. 31 and 31A–31D provide an example of a technical infrastructure logical/physical view 3100. This view correlates the required system components and infrastructure requirements of the enterprise for enabling the value streams and workflow scenarios to the logical location maps and templates from the business architecture plane. From the logical infrastructure depictions in FIGS. 31 and 31A–31D coupled with the logical location deployment schemas, the lower level technology component architectures (e.g. internet) can be identified and consequently engineered. The logical location software models and the consolidated technology infrastructure architectures identify the logical applications that need to integrate and operate together, portray the enabling operational elements, processes and technology components for achieving the desired operating results based on the organization's business goals, objectives, critical success factors, and performance metrics, and highlight the system integration requirements in support of the information, application, systems management, and infrastructure architectures.

In support of the underlying technical infrastructure architecture, a corresponding "best practices" recommendations table 3200 highlights the "best of breed" products for integrating the firm's enterprise applications and information systems. FIG. 32 provides an example and might be derived from a process like PIPE and directed by the technology policy. The product recommendations are not considered to be part of the Tower but are depicted here to illustrate how they might be derived for a particular enterprise.

Enterprise IT Management Framework

Definition:

The Enterprise IT Management Framework outlines the operational and business management of providing IT resources. The Framework consists of guidelines to manage the client relationships, the management of services, establishing an application selection and development process, and identifying approaches for systems and network management, and systems element management.

Purpose:

An enterprise IT management framework provides for the exchange of IT systems management information with information technology systems and services within a corporation's enterprise. Additionally it provides the structure to define optimum value to the client by defining demand, products and services, fulfillment of demand, and the planning and managing of all aspects of IT. The IT systems management framework ensures the reliability, availability and serviceability of information services and systems. This architecture allows a corporation to plan, monitor, and manage enterprise information technology resources in a consistent manner. These resources include people, heterogeneous networks, communications systems, servers, desktops, applications, and databases.

Elements:
    IT System Management Framework
        ITU-T System Management Business Model
        IT Systems Management Workflow scenarios
    IT Systems Management Technology Architecture—Geo-structural Component View IT Systems Management Software Portfolio (Systems Integration Matrix)
Enterprise IT Management Organization Model Dependencies:
Business Goals and Objectives
Critical Success Factors
Business Performance Metrics
Business Information Management Precepts
Business Intelligence Precepts
Science and Technology Modernization Drivers
Business Operating Principles
Logical Location Models
Business Architecture
Information/Data Architecture
Application Architecture
Technology Infrastructure Architecture Rationale:

The Enterprise IT Management Framework helps to manage the resources of the IT business relationships with the client and external service suppliers or operating partners and monitors, manages, and addresses the actual delivery of the enabling IT services to the client and any partners. The Enterprise IT Management Framework ensures high availability of information technology services. The Enterprise IT Management Framework provides the IT network and system management capability to monitor, manage, and maintain the efficient and effective performance of the enterprise information system and its supporting communications networks. The Enterprise IT Management Framework also monitors and manages the availability and operational status of critical elements, components, and devices within the enterprise information system in a consistent, continuous and constant manner.

Discussion:

The enterprise systems management structure will assure that IT services will be defined accurately and delivered in a dependable manner. The architectural framework discussed within this section outlines an enterprise systems management capability for ensuring the reliability, availability, and serviceability of a corporation's enterprise information system. The successful planning and execution of this framework will provide significant value to the enterprise by utilizing IT to enable business processes and allow more effective decision making.

The IT systems management framework is created to support a corporation's information, application, and infrastructure architectures, as well as the services the IT organization provides. The ITU-T Systems Management Business Model shown in FIG. 33 outlines the functional areas that IT management must perform well to effectively become a business partner with their client. This model will help to define the processes to allow IT to become an integral and valued component of the enterprise and a means to a competitive advantage.

Figure 33:
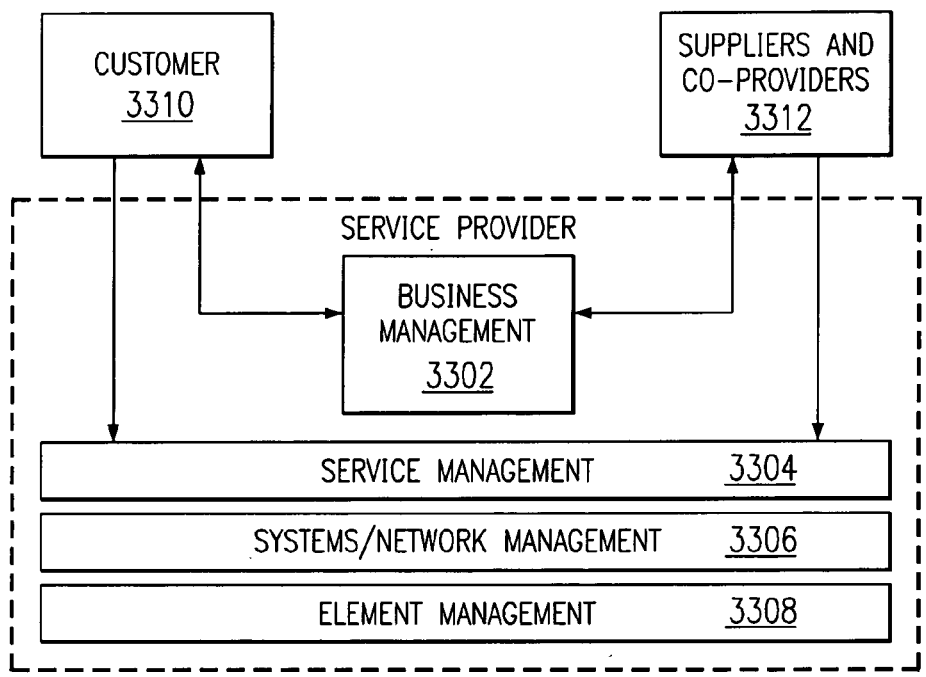
FIG. 33 illustrates a system management business model.

In FIG. 33, the business model 3300 includes business management 3302, service management 3304, systems/network management 3306, and element management 3308. The components of business model 3300 will allow a business to interface with customers 3310 and suppliers/providers 3312 in an effective manner.

Figure 34:
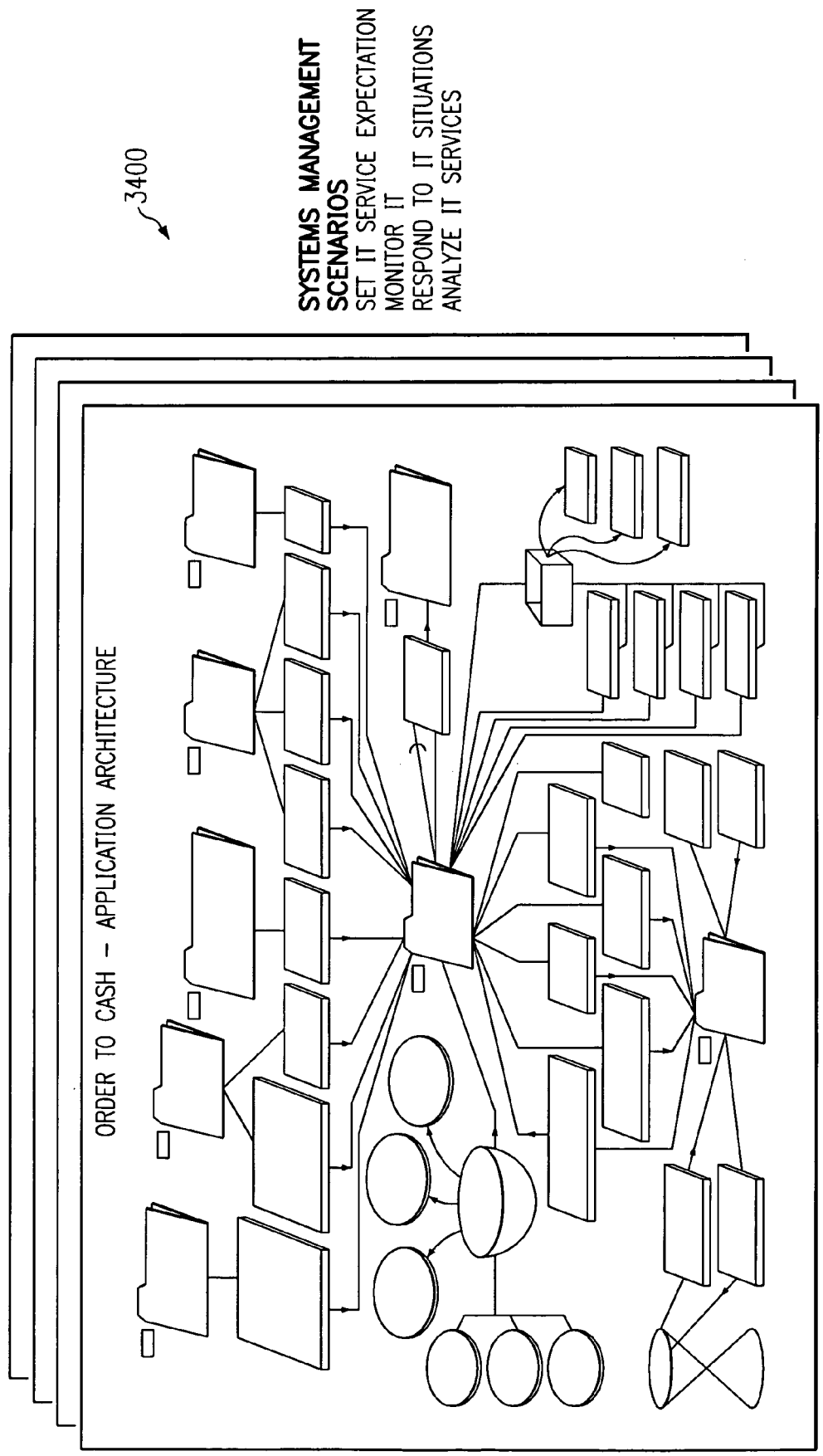
FIG. 34 illustrates enterprise systems management process models.
Figure 35A:
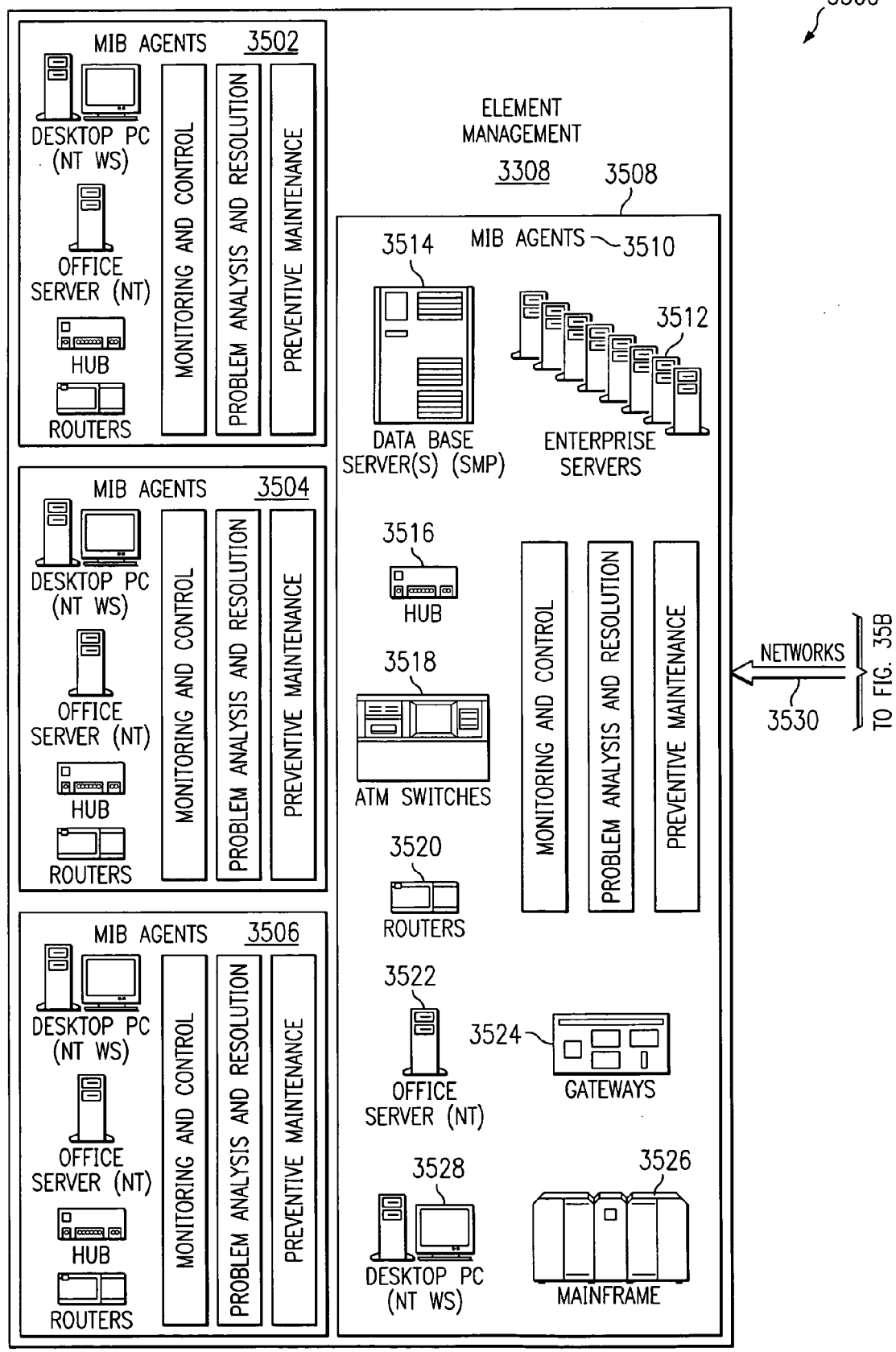
Figure 35C:
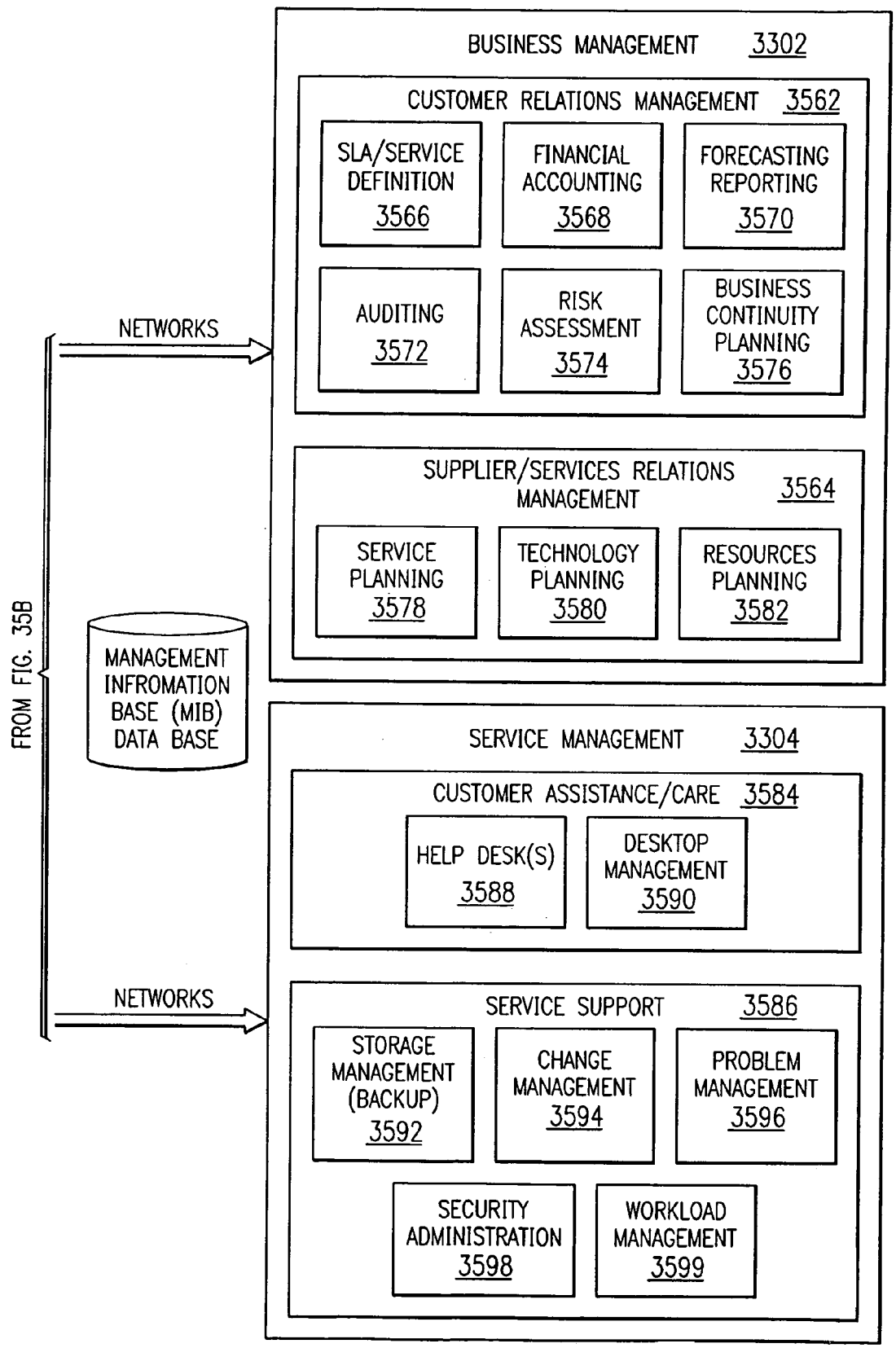

Based on the enterprise business models, the IT management processes, and workflow scenarios can be identified that are required for ensuring that system performance is achieved and information services delivery are met based on Service Level Agreements. Subsequently, each of the systems management scenarios identified will have its associated IT systems management process architectures and workflow scenario models 3400 as shown in FIG. 34. The models will show the integrating activities and their associated operating inputs and outputs required for insuring that the enterprise operating environment is available and functional. The major systems management workflow scenarios are distilled into the following major categories: Set IT Service Expectation, Monitor IT, Respond to IT Situations, and Analyze IT Services. The integrated application/information/systems management process architectures and the supporting workflow scenario models will identify the logical IT organizational functions and systems that need to operate and integrate together, portray the enabling operational elements, processes and technology components for achieving the desired delivery of services results based on the corporation's business goals, objectives, critical success factors, and performance metrics that have been documented in Service Level Agreements, and highlight the system management requirements for ensuring that system performance is achieved, the highest reliability level of the enterprise information system is attained, and information services delivery are met based on Service Level Agreements. The integrated application/information/systems management process architectures models will then become the mechanism for ensuring a mutual understanding of what needs to be done among the IT business managers, process owners, and IT system administrators and operators. These models will identify the necessary common technological components required for managing the enterprise information system across the entire enterprise operating environment through employment of IT workflow management practices and technological components.

An enterprise systems management technology architecture 3500 shown in FIGS. 35 and 35A–35C can be constructed to depict the technology layout based on the ITU-T Systems Management Business model 3300 and mapped to the logical location maps of the enterprise. The geo-structural view highlights where the enabling application architectural components of the Enterprise Systems Management Software Portfolio are logically located within the enterprise. The geo-structural view shows the logical location of all the logical systems management application components that must be integrated together through a technical infrastructure to create the required, integrated, corporate enterprise systems management environment.

In FIGS. 35 and 35A–35C, element management 3308 of business model 3300 includes sales/manufacturing locations 3502, customer service centers 3504, corporate/regional headquarters 3506, and operations centers 3508. Each location of element management 3308 may include management information base agents 3510, enterprise servers 3512, database servers 3514, hubs 3516, ATM switches 3518, routers 3520, office servers 3522, gateways 3524, mainframe 3526, and desktop computers 3528. Element management 3308 communicates with systems/network management 3306 over a network 3530. Systems/network management 3306 may include at an operations center 3532 having performance management 3534, event management 3536, configuration management 3538, and systems support 3540 functions. Event management may further include systems monitoring 3542, network monitoring 3544, and fault management 3546. Systems support 3540 may have object management 3548, print management 3550 directory services management 3552, time management 3554 software/media management 3556, security services 3558 and web server management 3560.

Business management component 3302 is divided into customer relations management 3562 and supplier/services relations management 3564. Customer relations management 3562 may include departments such as service definition 3566, financial accounting 3568, forecasting/reporting 3570, auditing 3572, risk assessment 3574, and business continuity planning 3576. Supplier/services relations management may include service planning 3578, technology planning 3580, and resource planning 3582. Service management 3304 is divided into customer assistance/care 3584 and service support 3586. Customer assistance/care includes help desks 3588 and desktop management 3590. Service support 3586 includes storage management 3592, change management 3594, problem management 3596, security administration 3598 and workload management 3599.

Based on the identified logical systems management applications that are required to enable the IT systems management processes and workflow scenarios, an integration table 3600 as shown in FIG. 36 is formulated that identifies the array of systems management applications that must be integrated together as well as with other applications. This matrix will also be found in the information architecture and application architectures because there is the possibility of cross functionality integration requirements. If this should occur, using the same matrix will make it evident.

Figure 37:
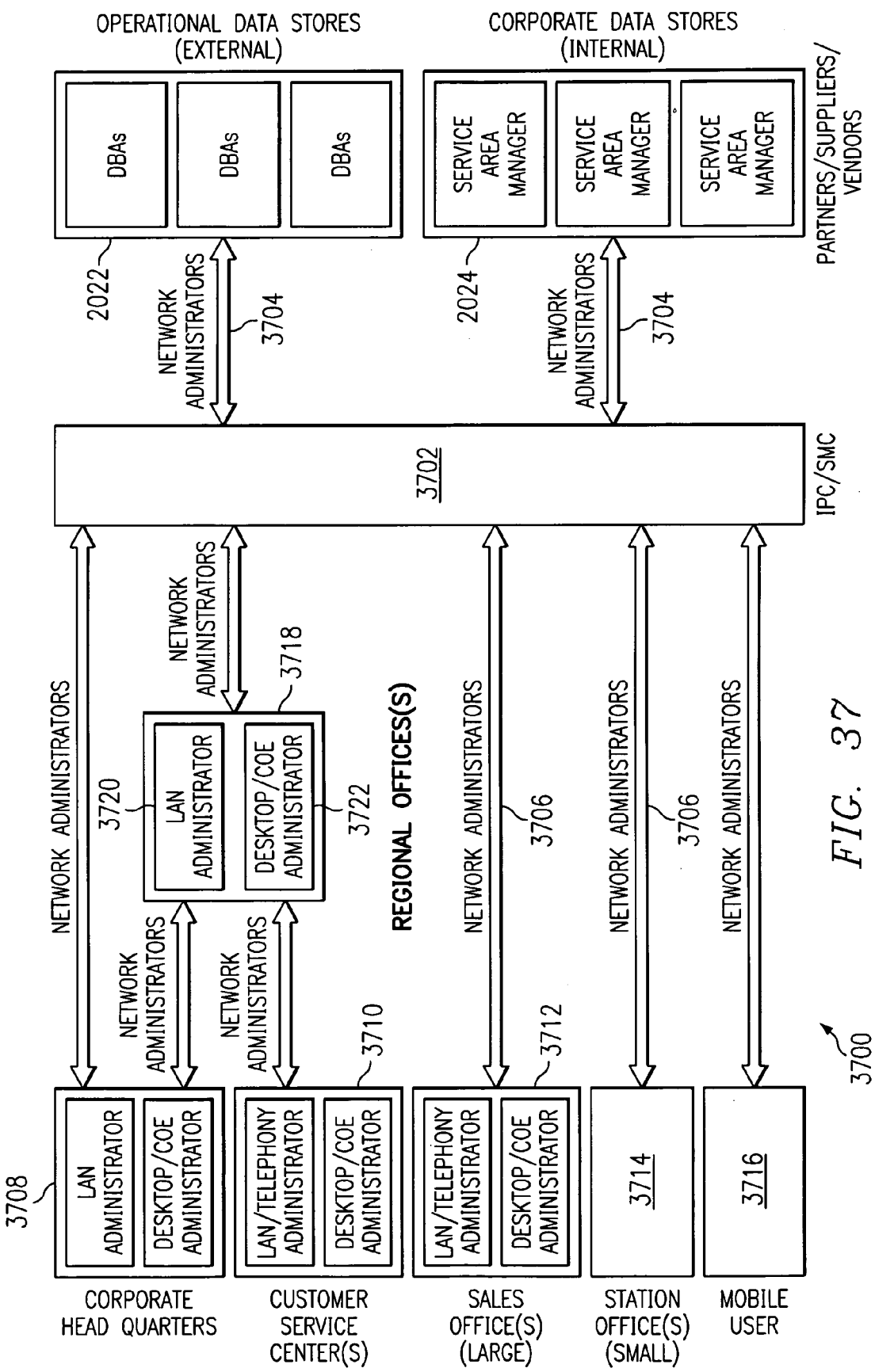
FIG. 37 illustrates a geo-structural component view for an enterprise information technology management organizational framework.

The final geo-structural view 3700 as shown in FIG. 37 is of the Enterprise IT Management Organizational framework to illustrate the logical and physical locations of the various organizational components that manage the IT systems and resources. In FIG. 37, a service management center 3702 communicates with internal corporate data stores 2022 and external operational data stores 2024 over network administrative busses 3704. Service management center 3702 processes network administration data 3706 to and from corporate headquarters 3708, customer service centers 3710, large sales offices 3712, small sales offices 3714, and mobile users 3716 either directly or through regional offices 3718. Each location may include a local area network and telephony administrator 3720 and a desktop administrator 3722.

Figure 38A:
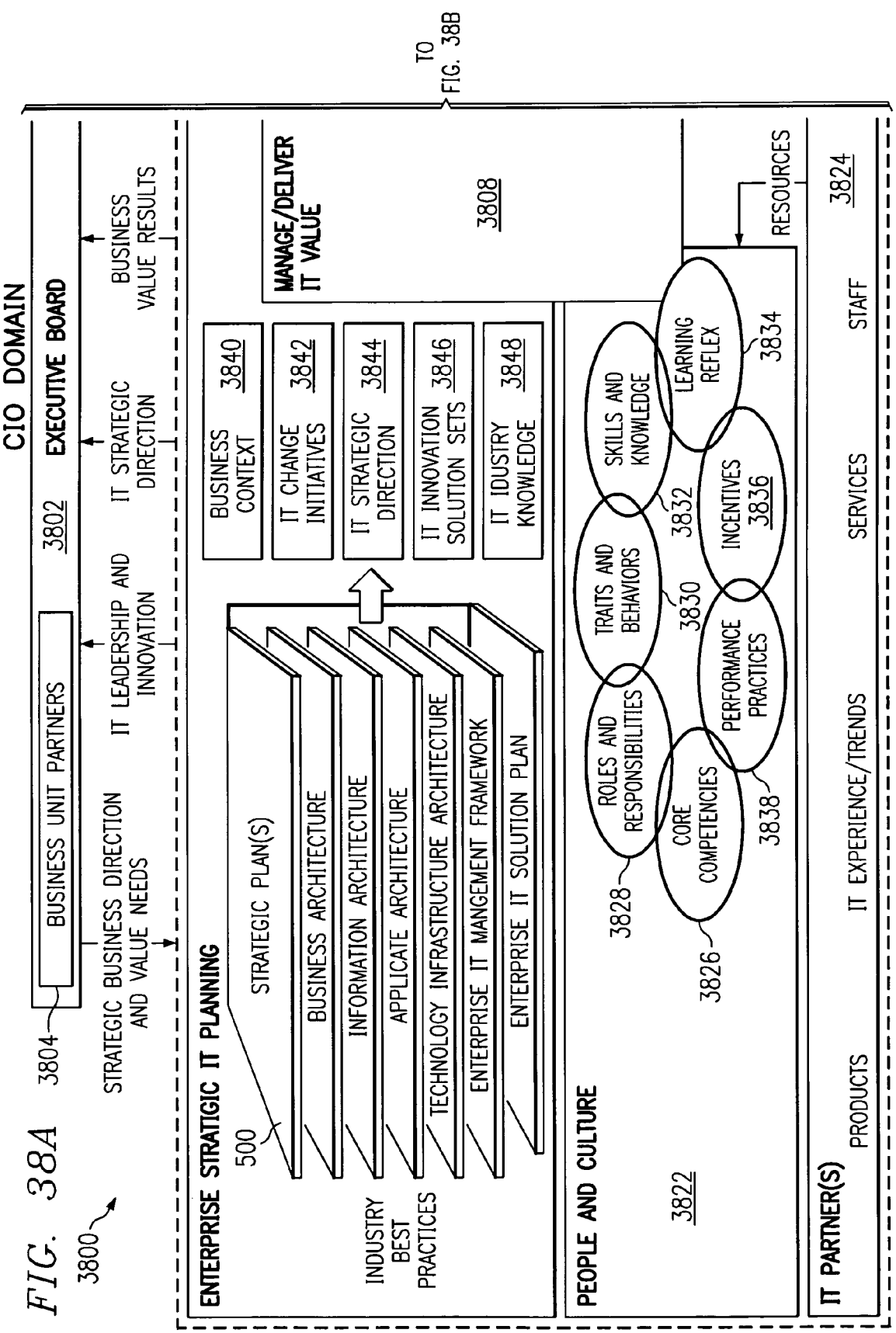
Figure 38B:
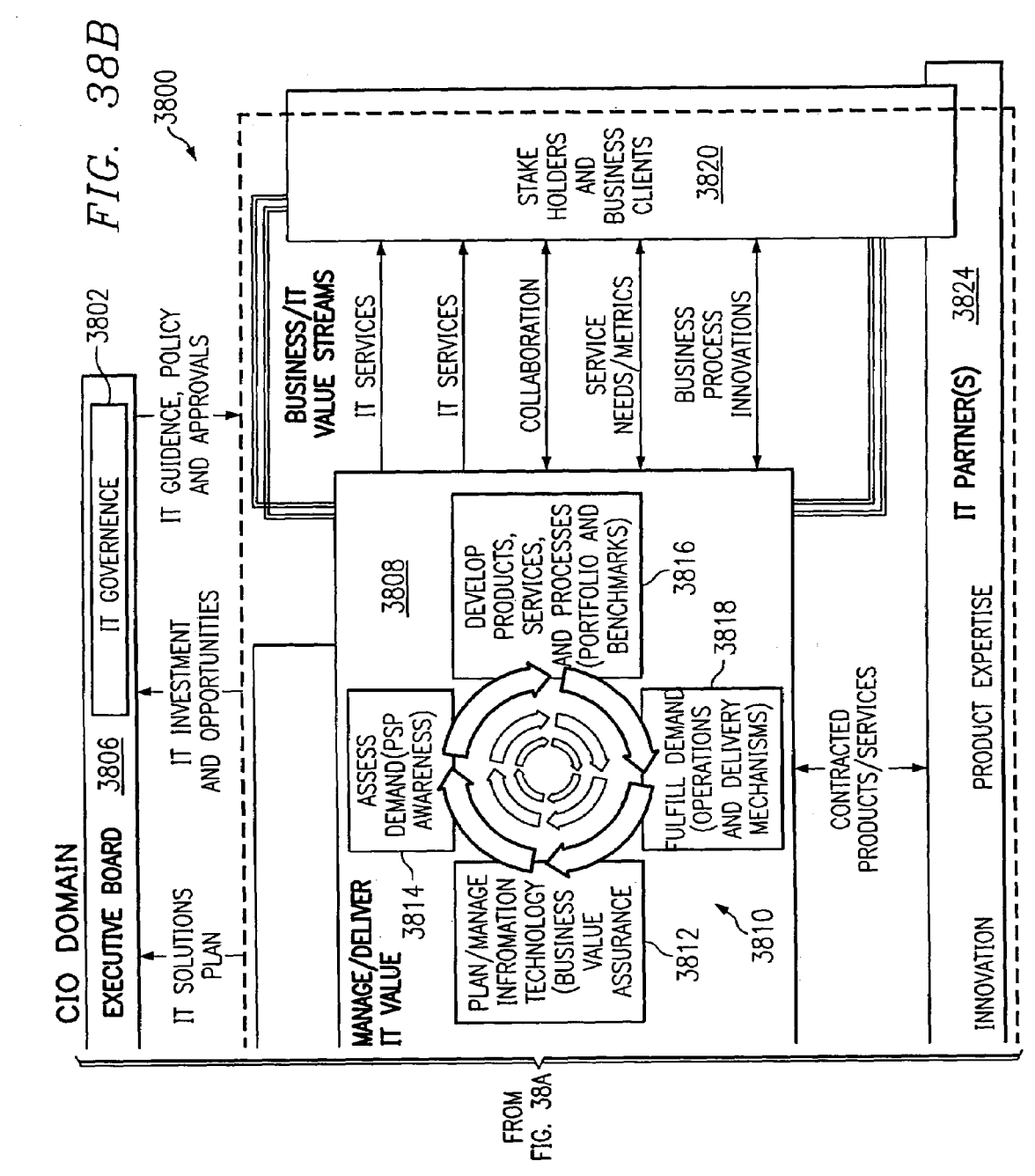

FIGS. 38A–38B depict the IT organizational model 3800 from which the IT organization areas can be identified and modeled. An executive board 3802 includes business unit partners 3804 and IT governance 3806. Executive board 3802 provides strategic business direction and value needs and IT governance, policy, and approvals in response to IT leadership and innovation, strategic direction, solutions plan, investment and opportunities and business value results inputs from the enterprise. The enterprise performs a manage/deliver IT value function 3808 that uses an IT supply chain model 3810 with plan/manage information technology 3812, assess demand 3814, develop products, services, and processes 3816, and fulfill demand 3818 links. Manage/deliver IT value function 3808 generates IT products and IS services for stakeholders and business clients 3820 in response to collaboration, service needs and metrics, and business process innovations developed with them. Manage/deliver IT value function is driven by Tower model 500 in conjunction with the people and culture 3822 of the enterprise and its IT partners 3824. IT partners 3824 provide products, experience, trends, services, staff, innovation, and expertise to assist the people and culture 3822 of the enterprise to implement IT development and delivery. Aspects of the people and culture 3822 of the enterprise that are important both individually and to the enterprise include identification of core competencies 3826, roles and responsibilities 3828, traits and behaviors 3830 skills and knowledge 3832, learning reflex 3834, incentives 3836, and performance practices 3838. Tower model 500 provides a business context 3840, IT change initiatives 3842, IT strategic direction 3844, IT innovation solution sets 3846, and IT industry knowledge 3848 in order to deliver the enterprise's IT value.

Building an Enterprise Strategic IT Plan

The main purpose of the Enterprise Strategic IT Planning Framework Tower model is to identify all of the components and elements necessary to define an enterprise IT architecture and develop an IT plan that is strategically aligned with an organization's business direction. In addition, the Tower contains reference models representing each component element. Approaches and work patterns employing the appropriate processes, and methodologies will then work towards building, modifying, enhancing, and appropriately consolidating the suggested content of the models into a desired result. The result or deliverable is wholly contingent upon what requirements are to be met by the plan. What models are contained in the deliverable are dependent upon the state of the existing and future environments addressed by the planning initiative. For example, if the application architecture has already been defined by a previous business architecture and transformation initiative then this part of the plan will not have to be recreated and "delivered". If the same initiative provided the appropriate business models and requisite information required by the Tower then those models will suffice and will not have to be rebuilt.

Figure 39:
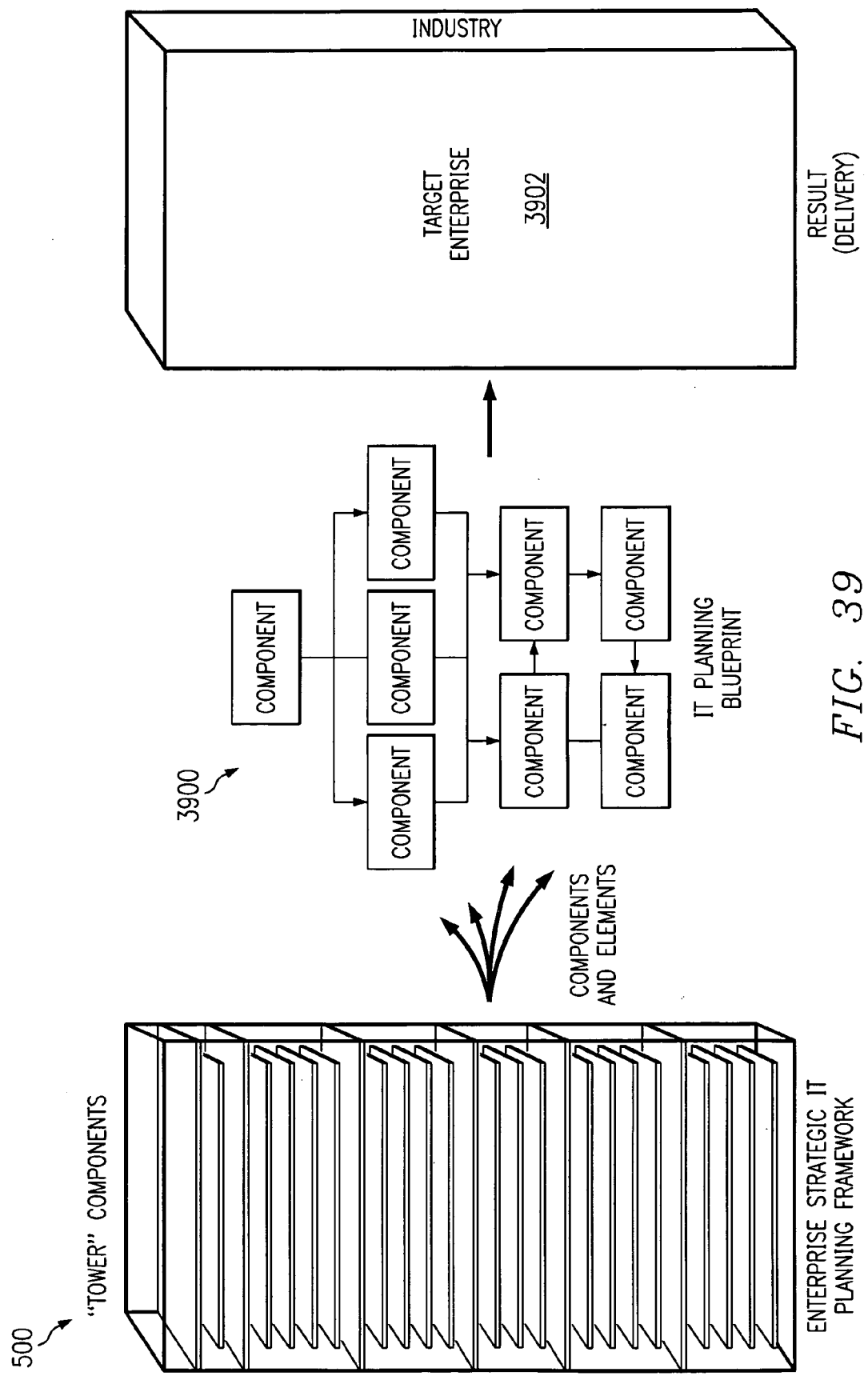
FIG. 39 illustrates a framework blueprint.
Figure 40:
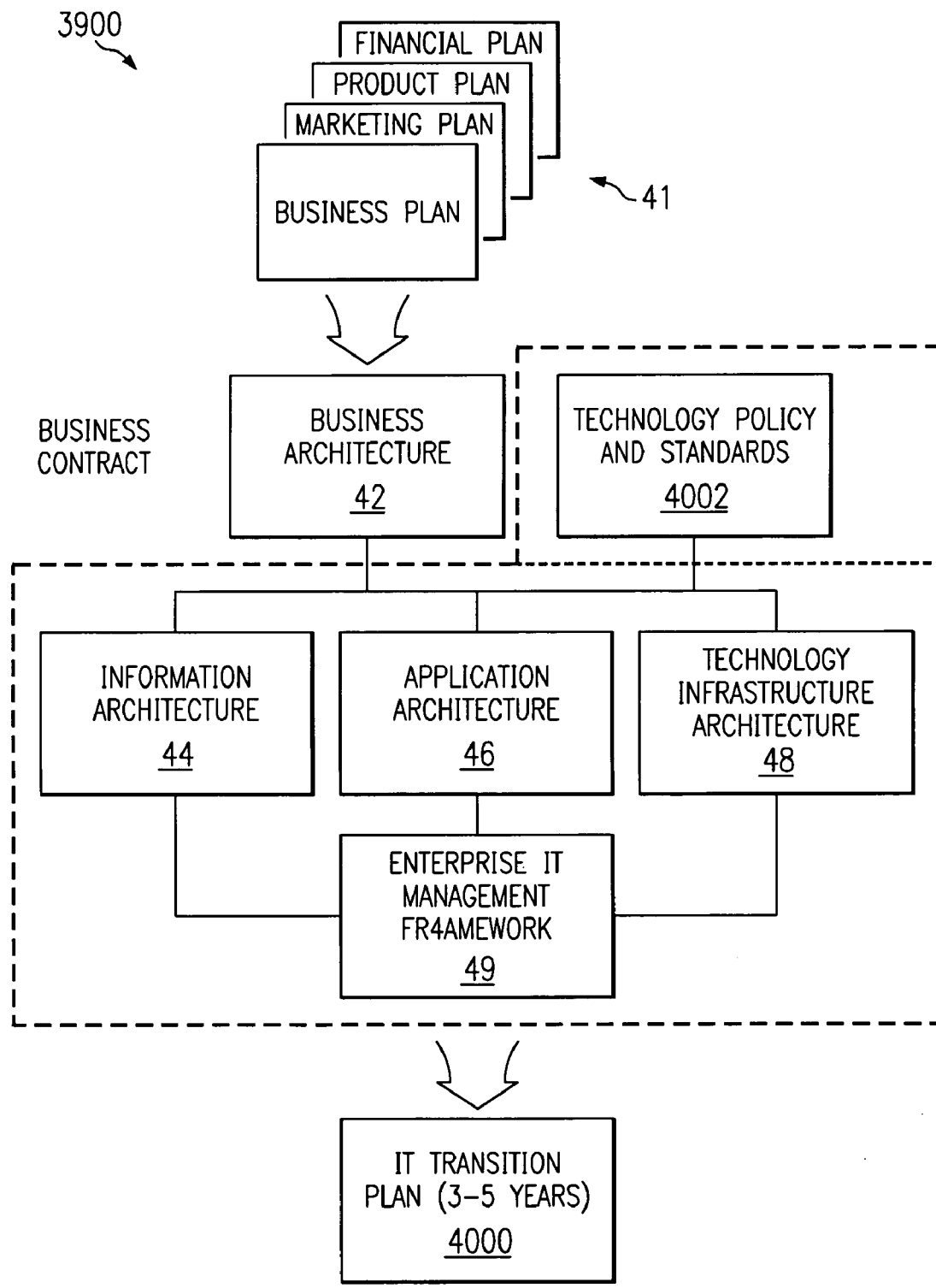
FIG. 40 illustrates a strategic information technology plan blueprint.

To define and build a target enterprise business or IT architecture or strategic IT plan the requisite framework components from Tower model 500 must be identified and assembled into a "blueprint" 3900 that will define the desired result 3902 as illustrated in FIG. 39. Based on the blueprint, an approach and work pattern can be developed that will incorporate the appropriate techniques or methodologies to service a particular need or deliver a desired result. It is a basic tenet of the framework that the component blueprint is fundamental and static, but the approach and consequent work pattern and processes or methodologies employed to address the blueprint is dynamic and will vary depending on technique(s) employed, level of client architecture maturity, completeness, sophistication or need. For example, the blueprint for a strategic IT plan is always the same, comprised of the same fundamental framework components as shown in FIG. 40, but the condition or existence of the blueprint components can vary from client to client, organization to organization. Each situation will have to be addressed on a case by case basis and the appropriate work pattern developed to accomplish the desired results. The model in FIG. 40 details the framework components needed in a comprehensive strategic IT plan to obtain an IT transition plan 4000. The appropriate Tower components are identified and relationships determined that will allow for the development of a strategic IT plan.

As mentioned earlier, the condition or even existence of the client's architectural components can vary from client to client, organization to organization. Each situation will have to be addressed on a case by case basis and the appropriate approach and work pattern developed to accomplish the desired results. However because a strategic IT planning blueprint is relatively static, the blueprint can also be used as an assessment benchmark, by using the technology policy and standards 4002, Tower definitions, and reference models as the baseline. This baseline is then compared with the actual architecture components a particular enterprise currently has in place to determine if they need to be created or already exist or need revision. FIG. 41 is a graphical depiction of how a blueprint may ultimately guide the formulation of the target model.

In some cases, the information that should be in a model exists in multiple formats or sources that are not easily accessible or interpretable. Most often, architecture information is in the minds of the IT organizations and is seldom documented. The blueprint identifies what components will be in the target model so that it can be populated by the IT Strategic planning effort. It is critical that the blueprint is established at the front end to define the scope of the initiative. No matter which approach, process, methodology, or technique is used in the construction of deliverables from the blueprint depicted in FIG. 40, the indicated blueprint components (the "what") are all mandatory considerations in the development of a comprehensive strategic IT plan. The "how" and the practice of getting the desired result is addressed in the development of the approach and work pattern.

In order to create an effective work pattern, a strategy and approach must first be conceived that defines and delimits what needs to be accomplished (deliverables) and consequently what framework components of the blueprint need to be addressed. As dictated by the approach, a work pattern can be defined and the elements and reference models can be selected for each of the components that need to be addressed according to the planning initiative requirements. For example if a high level application architecture is all that is required, the detailed models derived from the business architecture will most probably not need to be developed with all of the detailed inputs and outputs as indicated by the Tower. Therefore the framework Integrated Application/Information/Systems Management Architecture (Value Stream Enablement) reference model may be all that is required. But in every case the blueprint will insure that what ever is built is in context with the whole enterprise architecture.

A simplified example of the thought process behind developing a blueprint of the components required for a strategic IT plan and an approach is as follows. The business goals, objectives, operating principles, business strategies, external influences, and critical success factors (found in the strategic business plan) for a chosen industry or client dictate the functions that must be performed, and from these are derived the business requirements to meet those needs. Processes (value streams) are created or evolve from these requirements to accomplish what the business or organization plans to do. The business requirements and all of the business issues found in the strategic business plan, the current business environment, and the business architecture in turn drive the technology choices, implementation staging, and integration requirements to enable the appropriate processes.

An enterprise's overall business strategies are the drivers of the IT organization. The IT organization then develops its own strategies, which determine the IT organization's product, service, and fulfillment approach. Technical specifications to accommodate the technology requirements, products, services, and processes are directed and governed through the technology policy which articulates IT principles, policies, and standards that guide the evolvement and deployment of the technology portfolio. The technical requirements satisfying the business requirements provide the guidelines for the development of the enterprise information, application, and infrastructure architectures. Based on the architectures and all of the other operating environment characteristics the enterprise IT management framework will deal with the business and organizational management of providing IT services, the management of the services, IT systems and network management, as well as asset and element management.

Figure 42A:
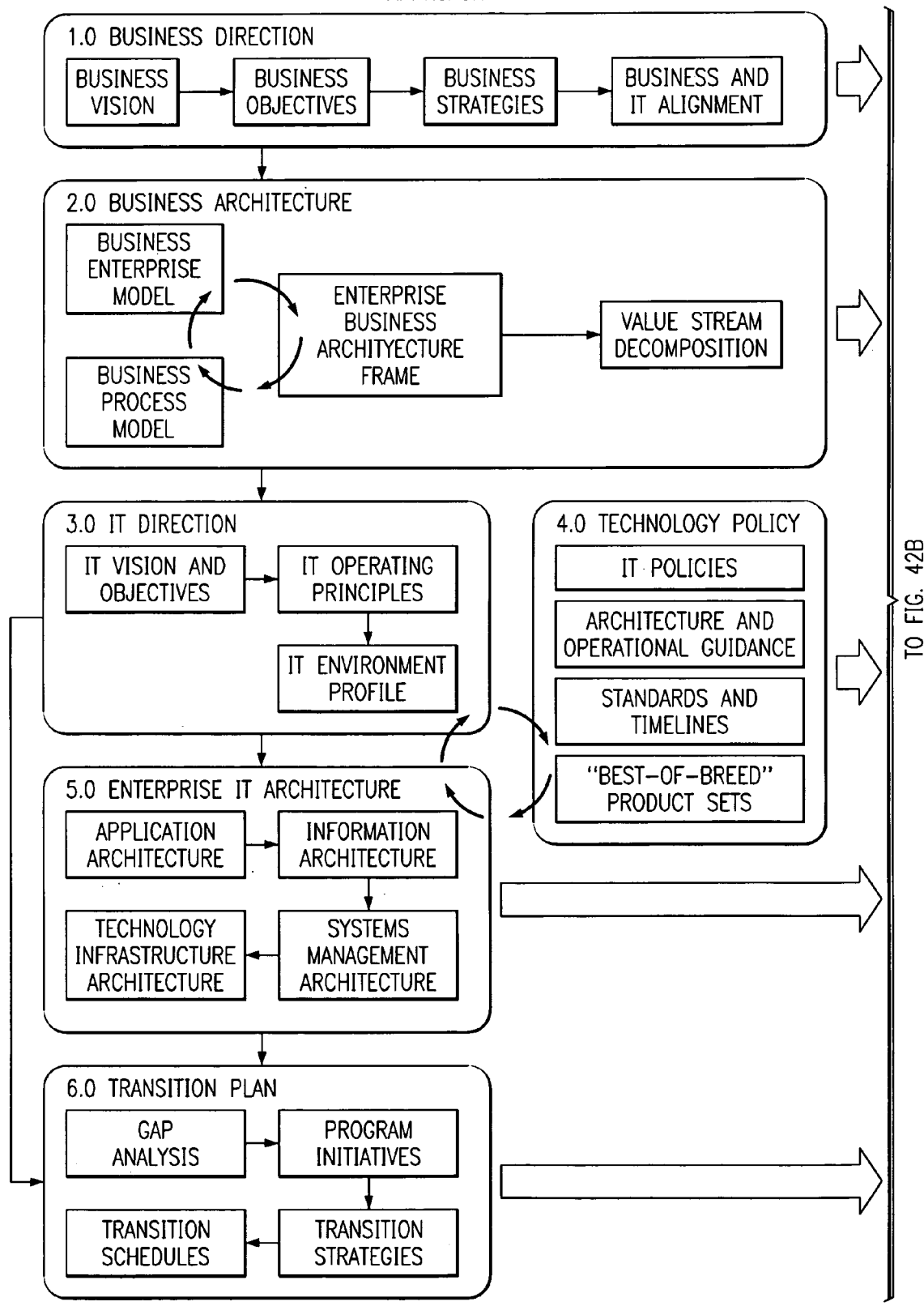
FIGS. 42A–42B illustrate an approach to strategic information technology planning.
Figure 42B:
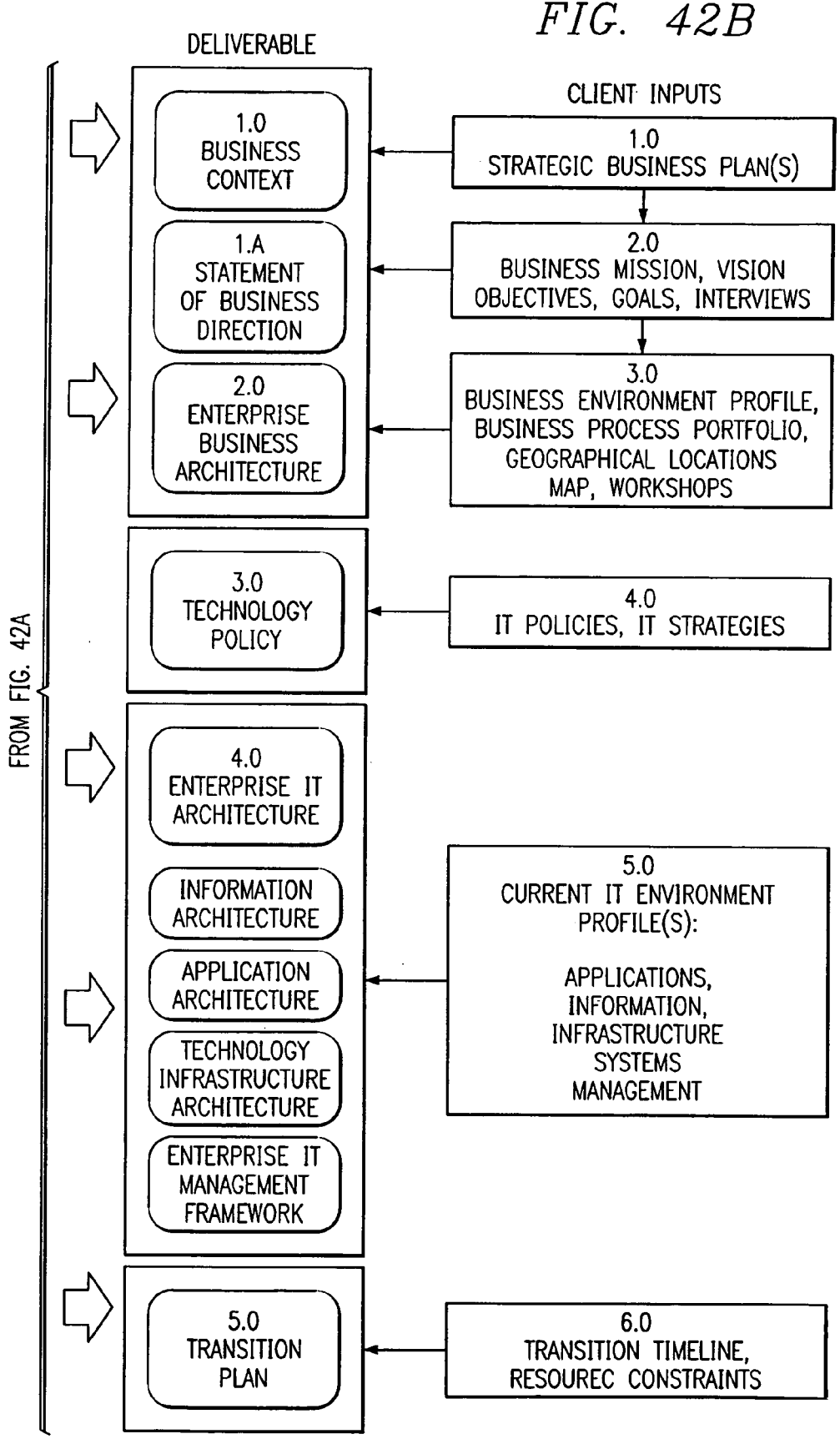

The blueprint components selected from the Tower must then be evaluated depending on customer needs, pre-existing conditions, IT and business environments, and maturity of existing client architectures and frameworks. Upon that evaluation an approach and work pattern can be developed to correlate components into a unified whole for a specific purpose and result. In the case of a strategic IT planning work pattern, the result will be a strategic IT plan that includes the appropriate business and technology architectures and frameworks and a roadmap on how to get from the current environment to the target environment. FIGS. 42A–42B graphically depict how a strategic IT planning approach is constructed from the strategic IT plan blueprint in conjunction with the previous description of the intent behind the IT planning strategy.

Figure 43:
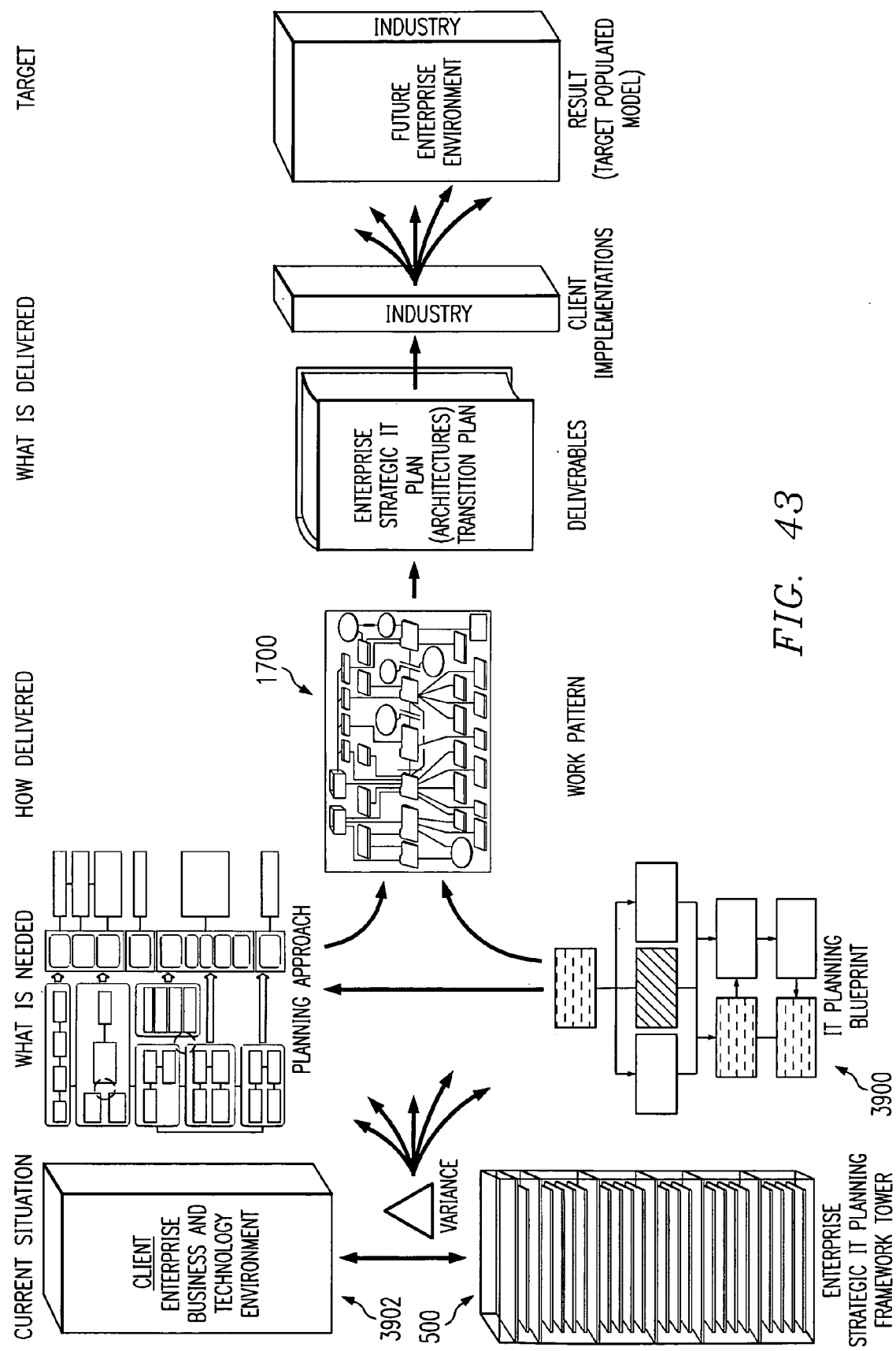
FIG. 43 illustrates the construction and implementation of a strategic information technology plan.

FIG. 43 is a model that illustrates how the passing of selected components of the framework, based on blueprints and an approach created for a specific purpose, through work patterns results in architectures and plans (deliverables) consistent with the blueprint and approach. Through the implementation of the deliverable(s), that is to say the implementation of the recommendations and initiatives typically found in the transition plan, the client can realize the intended target enterprise environment. It should be reiterated that the state and existence of different client environments and architecture components in the current enterprise might dictate a different outcome in each case. The existing components as illustrated in FIG. 41 and those tailored for certain industries, or clients will also vary the outcome. For example, the Tower components passed through work patterns will deliver different results for the telecommunications industry as opposed to the health care industry.

The development of the detailed work pattern can begin once the appropriate IT planning blueprint has been decided upon, the blueprint components selected from the Tower model are evaluated depending on customer needs, pre-existing conditions, IT and business environments; and maturity of existing client architectures and frameworks, and the planning strategy and approach is determined. The detailed work pattern will correlate the contents of the components, elements, and associated reference models into a unified whole for a specific purpose and result or set of deliverables. Basically the process of defining the activities and inputs and outputs of the "population" of the Tower reference models is begun.

There are many ways to define the activities of a work pattern. One might be the development of a simple list of the perceived tasks that need to be performed. Another might be the definition of the deliverables that are desired and ad hoc activities undertaken to fulfill the demands of the deliverables. The most precise and accurate way of approaching the development of a work pattern is through the use of modeling. Modeling is a graphical technique for articulating the events that need to occur based on an understanding of the inputs and outputs and the relationships between those inputs, outputs and activities to deliver desired results. The preferred modeling methodology is to follow the business process reengineering concepts of decomposing the business architecture into value streams, value stream architectures, and workflow models and using Visual Design Language (VDL) as the architecture and work flow notation. The value stream decomposition is focused on inputs and outputs and is very structured, and VDL, using a very rich syntax, very capably articulates the results of the modeling effort. Although any modeling technique or language can be used, value streams and architectures and VDL are used in the examples.

In order for the work pattern to be of use, inputs and outputs, processes, tasks, and the relationships between them must be illustrated. In addition an architecture for the process must be defined to bound the domain of the process and allow for a complete understanding of the contents (inputs and outputs) of the process. This also allows for a lexicon (dictionary) to be developed that will tie directly back to the Tower model and the components, elements, and reference models therein and allow for great clarity in understanding what is being addressed. Value stream decomposition also uses a layering technique or breakdown structure to help view the information holistically at the top layer all the way down to the detail that comprises the whole at lower layers or levels. This allows for the diagrams or models produced to more easily communicate complex flows and relationships. This method is very similar to what is often referred to as work breakdown structure.

Definition of modeling rules can be found in Appendix 1: Modeling Rules and Guidelines. A full listing of VDL syntax can be found in Appendix 2: Visual Design Language Syntax Summary. Some key VDL syntax is listed below in order for the casual reader of this document to be able to understand the Strategic IT Planning VDL workflow model presented in FIG. 44.

- Input/Output—represent patterns and nouns or objects that either are used as information or a component that is used to produce other components through the execution of an operation or process. An example is raw materials or information. The result of the acted on input by the process is the output.
- Process—a set of activities that use clearly identified input(s) to produce clearly identified output(s). A process flow is the full description of the elements that define the process activities. A process maybe completely described on a single diagram or complex enough that several layered diagrams will be required to represent it.
- Operation or execution scenario—is a logically related set of a process's activities that uses clearly identified input(s) to produce clearly identified output(s).
- Pattern—a shared set of relationships between an aggregation of elements. Elements can be anything in any combination—people, pieces of paper, food, character traits, behaviors, other patterns, relationships, or anything else we can identify.
- Noun or object—a noun is more than just a person, place, or thing. It may also be a concept, class, or category.
- Attribute—describes some feature or quality about an element. Concrete attributes are things like color, size, state, status and other "objective" statements. Induced attributes are in the eye of the beholder. Things like quality and a good place to work fall into that category.
- Verb—a kind of relationship between nouns or noun-like elements that involves action. VDL has a rich set of verbs and graphical ways to represent them. The symbol shown here is the Create verb.

Integral to the process of delivering a strategic IT plan is the use of a methodology that ensures the work pattern is accurate and complete and adequately describes the approach that has been decided upon. The preferred method for depicting the work pattern workflow is VDL. The inherent discipline and structure that this method requires assures completeness of the process and supports reasonable and common graphical representations of the information that allow for communications of the results. This particular example of the workflow scenario assumes that the blueprint requires all of the strategic IT planning blueprint components to be developed during this project.

Figure 44A:
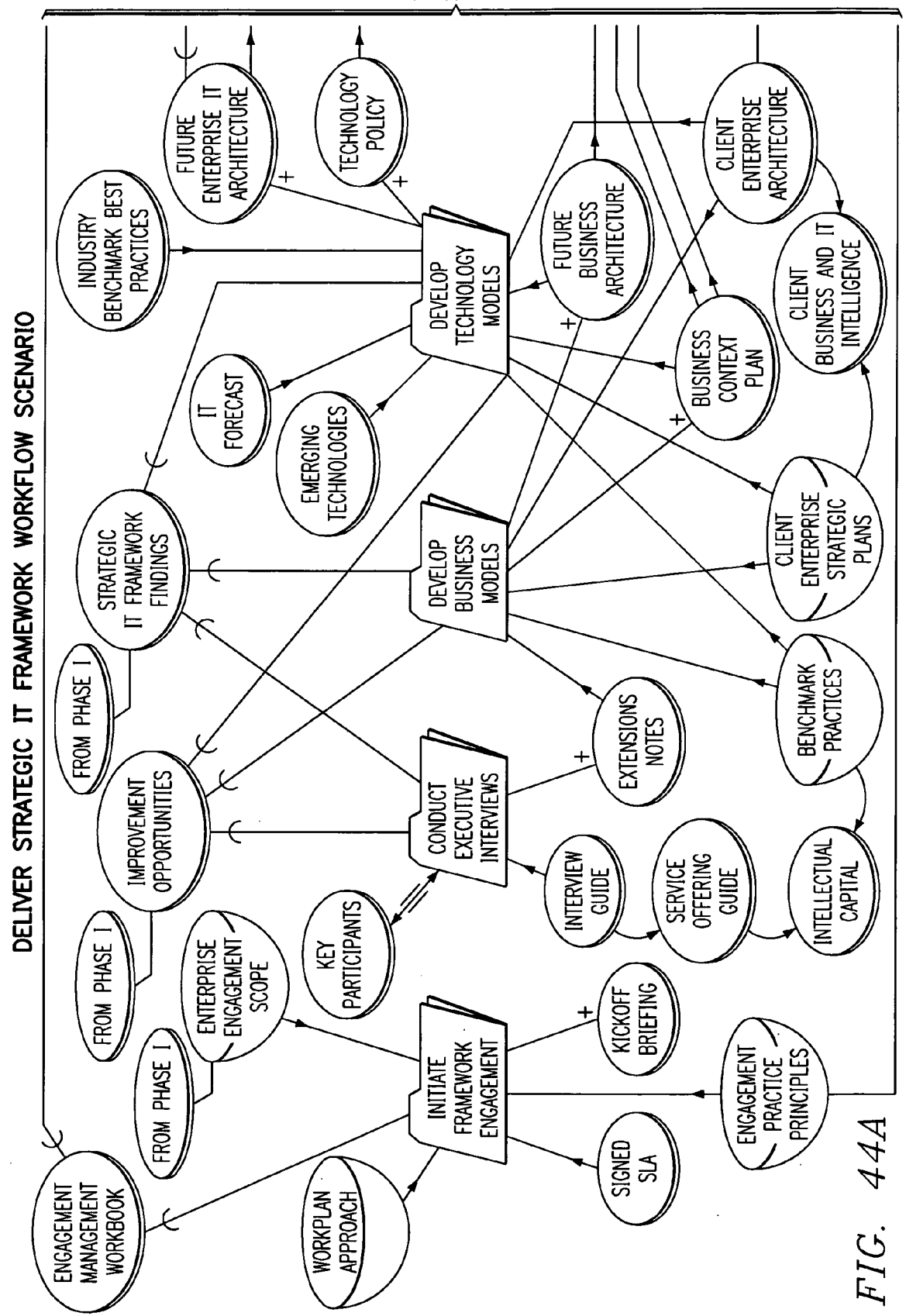
FIGS. 44A–44B illustrate a strategic information technology framework workflow delivery scenario.
Figure 44B:
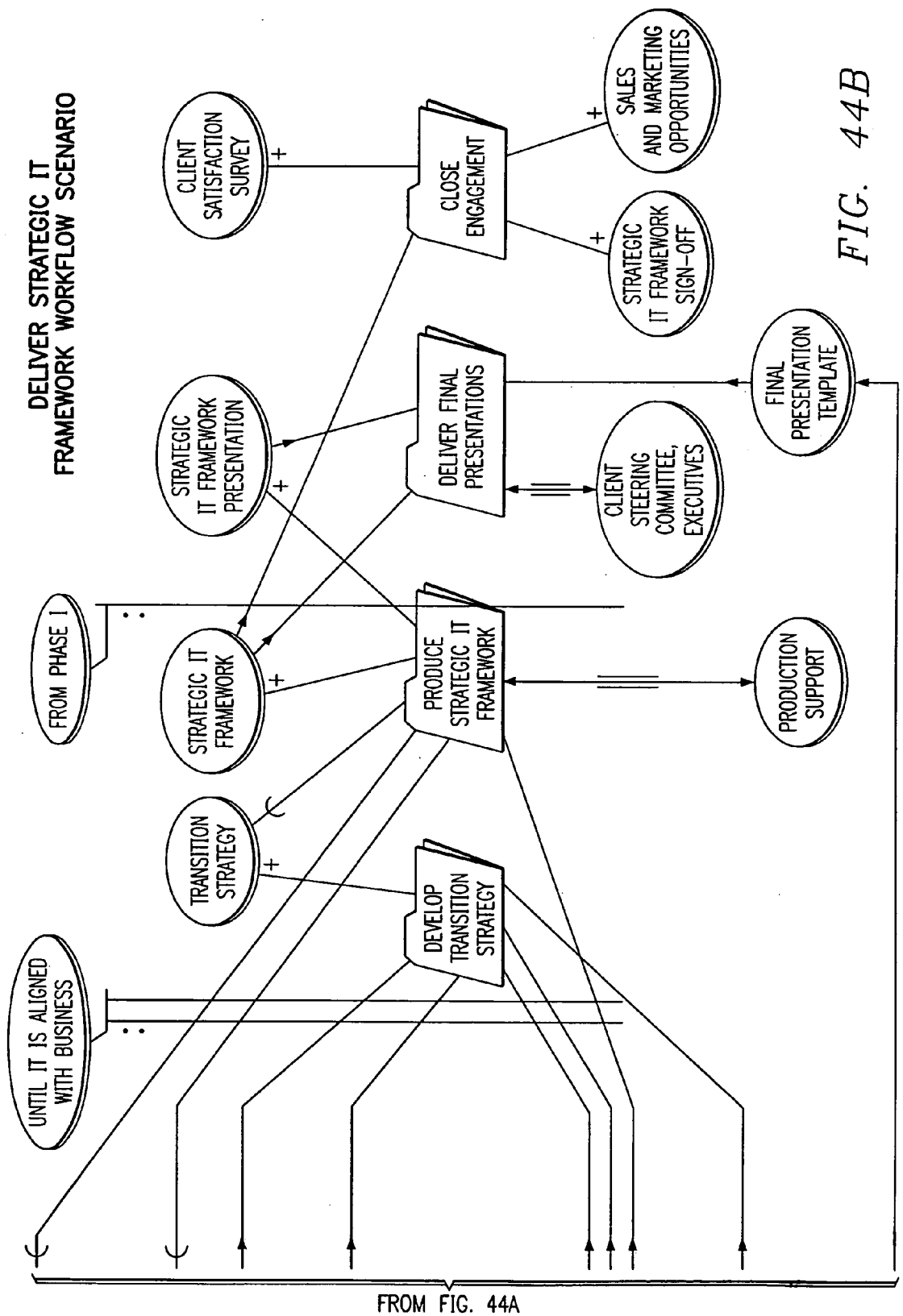
Figure 46A:
FIGS. 46A–46K illustrate the symbols used for noun and noun-like notations used in VDL modeling diagrams.
Figure 46B:
Figure 46C:
Figure 46D:
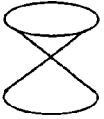
Figure 46E:
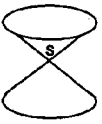
Figure 46F:
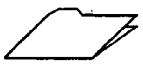
Figure 46G:
Figure 46H:
Figure 46I:
Figure 46J:
Figure 46K:
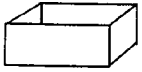
Figure 47A:
FIGS. 47A–47J illustrate the symbols used for verb notations used in VDL modeling diagrams.
Figure 47B:
Figure 47C:
Figure 47D:
Figure 47E:
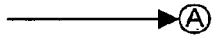
Figure 47F:
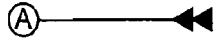
Figure 47G:
Figure 47H:
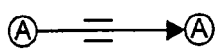
Figure 47I:
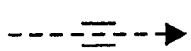
Figure 47J:

FIGS. 44A–44B depict the workflow scenario for delivering a strategic IT framework. The following is a brief description of the model. The first critical step defined in the workflow is to initiate the engagement or project by defining the approach, identifying participants including project team members, decision makers, and information sources, establishing the duration and key milestones, and establishing the scope and objectives. Interviews with key participants are then conducted with typically parallel efforts to gather existing documentation. This set of work or activities will lead to the next major steps, which are the development of the requisite business and technology models inclusive of current situation analysis and future direction understanding. The Tower reference models are fully documented and in this case are considered to be major deliverables with appropriate client participation and approvals for content. Key inputs to the development of the models are knowledge of emerging technologies, industry best practices, technology policy, and business trends. The project management process requires that project workbooks are created and interim milestones are met for periodic reviews and continuous feedback. Based on the drivers, gaps, and transition needs, a strategy to change the IT environment is defined. The participants assess this initial view of the Strategic IT Framework to assure business/IT alignment, estimate resources and feasibility, and determine staging and priorities of change initiatives. The result of this assessment is then presented to key decision makers which are typically IT Steering committees. The projects is then considered closed and should be viewed objectively to assess where it was successful and determine a process to maintain the plan and ensure its implementation.

Figure 45:
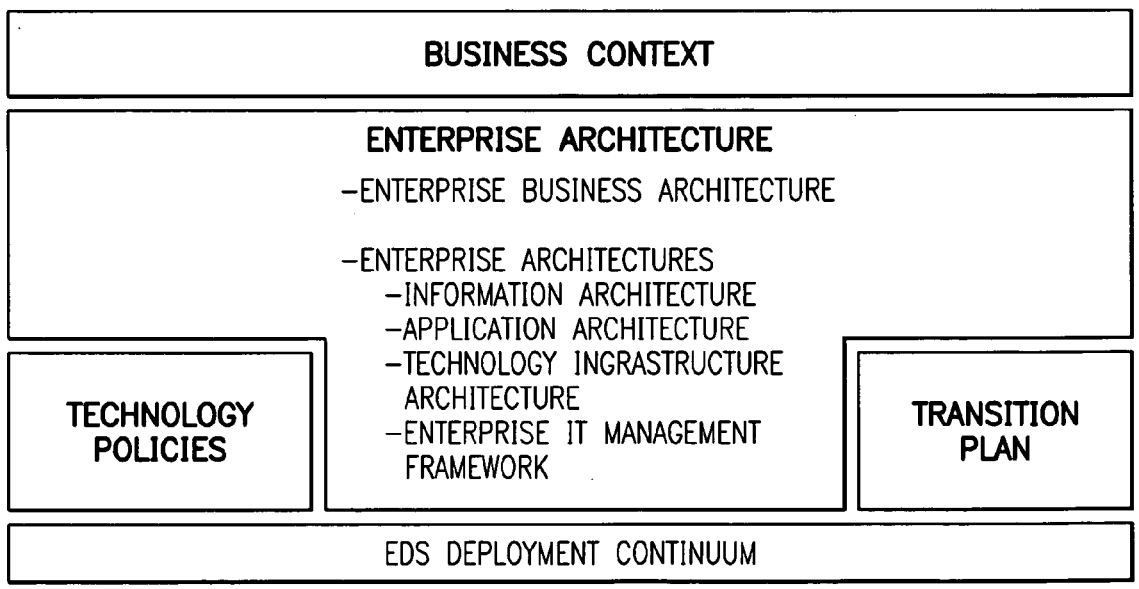
FIG. 45 illustrates the components of a strategic information technology plan.

In order to articulate and graphically depict the particular reference models that will be used in support of delivering a strategic IT plan, the use of a technique called "story boarding" is used. The story board is built directly from the strategic IT plan blueprint, planning approach, and detailed work pattern. It has been found that the story board allows for a quick, clear, and concise understanding and communication of the model set that will be used to describe the enterprise both currently and in the future. At a high level the groupings of reference models will adhere to the Enterprise Strategic IT Planning Framework Tower and to the typical deliverables of a strategic IT plan as depicted in FIG. 45.

Use of the story board will help the practitioners to precisely communicate the collection of reference models that will be used in the planning initiative and to understand at a glance the relationships of the framework components and the content of deliverables.

SUMMARY

Creating an enterprise architecture approach in which to develop complex IT systems is a difficult task because opposing interests must be balanced. On the one hand, the approach can support IT development through standards, guidelines, management policies, approved products and methods. On the other hand, a system that completely adheres to a standard architecture may be inflexible to the point that it cannot be optimized for a particular task. Such is the tradeoff between standardization for manageability and customization for functionality. The essence of an architecture is structure, simplification, compromise, and balance. Consider that a system is a set of disparate elements crafted together to perform a unique function that cannot be performed by any single element on its own. The most important attribute of the system becomes the relationships that transforms the dissimilar elements into an organic whole. The architecture controls the complexity and uncertainty of the element relationships by establishing interfaces, form, fit and function. It makes the pieces fit and facilitates the integration and resolution of structural conflicts. The architecture defines the whole.

The amount of information captured in the architecture is a delicate balance between too little detail (result: system chaos) and too much detail (result: stifled innovation). The goal is to have enough specificity to facilitate management of the IT environment while permitting application developers the opportunity to tailor designs to meet business demands or technology changes. Finally, it is important to note that an architecture is not simply defined at a single point in time and placed on a shelf as complete. Rather, an architecture is an evolving entity that changes with the business environment and the technology landscape. In fact, it's real benefit is the need for the IT organization to continually address the architecture's validity, stimulate discussion and gain consensus. An enterprise IT architecture and framework is a powerful tool that needs attentive care to realize the full power of its benefits.

The Enterprise Strategic IT Planning Framework Tower is the starting point for determining the context and mandatory, major components and methods needed to develop a strategic IT plan and consequently build IT solutions for a successfully enabling an enterprise. The Tower will help IT personnel to effectively analyze and evaluate business and technology requirements, put them in their proper context, and ensure that due consideration has been given to all of the architectural components needed to support business needs and requirements. In addition the Tower will help achieve the goals of defining and embodying a value proposition and intellectual capital based on experience and success, ensuring consistency of delivery and integration of results, ensure specificity in definition but not in a prescriptive "cookbook" approach, and allowing tailoring to individual and unique client requirements but building from a foundation of "best practices".

The deliberate approach and modeling of a strategic planning process using the Enterprise Strategic IT Planning Framework Tower, blueprints, work pattern approaches, and graphical story boards will insure that the development of a strategic IT plan will be reasonable, executable, and useful. The strategic IT plan's implementation will provide the framework and process for defining the vision, mission and long term objectives for IT and aligning them with the business, the strategies for achieving them, and the architectures to enable them. The strategic IT plan's implementation provides the context and guidance that drives the definition of integrated business and IT systems (in support of business processes and functions), organization structure, and IT solution sets for products and services. The strategic IT plan also determines the actions and parameters for the allocation of resources to meet the objectives and allows for a deliberate, planned, and effective utilization of an enterprise's investment in time and resources.

Thus, it is apparent that there has been provided, in accordance with the present invention, a structure for and a method of modeling integrated business and IT frameworks and architecture in support of a business that satisfies the advantages set forth above. Although the present invention has been described in detail, various changes, substitutions, and alterations may be readily ascertainable by those skilled in the art and may be made herein without departing from the spirit and scope of the present invention as defined by the following claims.

What is claimed is:

1. A method of computer modeling integrated business and information technology frameworks and architecture in support of a business comprising:
   identifying in a computer manageable entities of the business and the existing information technology supported by each manageable entity;
   generating by the computer an overall architecture for the business, the overall architecture defining how the manageable entities relate to each other and to the existing information technology;
   implementing in the computer a common language in order to articulate the overall architecture;
   generating by the computer a graphical representation of the overall architecture for the business according to the common language;
   determining by the computer information technology requirements for the business in response to the existing information technology and the relationship among the manageable entities; and
   generating by the computer a plan for implementation and deployment of future information technology among the manageable entities based on the determined information technology requirements for display by the computer within the graphical representation of the overall architecture;
   wherein the overall architecture contains a plurality of components, the plurality of components including a strategic plan, a business architecture, an information architecture, an application architecture, a technology infrastructure architecture, and an enterprise IT management framework.

2. The method of claim 1, wherein the overall architecture addresses people, processes, and technology of the business.

3. The method of claim 1, wherein the strategic plan component includes a business plan, a product plan, a financial plan, an organization plan, a marketing plan, and a future information technology plan in support of the aforementioned plans.

4. The method of claim 1, wherein the business architecture component defines current business direction, objectives, and supporting processes as well as future direction, objectives, and supporting processes.

5. The method of claim 1, wherein the information architecture component provides information and data management precepts, an information-application software portfolio, and a geo-structural view of existing and future information technology deployment.

6. The method of claim 1, wherein the application architecture component defines an application software portfolio and integration relationships for the manageable entities of the business.

7. The method of claim 1, wherein the technology infrastructure architecture component enables access to information and geo-structural layouts for the existing and future information technology.

8. The method of claim 1, wherein the enterprise information technology management framework component provides existing and future information technology services and products, management of the services, IT systems and network management, and the enterprise IT management organization capabilities, competencies, skills, and performance models.

9. The method of claim 1, further comprising:
decomposing the manageable entities so that each manageable entity has a relative independence from other manageable entities but is in context with the overall enterprise architecture.

10. The method of claim 1, wherein the overall architecture provides the starting point for determining the context and foundation components and elements needed to build either a Strategic IT Plan, overall enterprise architecture, or enabling IT solutions for an enterprise.

11. A computer readable medium including code for modeling integrated business and information technology frameworks and architecture in support of a business, the code operable to:

receive data associated with manageable entities of the business and existing information technology supported by each manageable entity;

generate an overall architecture defining how manageable entities of a business relate to one another and to the existing information technology, the overall architecture including:

a strategic business plan component providing context and guidance that drive definition of business functions, processes, systems, and organization;

a business architecture component reflecting what the business does in the present as well as in the future to accomplish particular business requirements;

an information architecture component representing what information is to be delivered to individuals across the business;

an application architecture component supporting business process execution and information flow;

a technology infrastructure architecture component supporting execution of activities and defining what information technology components are needed to enable access to information;

an enterprise information technology management architecture component dealing with business and organizational management of providing information technology services and products as well as systems, network, and element management;

generate a plan for implementation and deployment of future information technology among the manageable entities pursuant to the various components of the overall architecture in response to how the manageable entities relate and to the existing information technology;

graphically displaying the overall architecture of the business;

graphically displaying how the future information technology is to be implemented and deployed within the overall architecture in response to the generated plan.

* * * * *

UNITED STATES PATENT AND TRADEMARK OFFICE
CERTIFICATE OF CORRECTION

| | | |
|---|---|---|
| PATENT NO. | : 7,162,427 B1 | Page 1 of 1 |
| APPLICATION NO. | : 09/378514 | |
| DATED | : January 9, 2007 | |
| INVENTOR(S) | : Conrad B. Myrick et al. | |

It is certified that error appears in the above-identified patent and that said Letters Patent is hereby corrected as shown below:

Title Page
Item (75) Inventors: should read Conrad B. Myrick, Riichardson, TX (US); Harry W. Hixon, Jr., Stafford, VA (US); Christopher M. Koll, Carrollton, TX (US); Ralph L. Whittle, Jr., Plano, TX (US); Mary Lynne Pribil, Plano, TX (US)

Signed and Sealed this

Twentieth Day of March, 2007

JON W. DUDAS
*Director of the United States Patent and Trademark Office*